United States Patent
Park et al.

(10) Patent No.: US 10,592,071 B2
(45) Date of Patent: Mar. 17, 2020

(54) MULTI-DISPLAY SYSTEM, ELECTRONIC DEVICE, AND CONTENT OUTPUT METHOD

(71) Applicant: Samsung Electronics Co., Ltd., Suwon-si, Gyeonggi-do (KR)

(72) Inventors: Sung Su Park, Seoul (KR); Andrew Chang, Castro Valley, CA (US); Seo Gyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 15/303,633

(22) PCT Filed: Apr. 6, 2015

(86) PCT No.: PCT/KR2015/003438
§ 371 (c)(1),
(2) Date: Oct. 12, 2016

(87) PCT Pub. No.: WO2015/160132
PCT Pub. Date: Oct. 22, 2015

(65) Prior Publication Data
US 2017/0038928 A1 Feb. 9, 2017

(30) Foreign Application Priority Data

Apr. 14, 2014 (KR) .................. 10-2014-0044466
Jul. 10, 2014 (KR) .................. 10-2014-0087099
Nov. 3, 2014 (KR) .................. 10-2014-0151362

(51) Int. Cl.
*G06F 3/0482* (2013.01)
*G09G 5/12* (2006.01)
(Continued)

(52) U.S. Cl.
CPC ............ *G06F 3/0482* (2013.01); *G06F 3/011* (2013.01); *G06F 3/0488* (2013.01);
(Continued)

(58) Field of Classification Search
CPC .... G06F 3/0482; G06F 3/041; G06F 3/04817; G06F 3/04883; G06F 3/1446;
(Continued)

(56) References Cited

U.S. PATENT DOCUMENTS 5,959,686 A * 9/1999 Jeong .................... G06F 3/1454
345/1.3
6,118,433 A 9/2000 Jenkin et al.
(Continued)

FOREIGN PATENT DOCUMENTS

EP 1 548 571 A1 6/2005
EP 2 177 980 A2 4/2010
(Continued)

OTHER PUBLICATIONS

Korean Office Action dated Jul. 19, 2018.
(Continued)

*Primary Examiner* — Wing H Chow
(74) *Attorney, Agent, or Firm* — Jefferson IP Law, LLP

(57) ABSTRACT

Provided are an electronic device and a content output method of the same. Synchronized content is output to a large format display (LFD) and a small format display (SFD). Content synchronized in correspondence with a user's proximity and/or touch is output to the LFD and the SFD.

8 Claims, 54 Drawing Sheets

(51) Int. Cl.
*G06F 3/14* (2006.01)
*G06Q 30/06* (2012.01)
*G09F 27/00* (2006.01)
*G09F 9/302* (2006.01)
*G06F 3/0488* (2013.01)
*G06F 3/01* (2006.01)
*G06F 3/0481* (2013.01)
*G06F 3/16* (2006.01)
*G06K 9/00* (2006.01)
*G06T 3/40* (2006.01)

(52) U.S. Cl.
CPC ...... *G06F 3/04817* (2013.01); *G06F 3/04883* (2013.01); *G06F 3/1446* (2013.01); *G06F 3/167* (2013.01); *G06K 9/00362* (2013.01); *G06Q 30/0641* (2013.01); *G06Q 30/0643* (2013.01); *G06T 3/4092* (2013.01); *G09F 9/3026* (2013.01); *G09F 27/00* (2013.01); *G09G 5/12* (2013.01); *G09G 2300/026* (2013.01); *G09G 2340/0407* (2013.01); *G09G 2354/00* (2013.01)

(58) Field of Classification Search
CPC ... G06F 3/167; G06K 9/00362; G06T 3/4092; G09G 5/12; G09G 2300/023; G09G 2300/026; G09G 2354/00
See application file for complete search history.

(56) References Cited

U.S. PATENT DOCUMENTS

| | | | |
|---|---|---|---|
| 6,583,771 B1 | 6/2003 | Furuhashi et al. | |
| 7,475,356 B2* | 1/2009 | Baudisch | G06F 3/1438 |
| | | | 715/700 |
| 2002/0071247 A1 | 6/2002 | Clark et al. | |
| 2004/0075701 A1* | 4/2004 | Ng | G06Q 30/02 |
| | | | 715/867 |
| 2008/0225008 A1 | 9/2008 | Madonna et al. | |
| 2009/0135176 A1 | 5/2009 | Snoddy et al. | |
| 2010/0177016 A1 | 7/2010 | Zeng | |
| 2012/0242893 A1 | 9/2012 | Akitomo | |
| 2013/0069860 A1 | 3/2013 | Davidson | |
| 2014/0002330 A1 | 1/2014 | Teramae et al. | |
| 2014/0075388 A1 | 3/2014 | Kuscher et al. | |

FOREIGN PATENT DOCUMENTS

| | | |
|---|---|---|
| KR | 10-2008-0034652 A | 4/2008 |
| KR | 10-2010-0015620 A | 2/2010 |
| KR | 10-2012-0056917 A | 6/2012 |
| KR | 10-2014-0002522 A | 1/2014 |
| RU | 2 469 380 C2 | 12/2012 |
| RU | 2497298 C2 | 10/2013 |

OTHER PUBLICATIONS

European Office Action dated Jan. 17, 2019, issued in European Patent Application No. 15779305.0.
Chinese Office Action dated Feb. 3, 2019, issued in Chinese Patent Application No. 201580031875.0.
Korean Notice of Allowance dated Jan. 29, 2019, issued in Korean Patent Application No. 10-2014-0151362.
Korean Office Action dated Jun. 5, 2019, issued in Korean Patent Application No. 10-2019-0048042.
European Office Action dated Sep. 27, 2019, issued in European Patent Application No. 15 779 305.0.
Korean Office Action dated Sep. 30, 2019, issued in Korean Patent Application No. 10-2019-0109284.
Chinese Office Action dated Nov. 11, 2019, issued in Chinese Patent Application No. 201580031875.0.

* cited by examiner

[Fig. 1a]
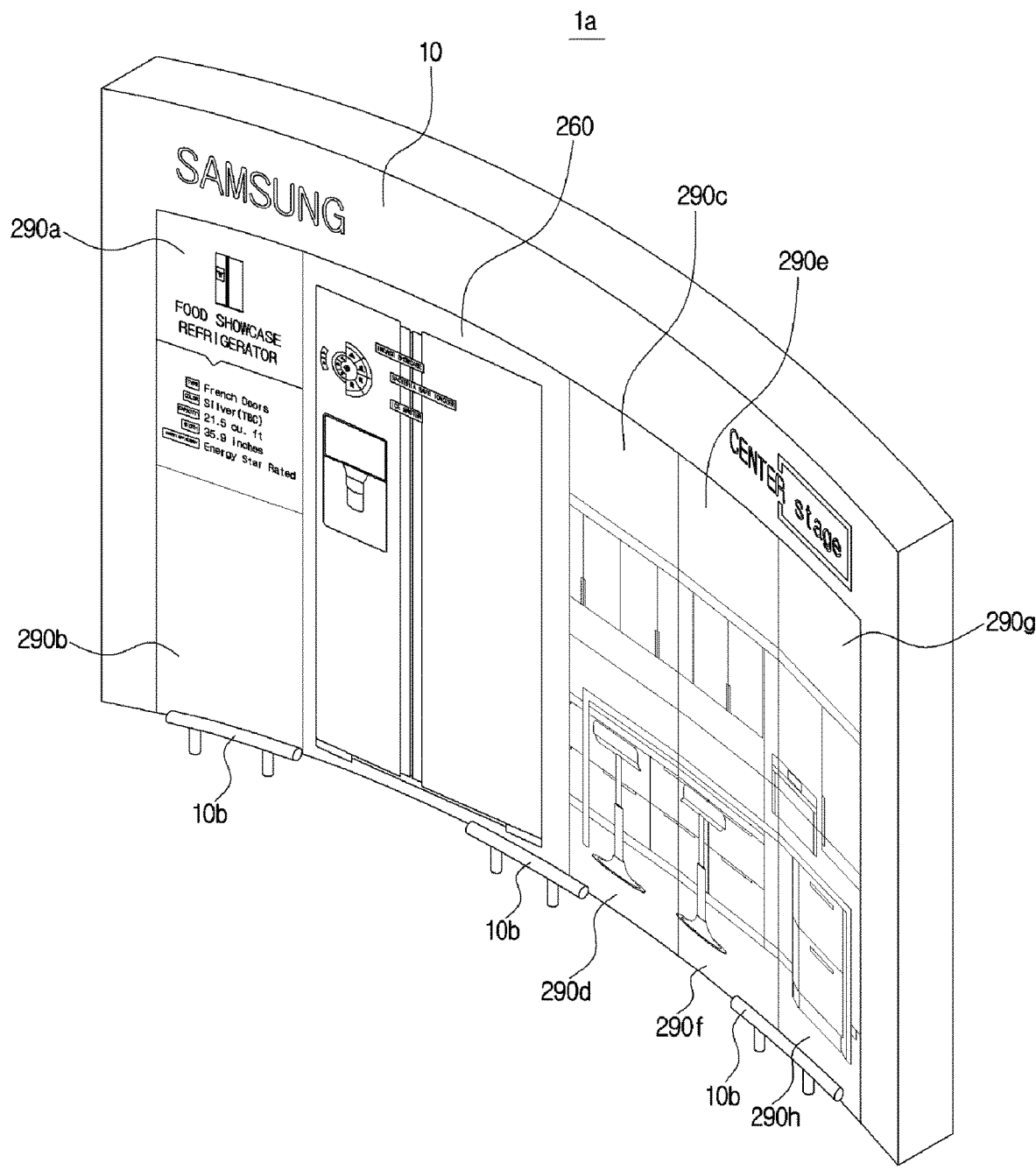

[Fig. 1b]
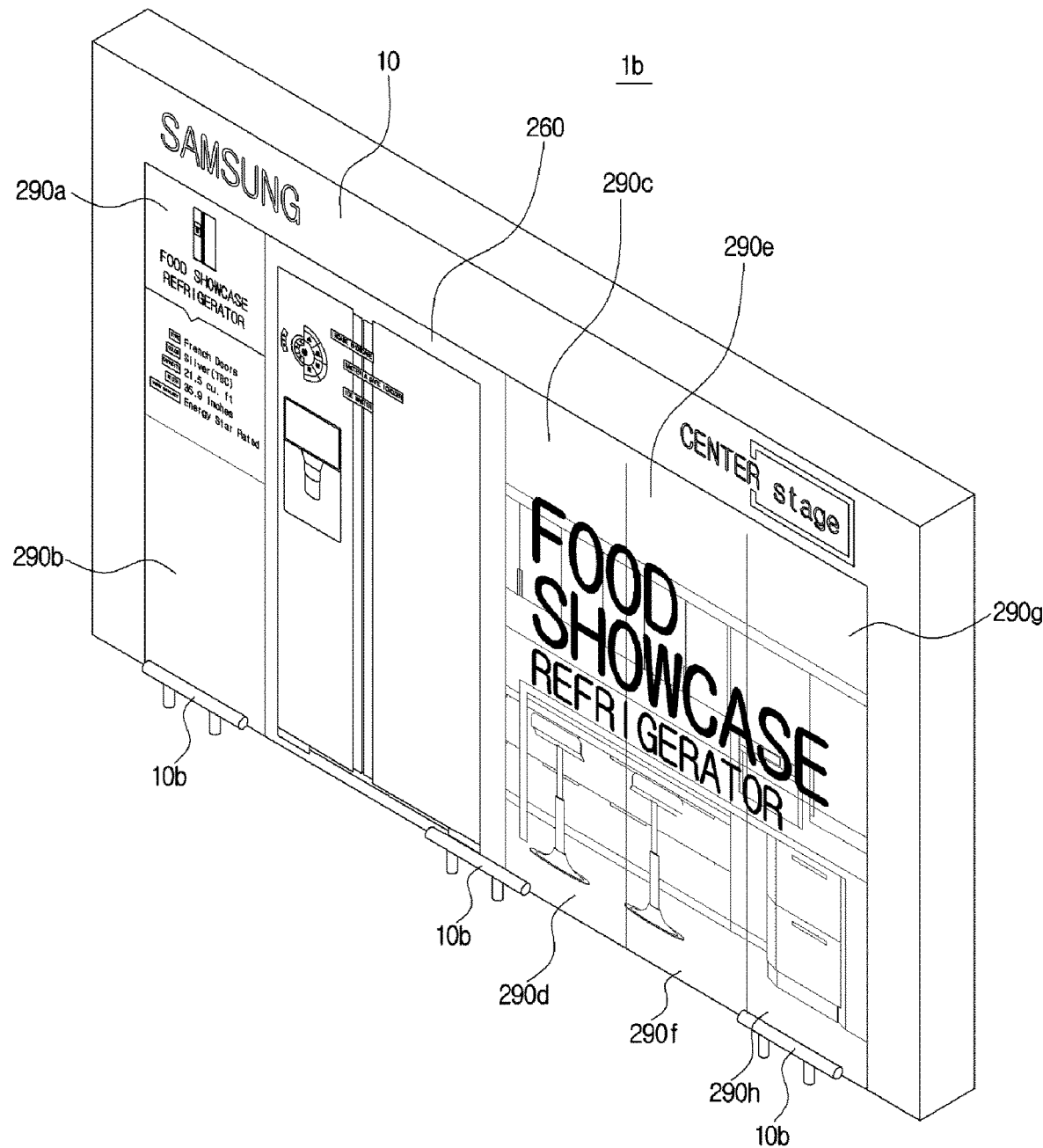

[Fig. 2a]
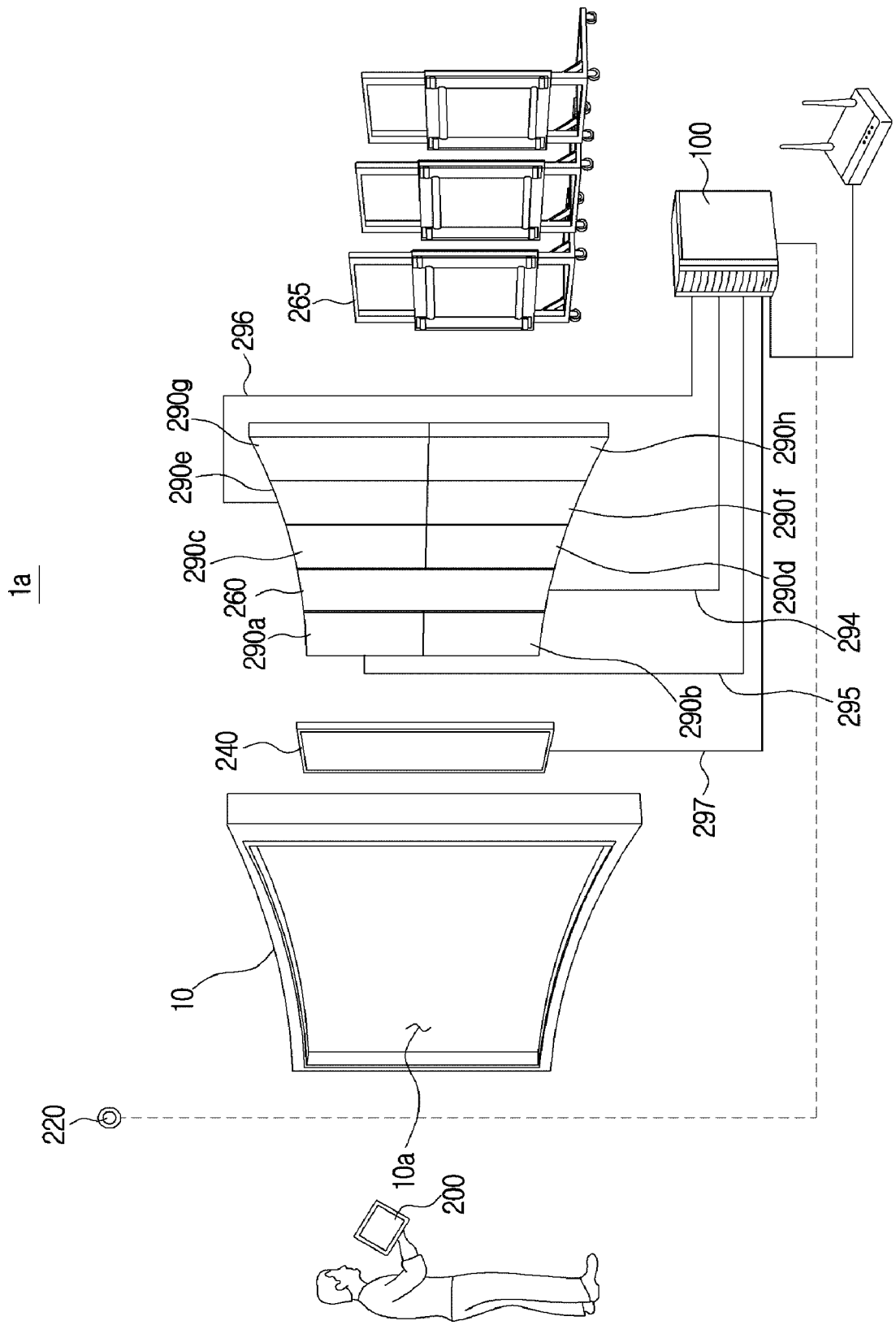

[Fig. 2b]
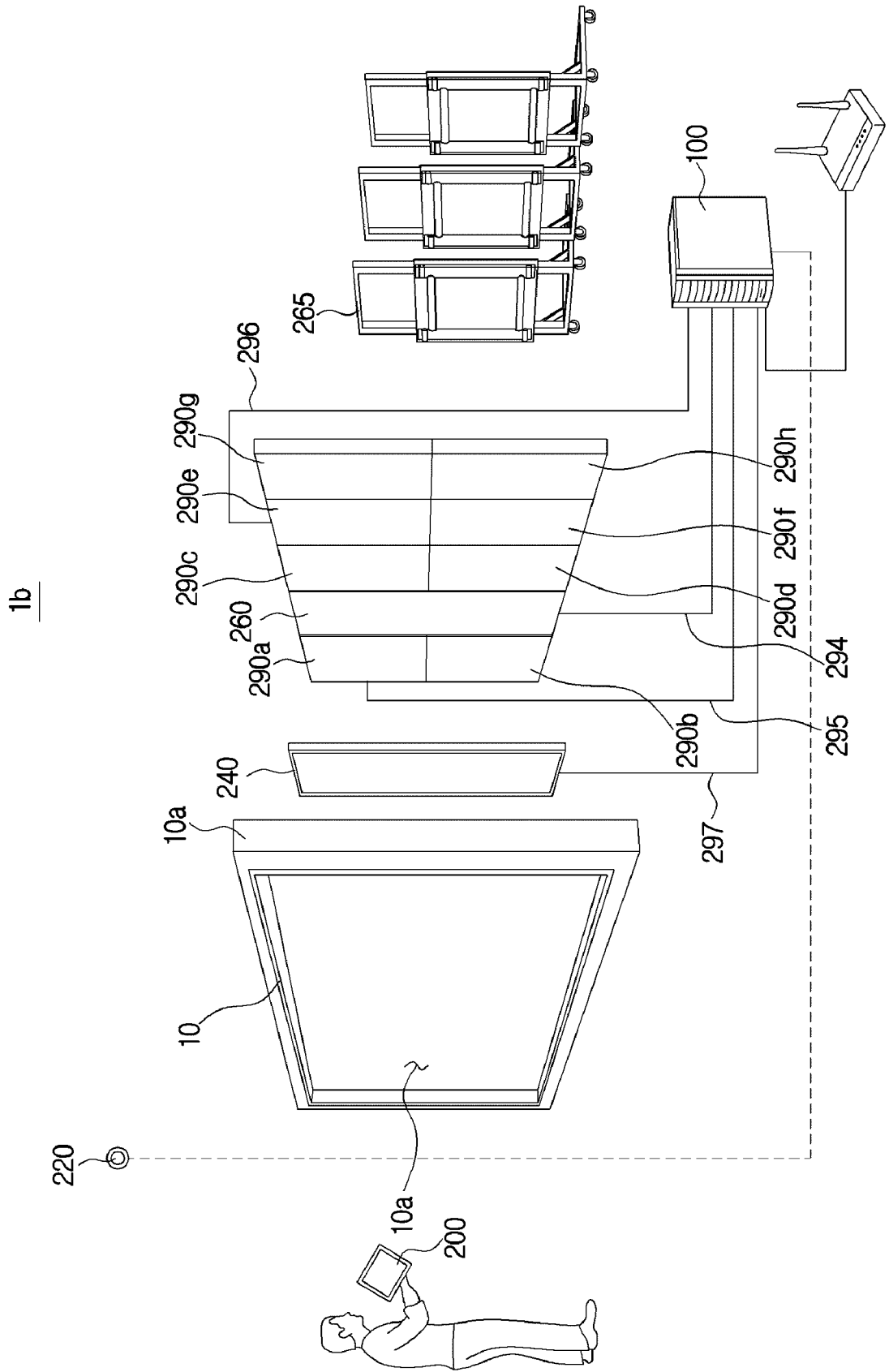

[Fig. 3]
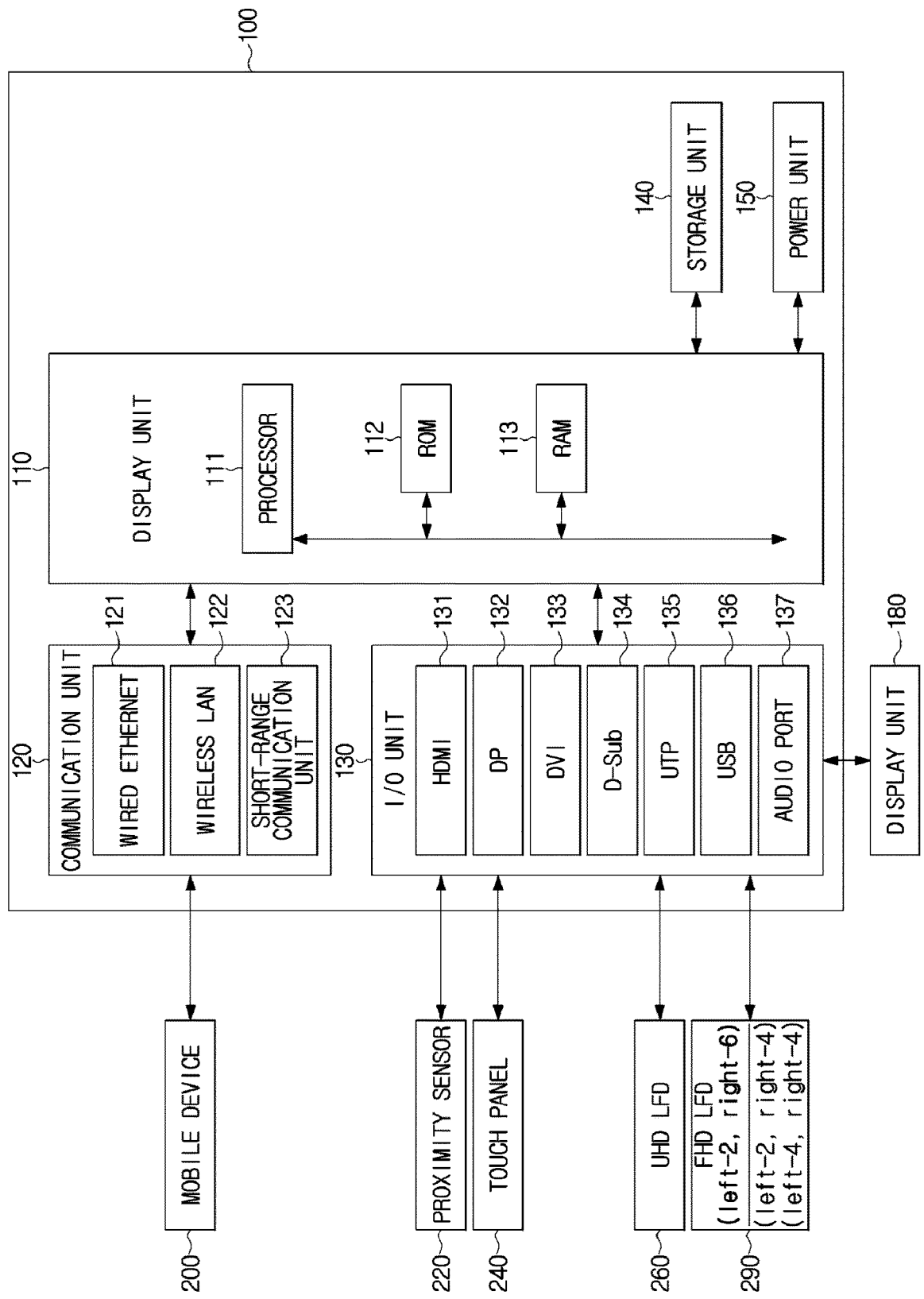

[Fig. 4]
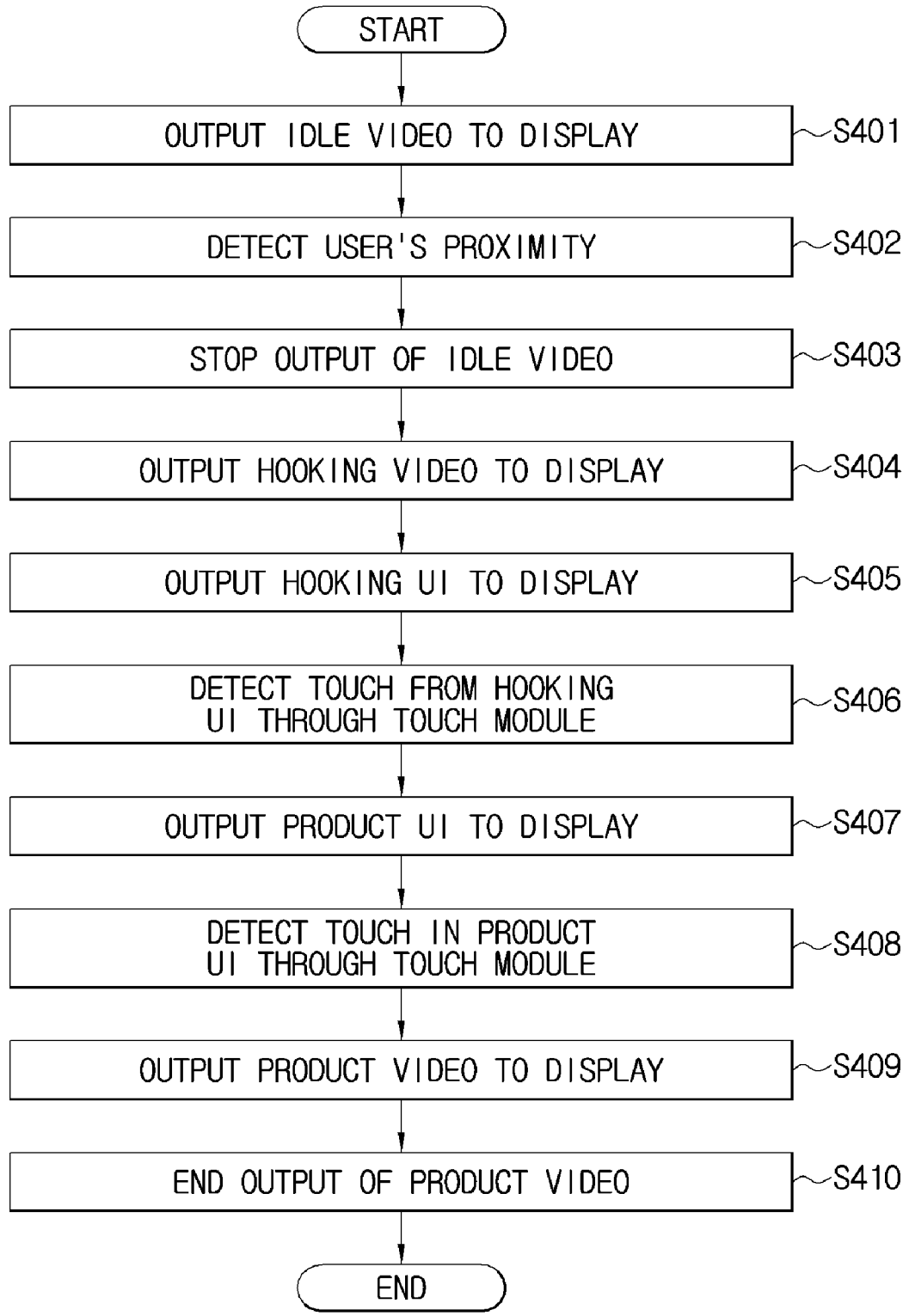

[Fig. 5a]
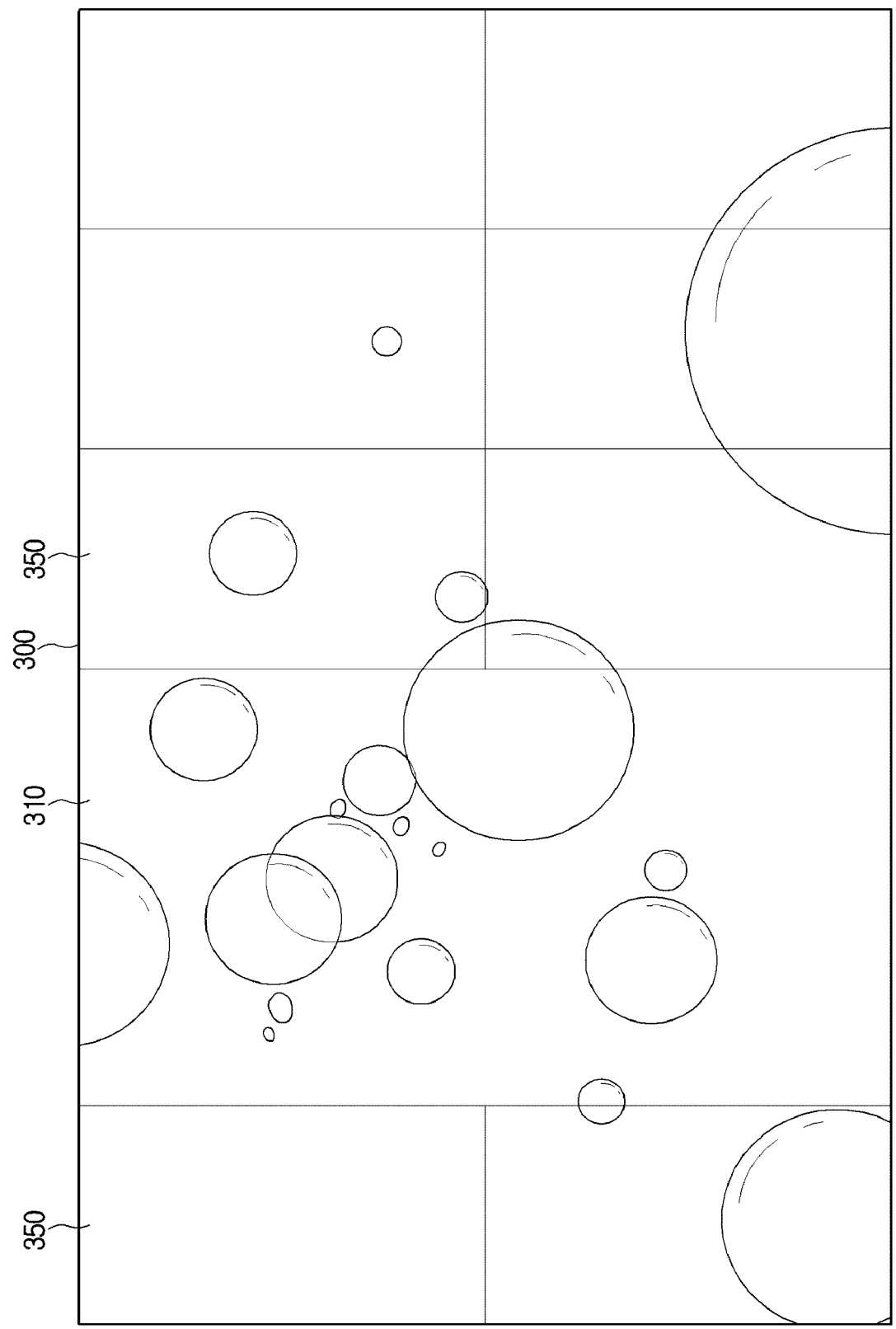

[Fig. 5b]
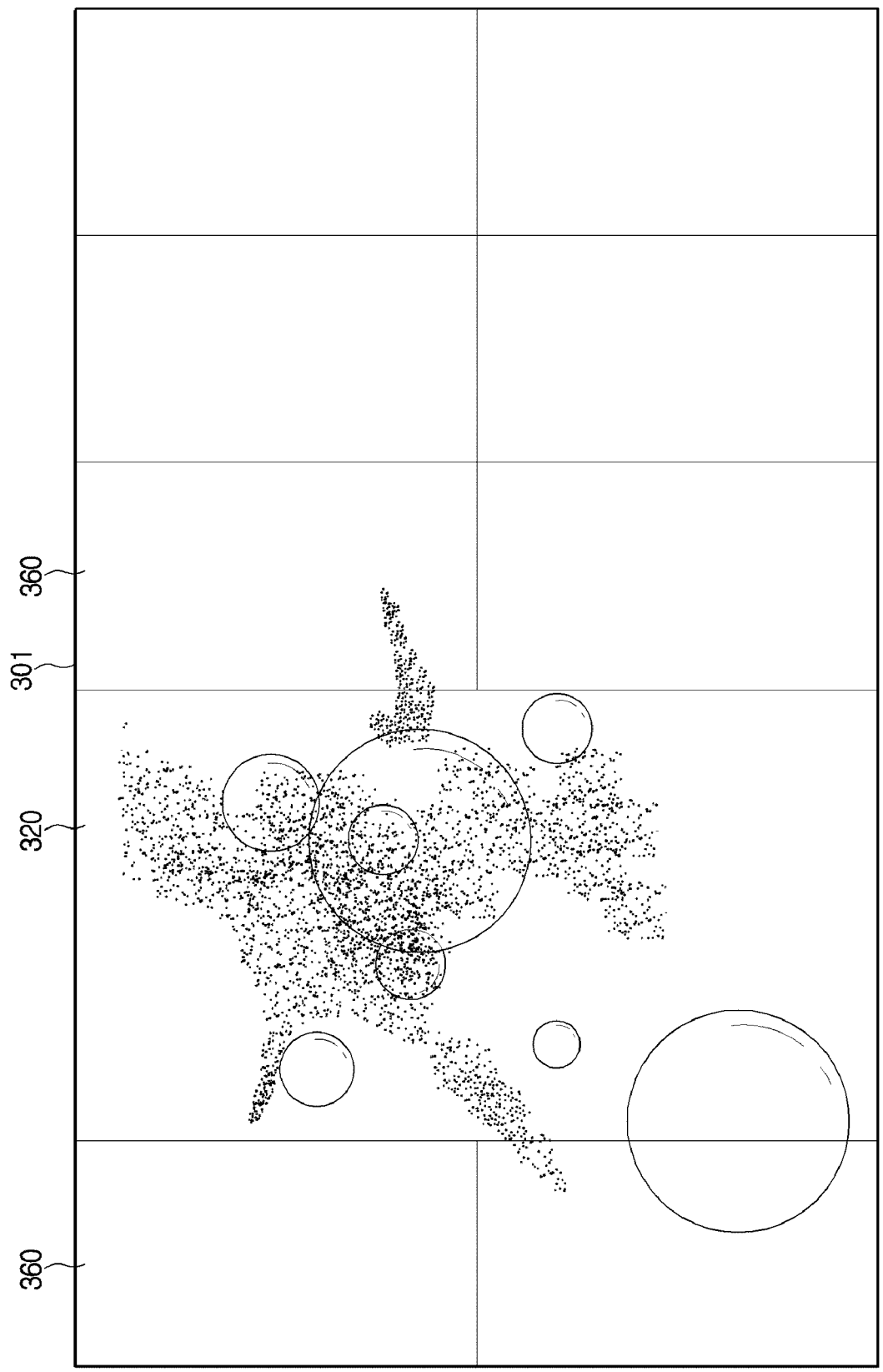

[Fig. 5c]
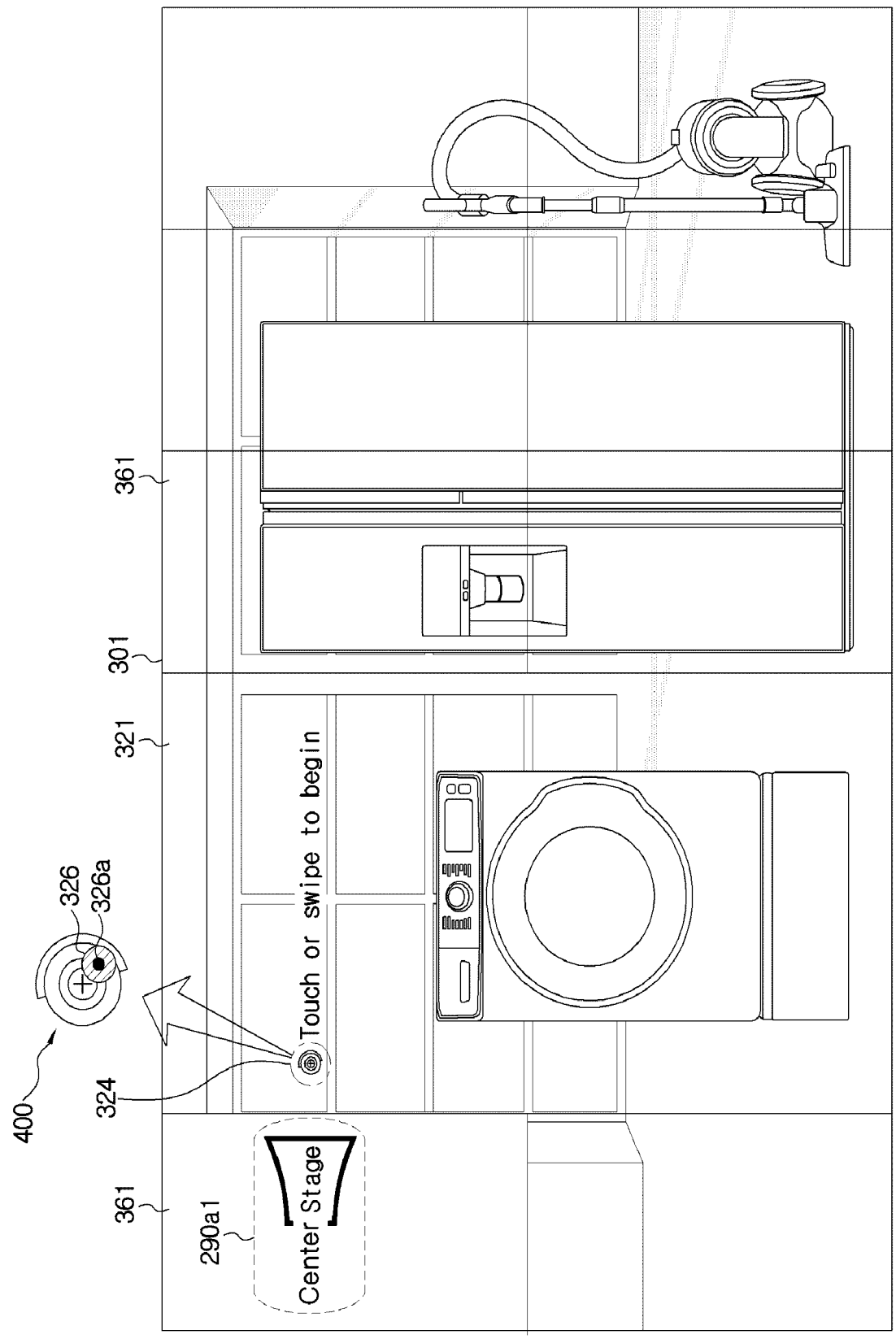

[Fig. 5d]
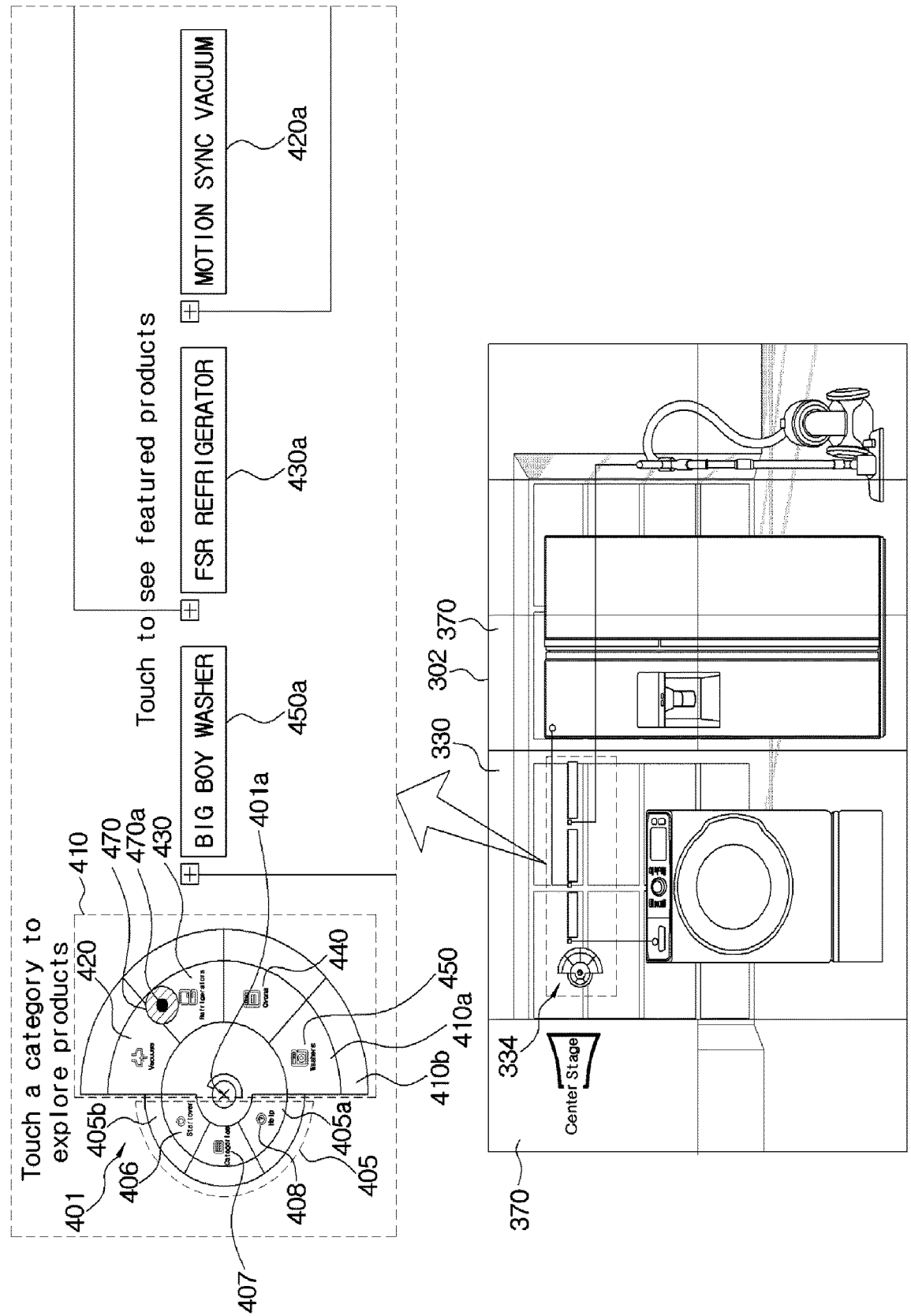

[Fig. 5e]
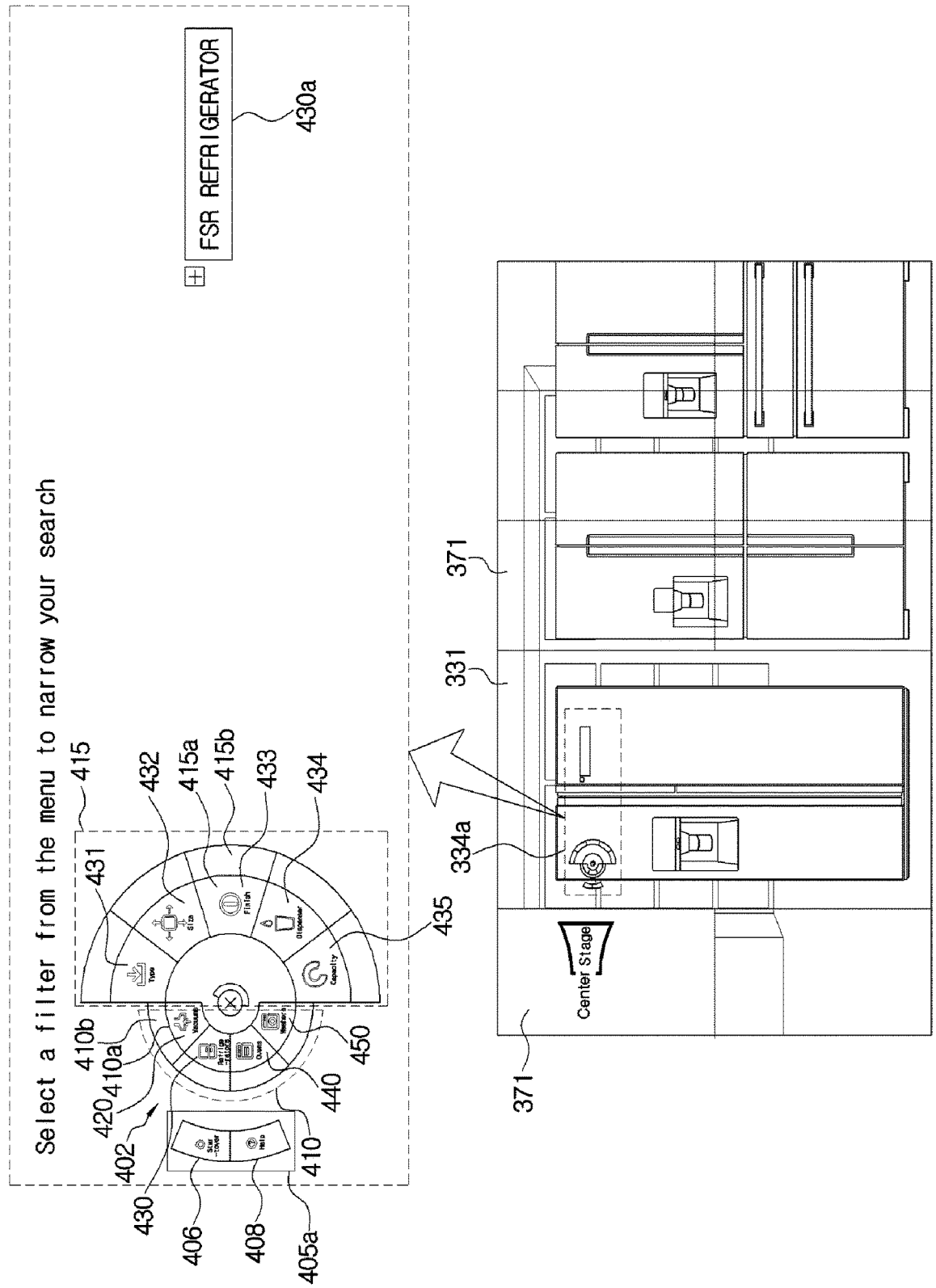

[Fig. 5f]
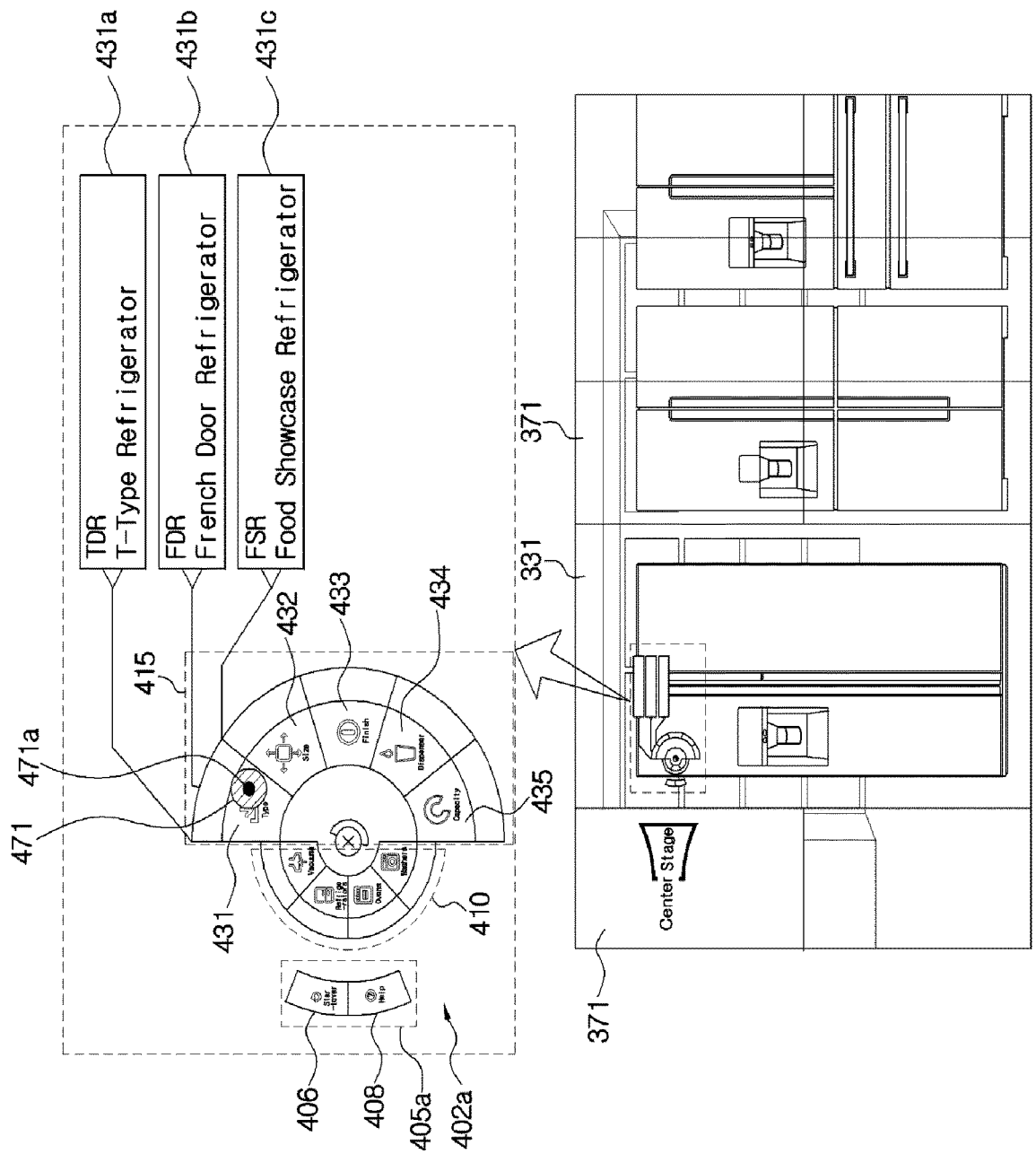

[Fig. 5g]
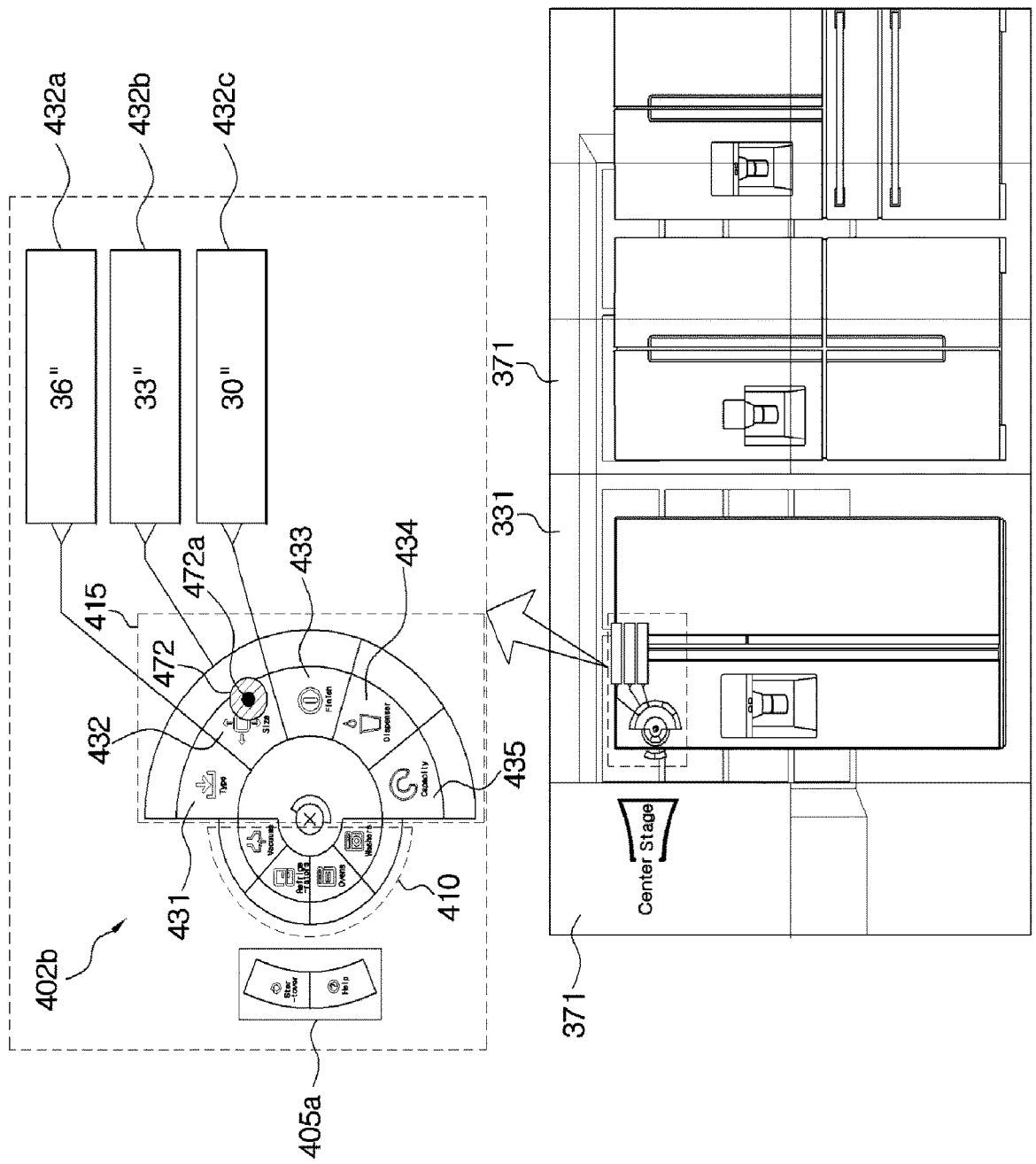

[Fig. 5h]
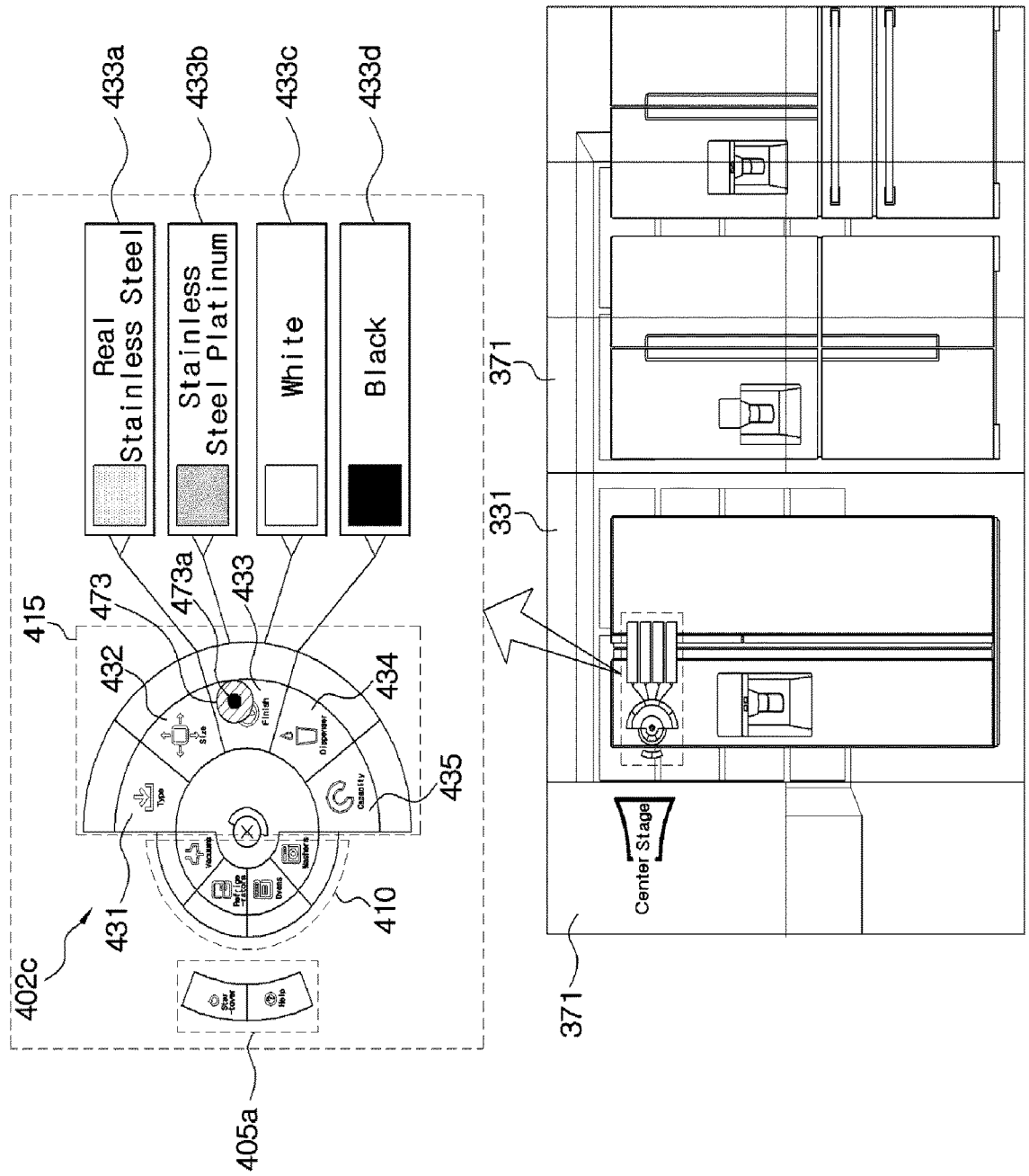

[Fig. 5i]
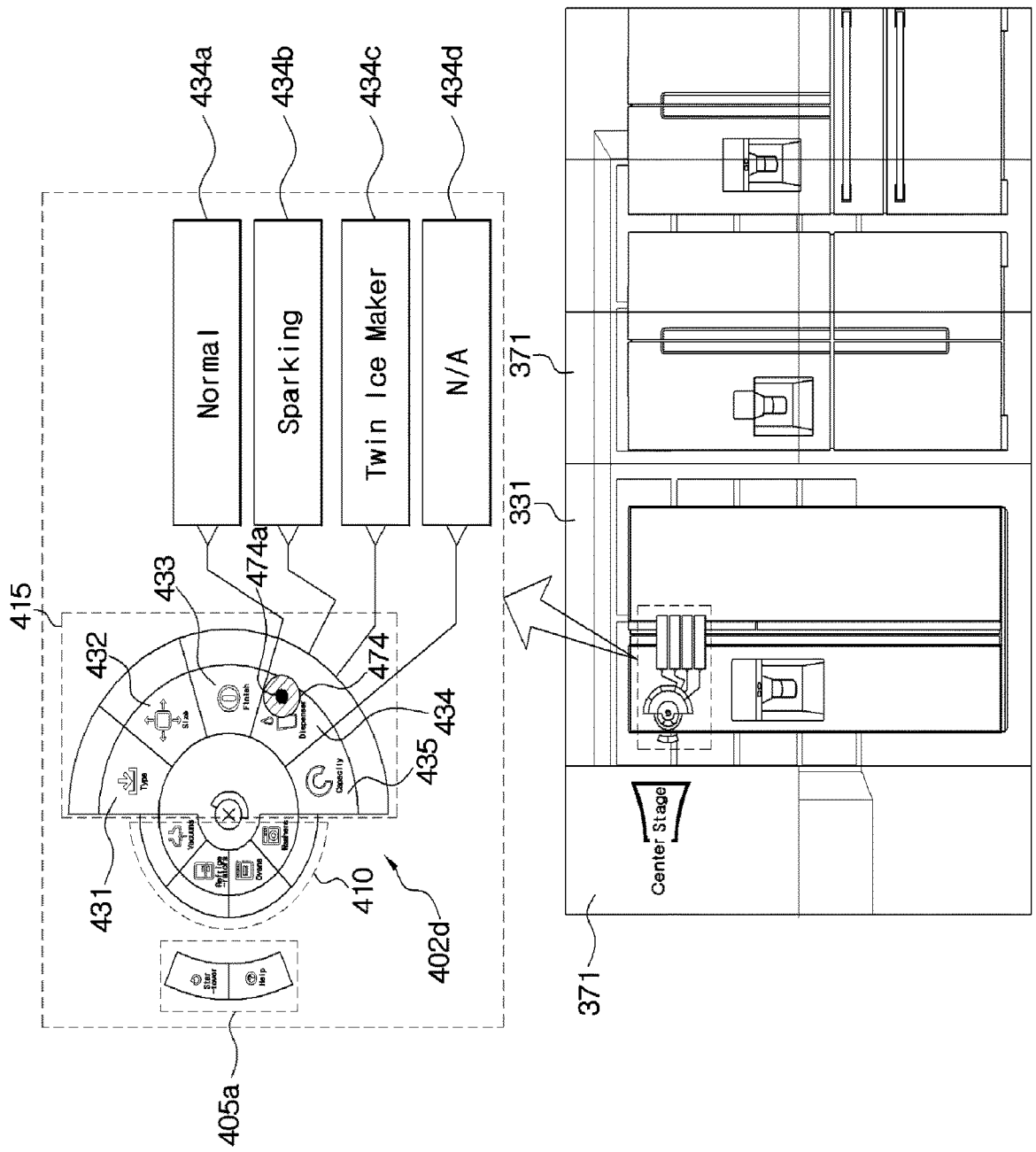

[Fig. 5j]
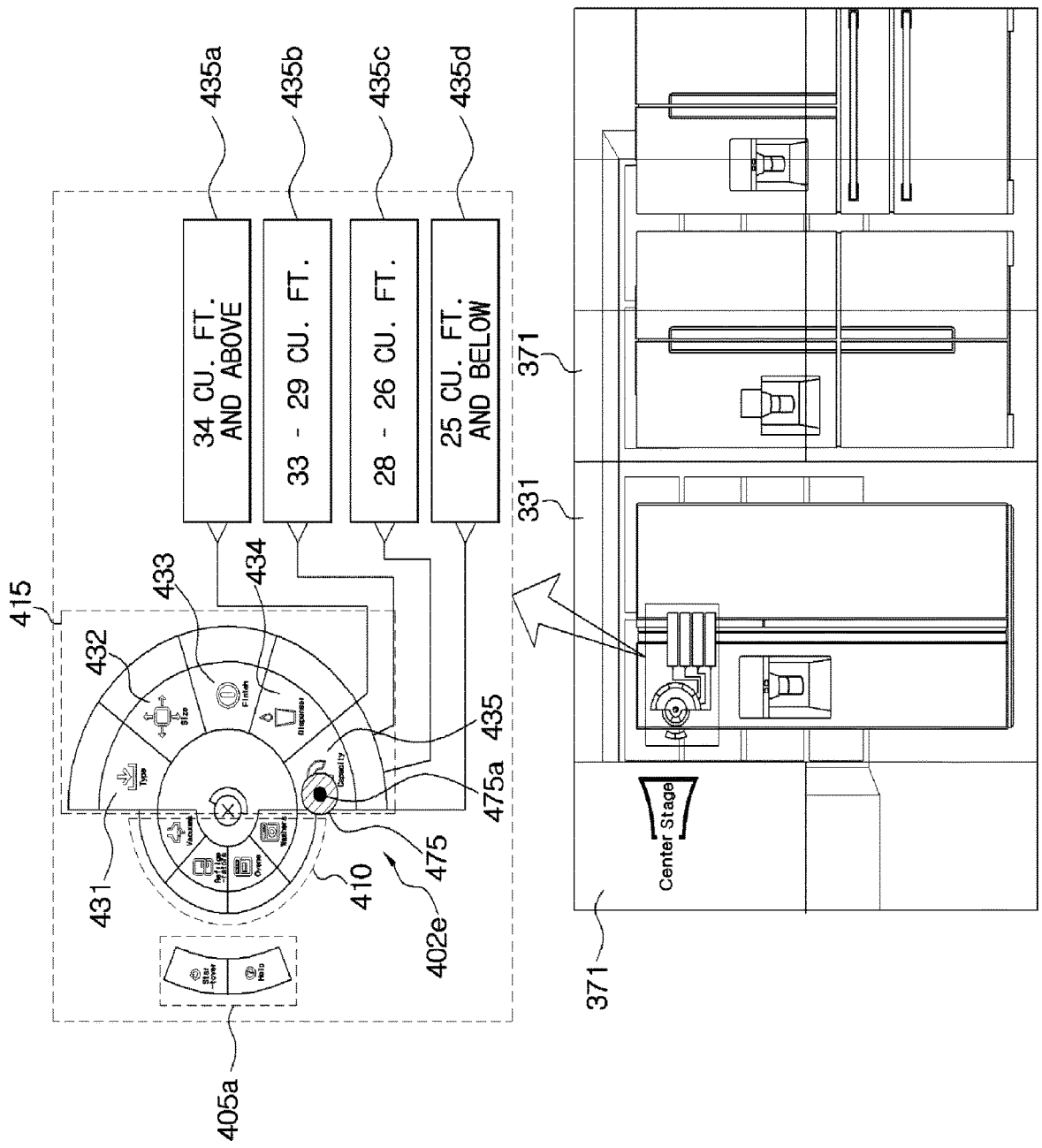

[Fig. 5k]
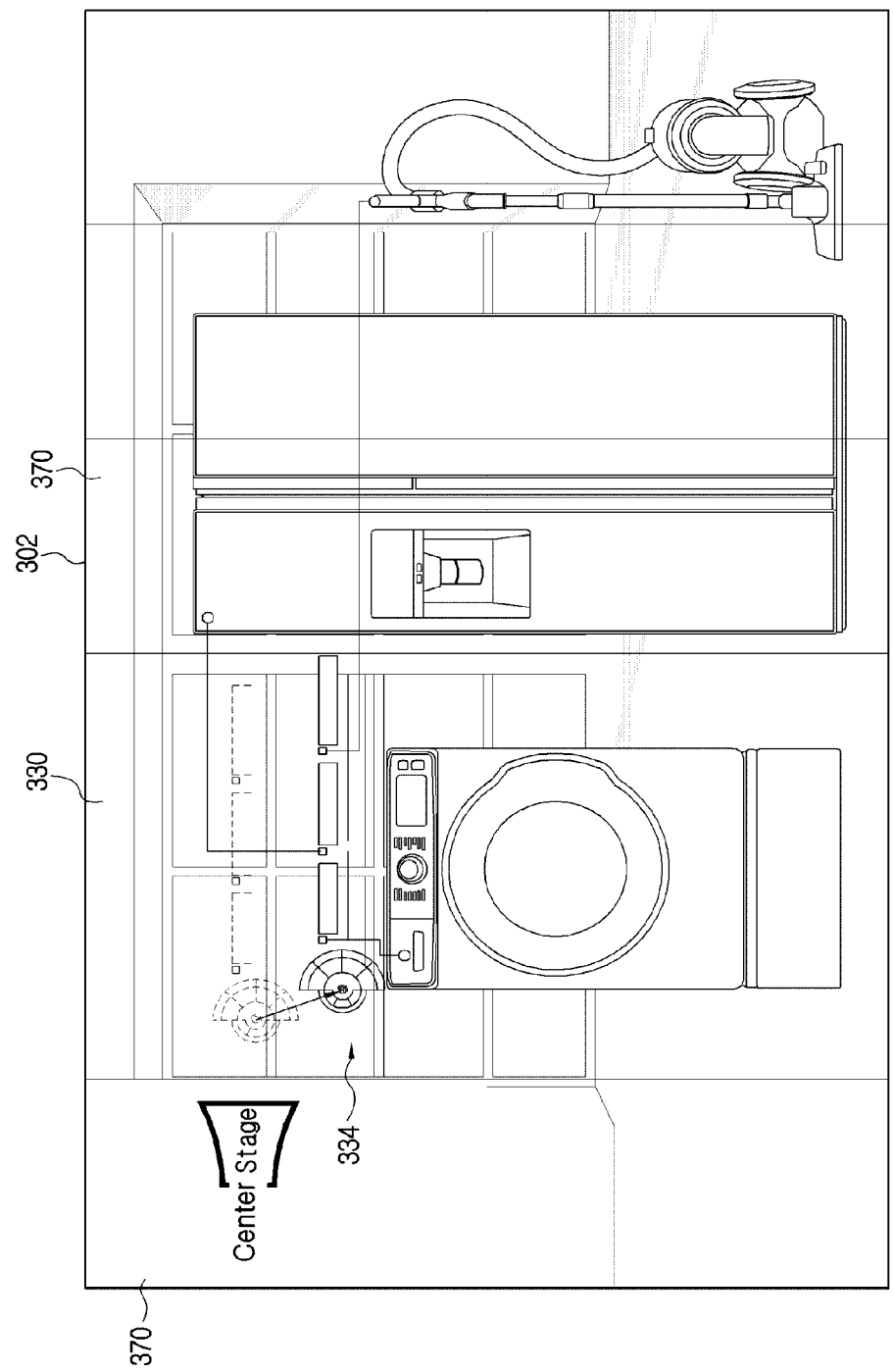

[Fig. 51]
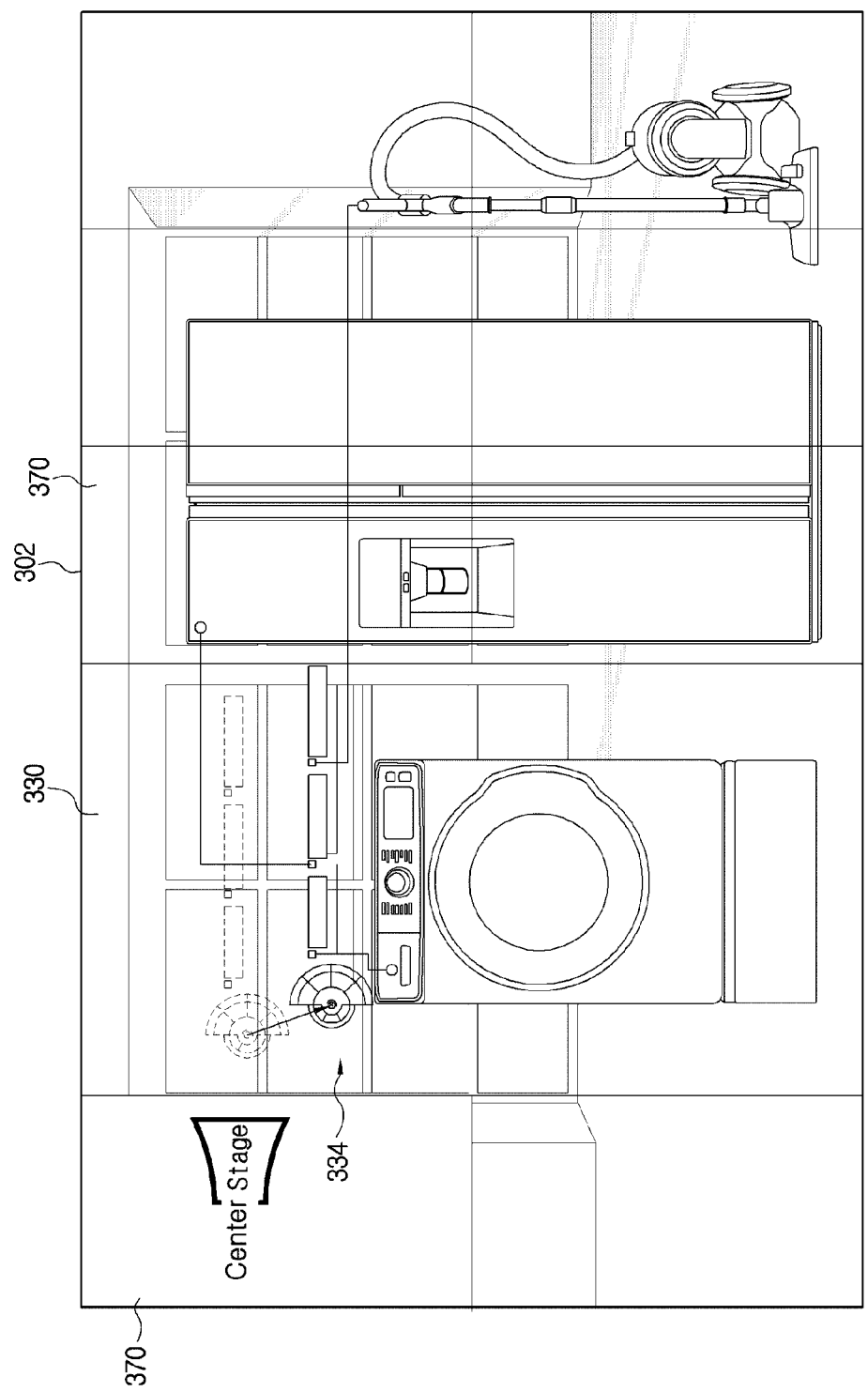

[Fig. 6a]
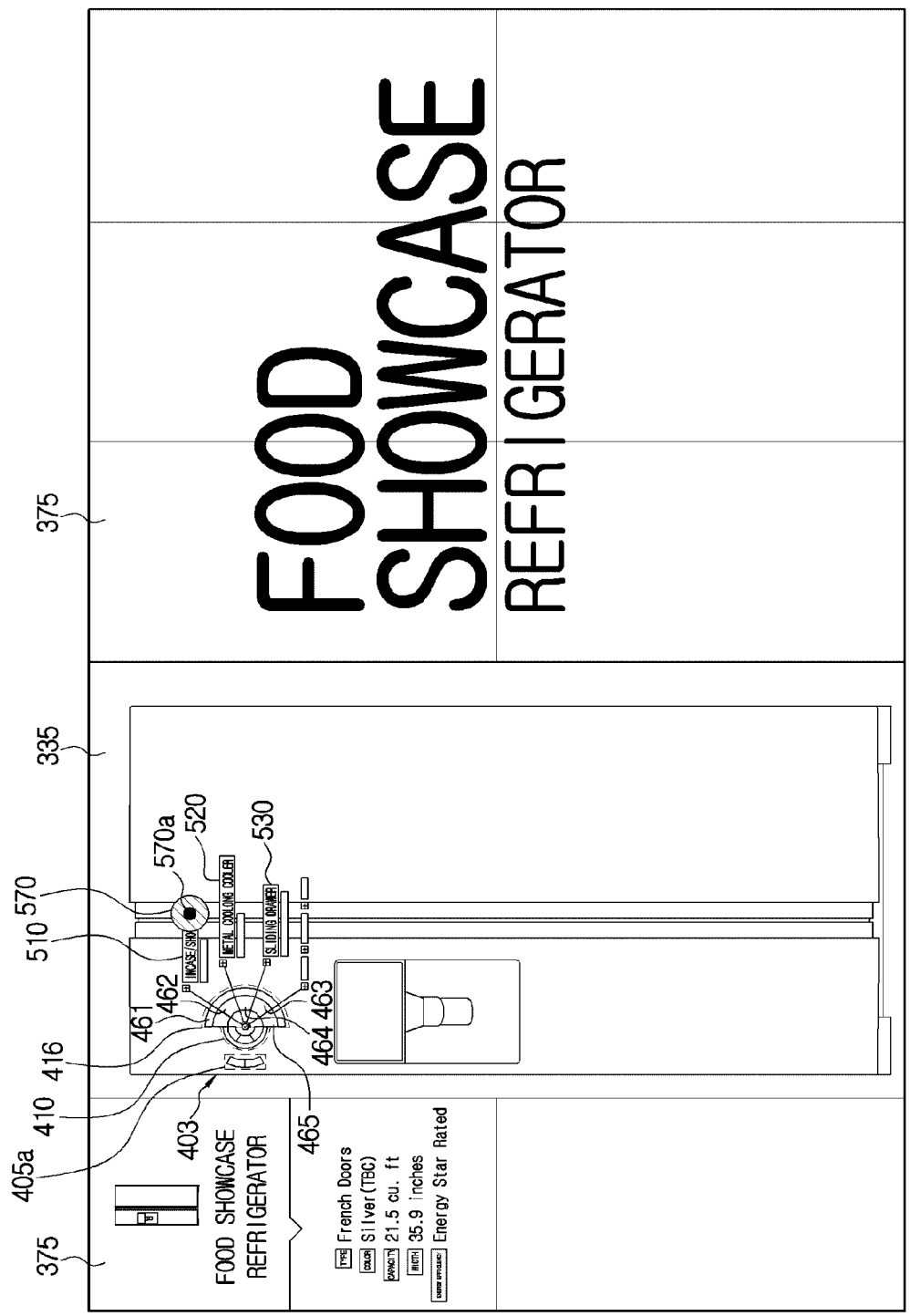

[Fig. 6b]
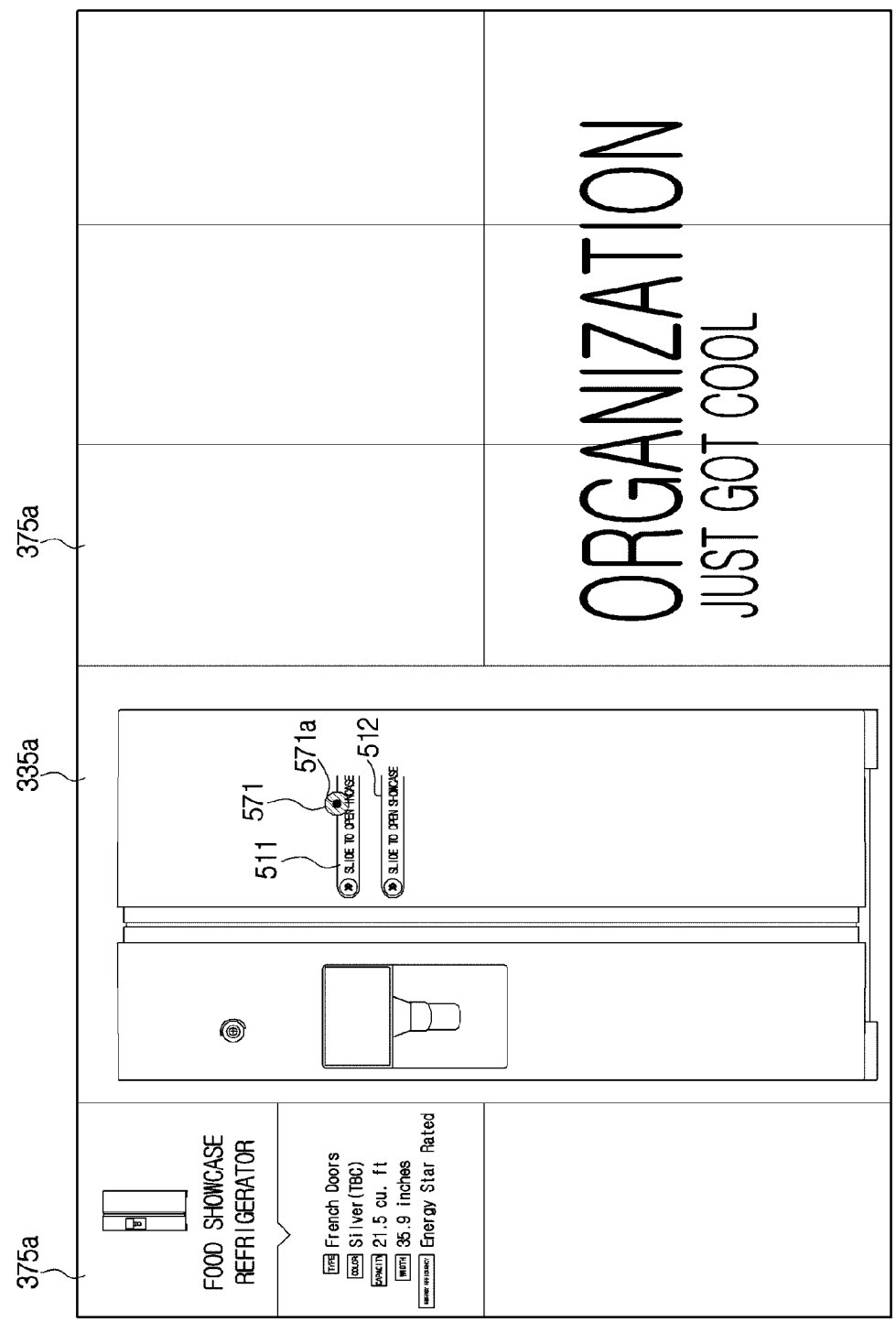

[Fig. 6c]
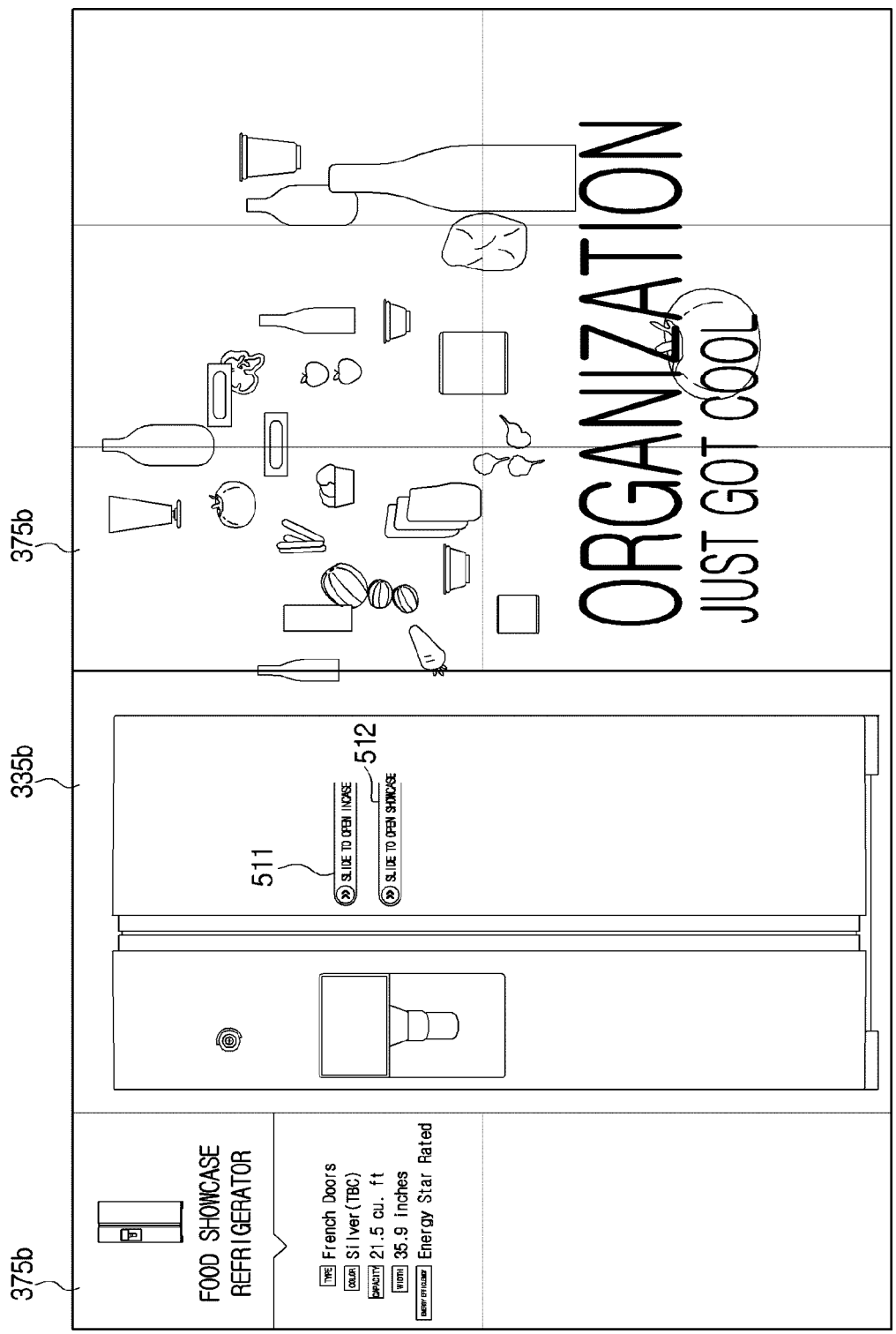

[Fig. 6d]
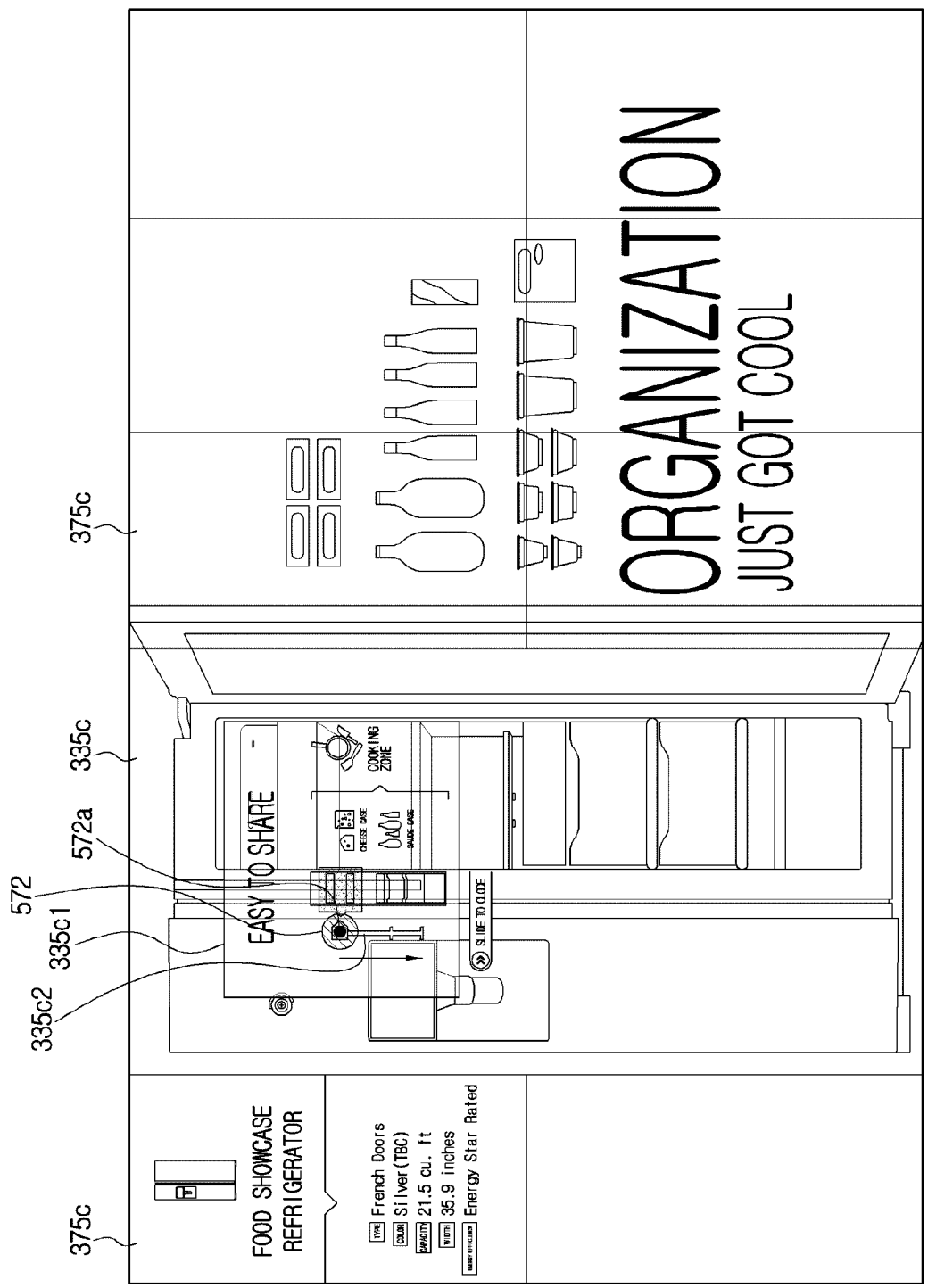

[Fig. 6e]
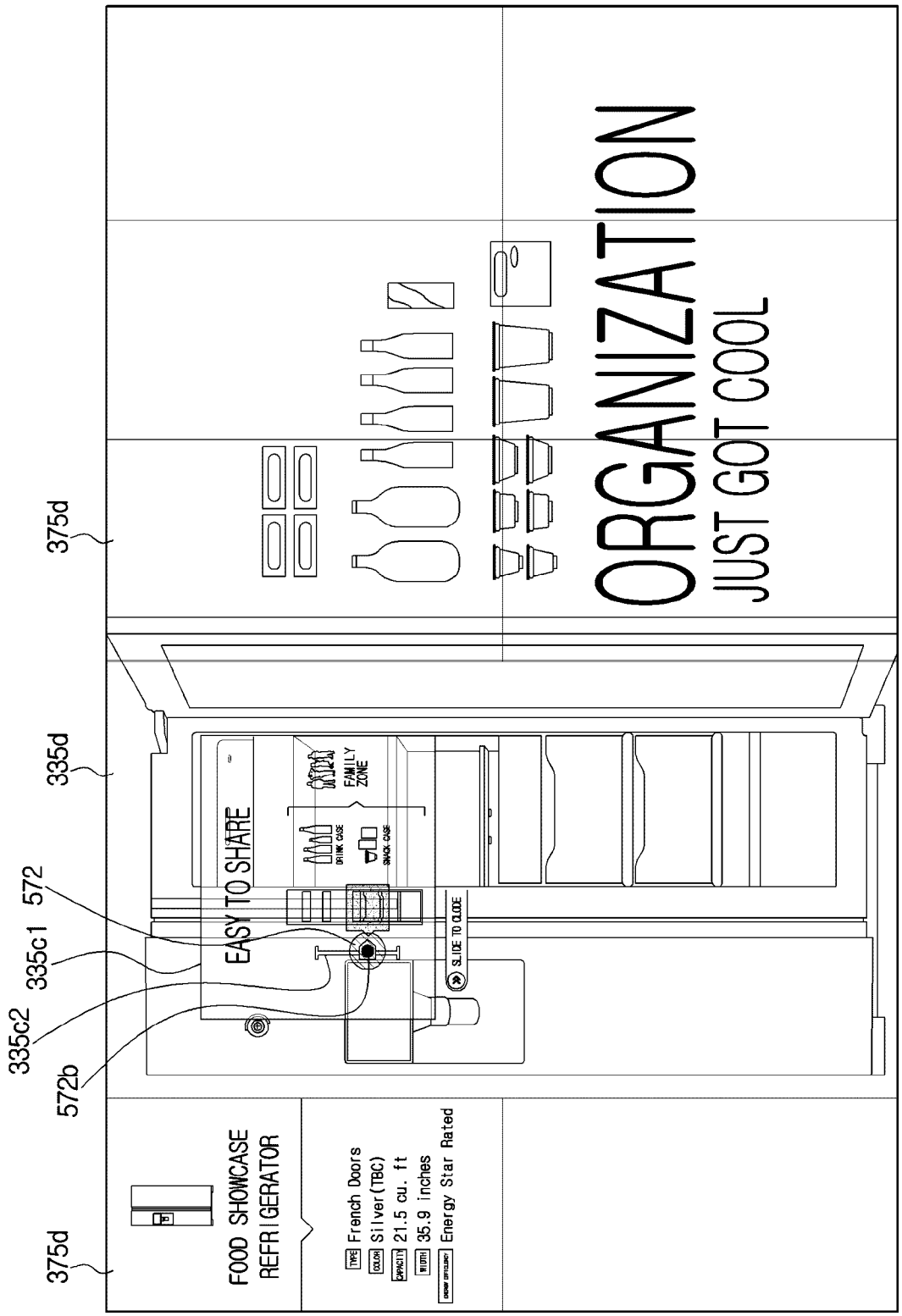

[Fig. 6f]
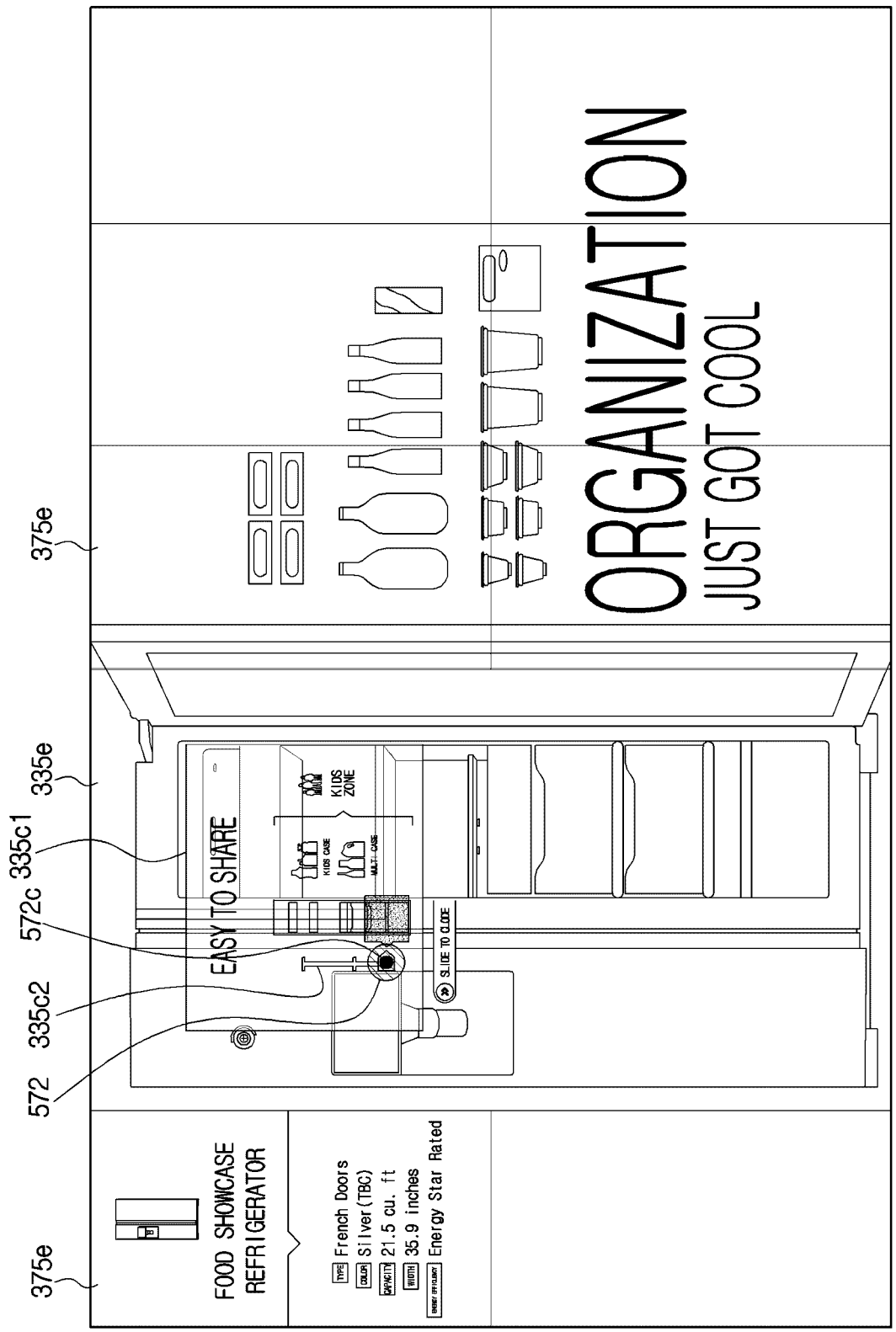

[Fig. 6g]
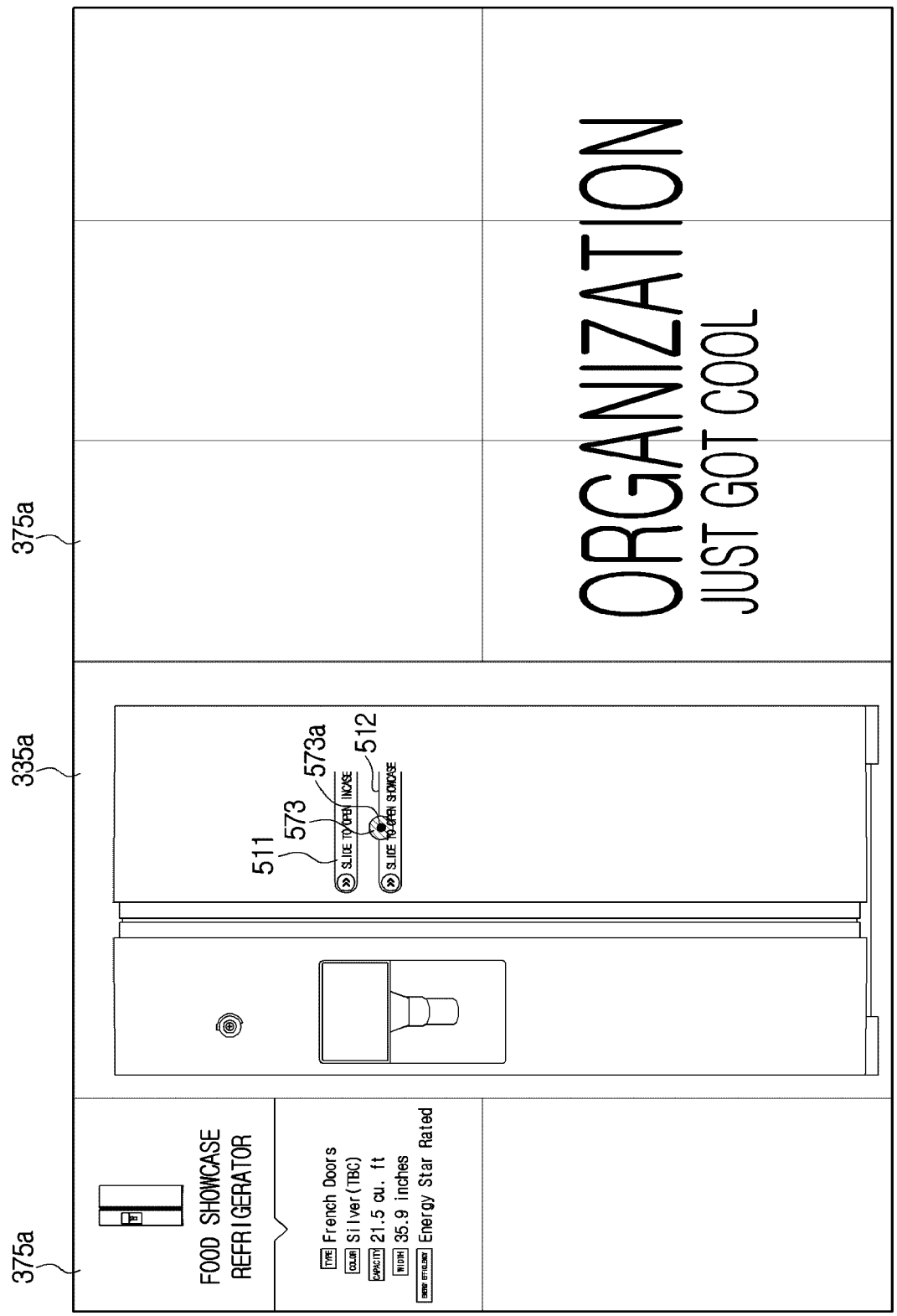

[Fig. 6h]
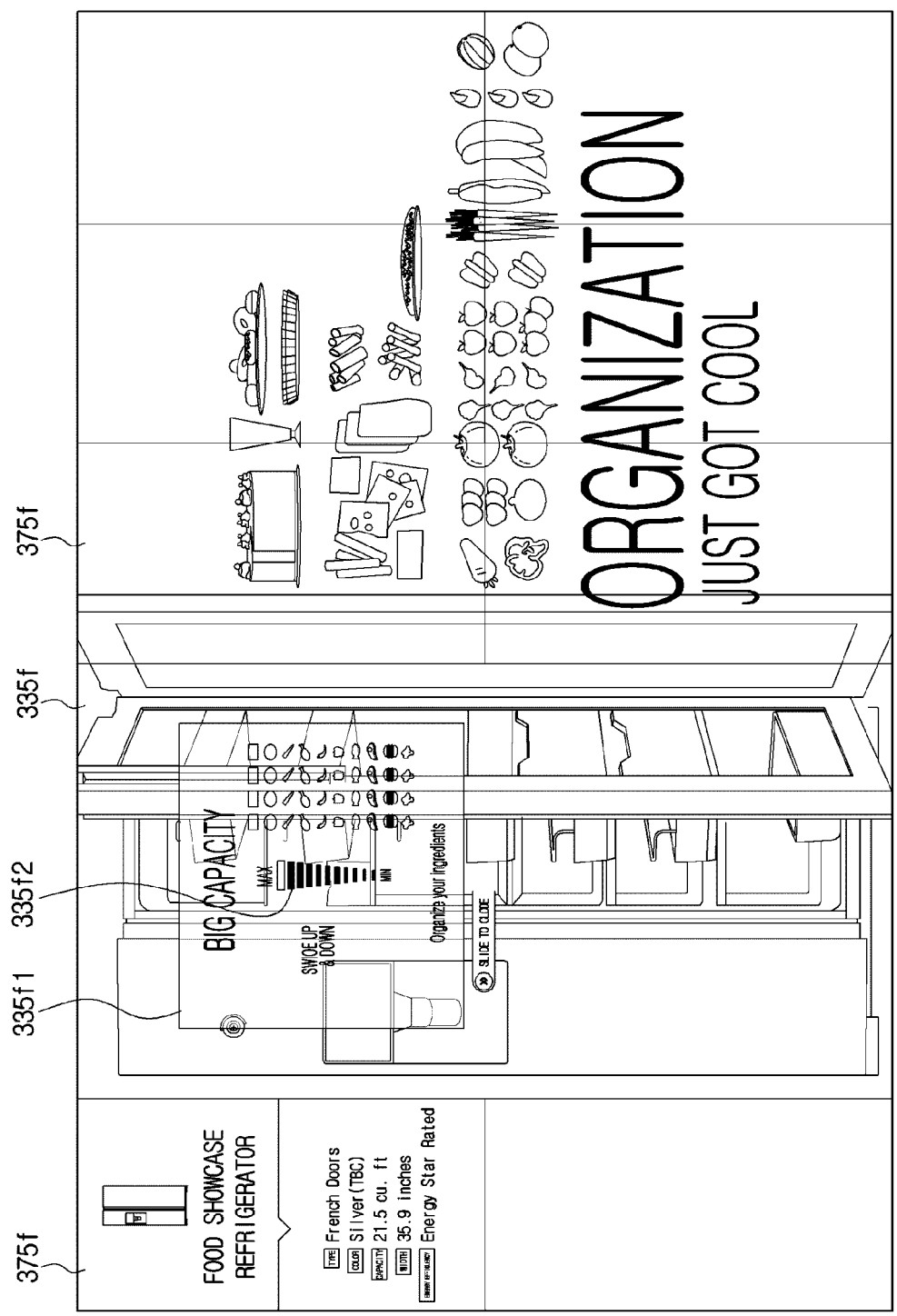

[Fig. 6i]
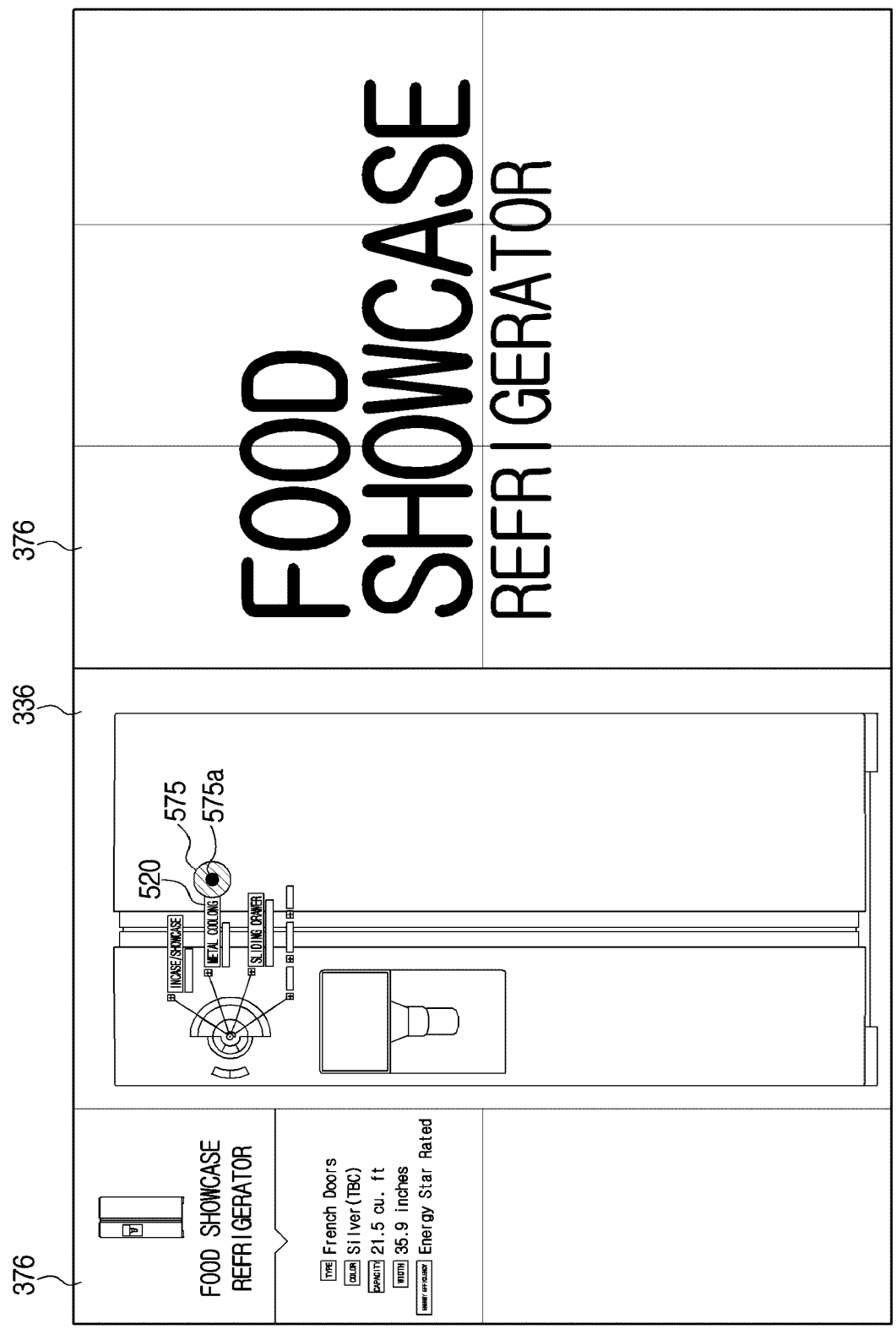

[Fig. 6j]
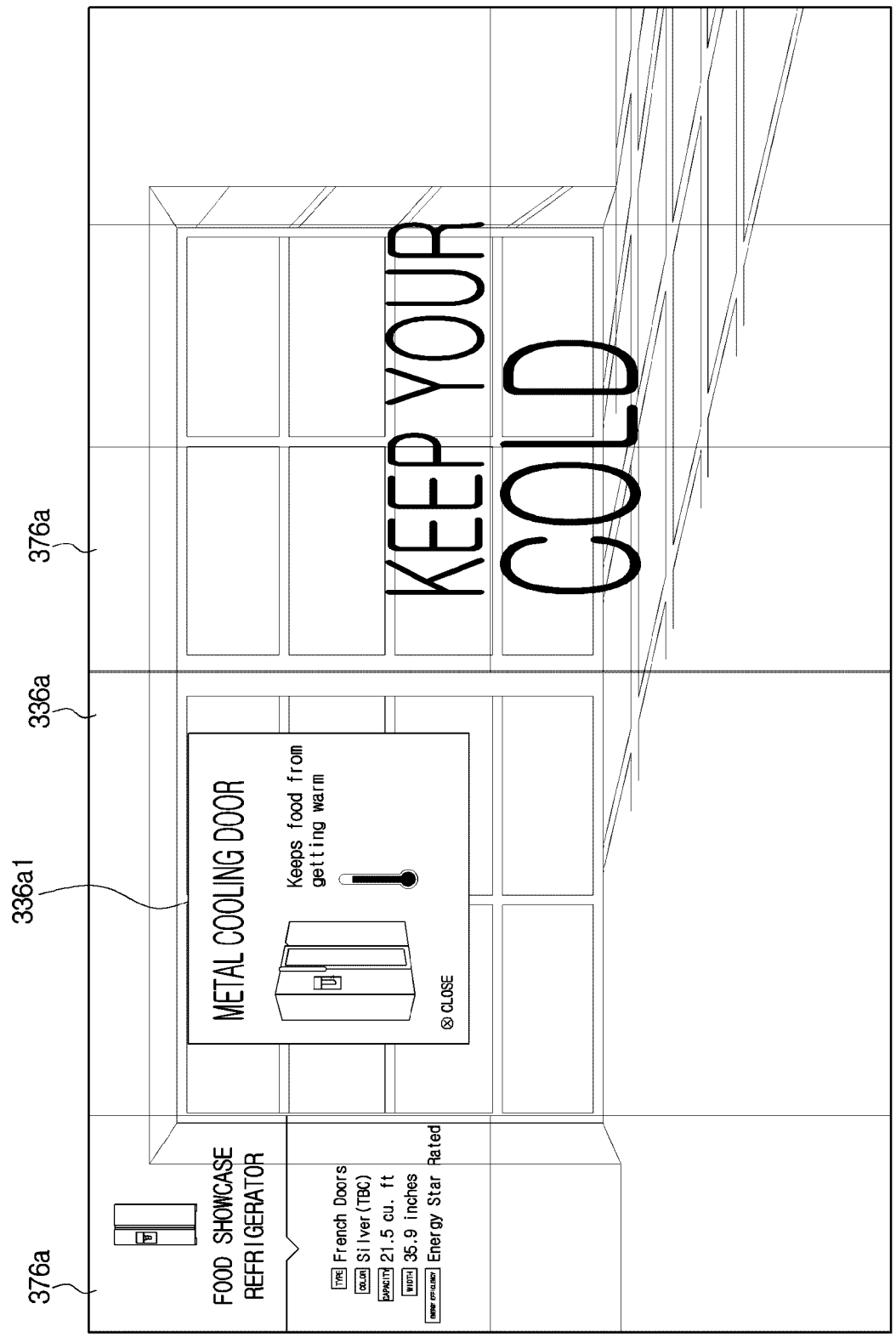

[Fig. 6k]
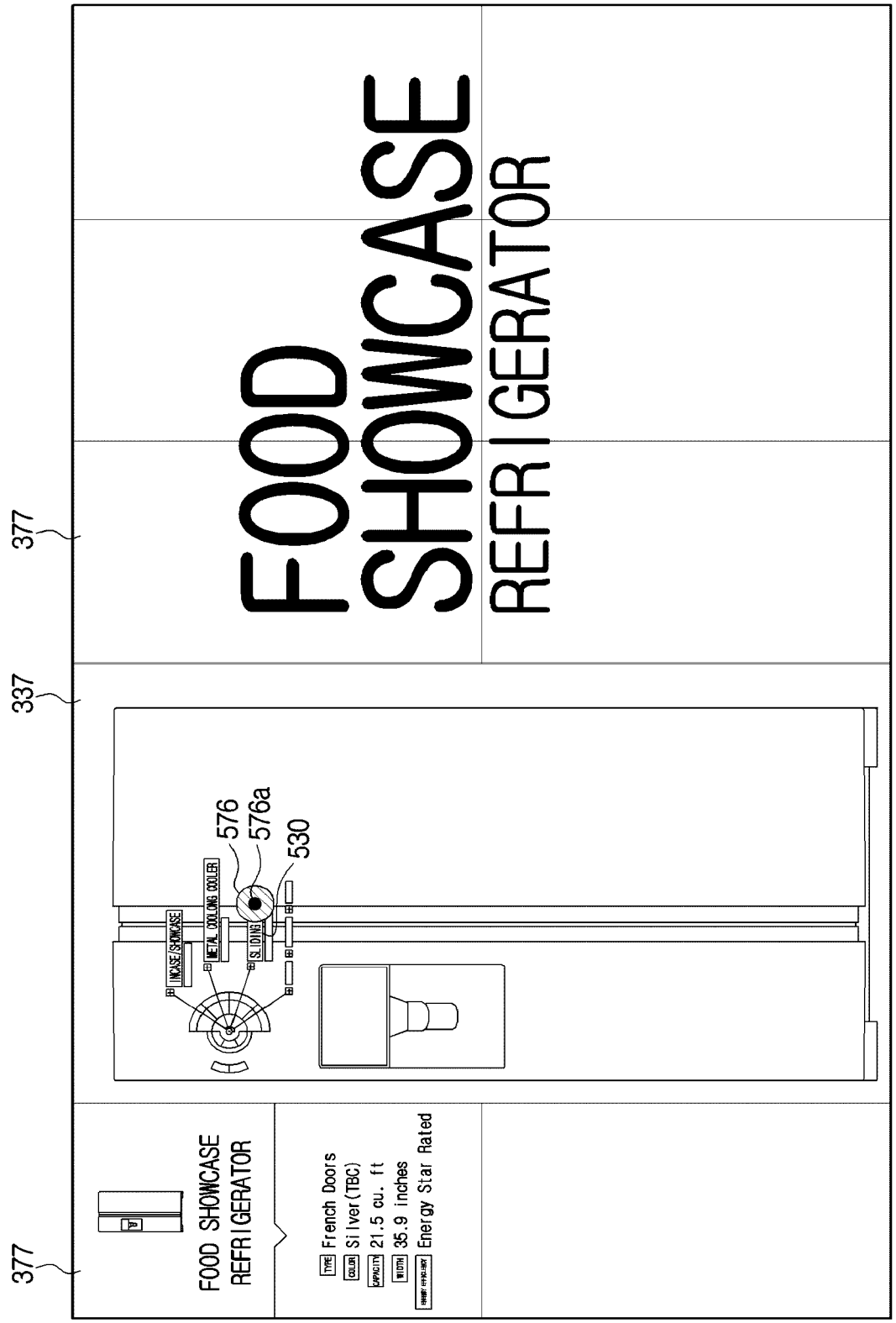

[Fig. 61]
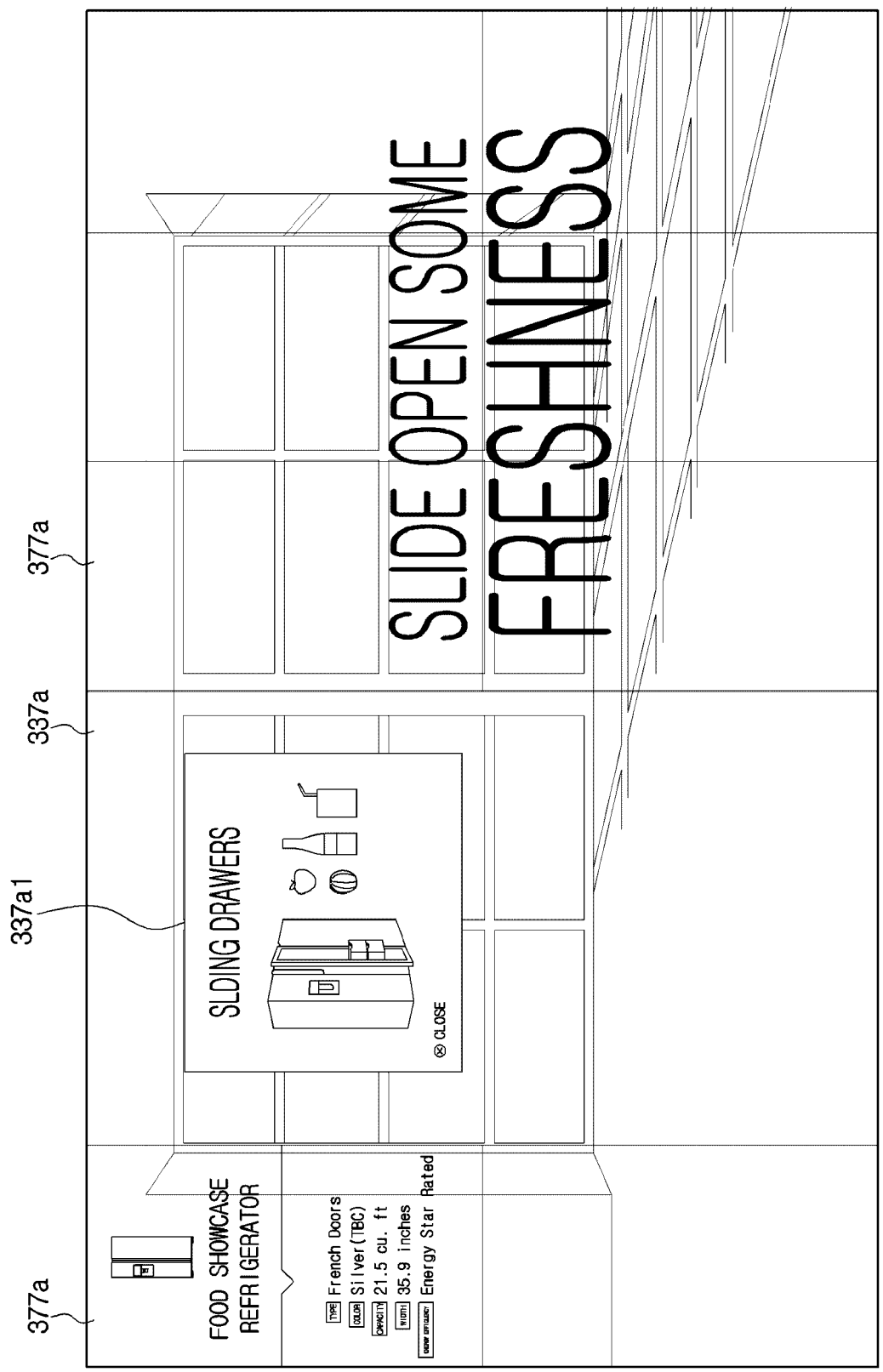

[Fig. 7a]
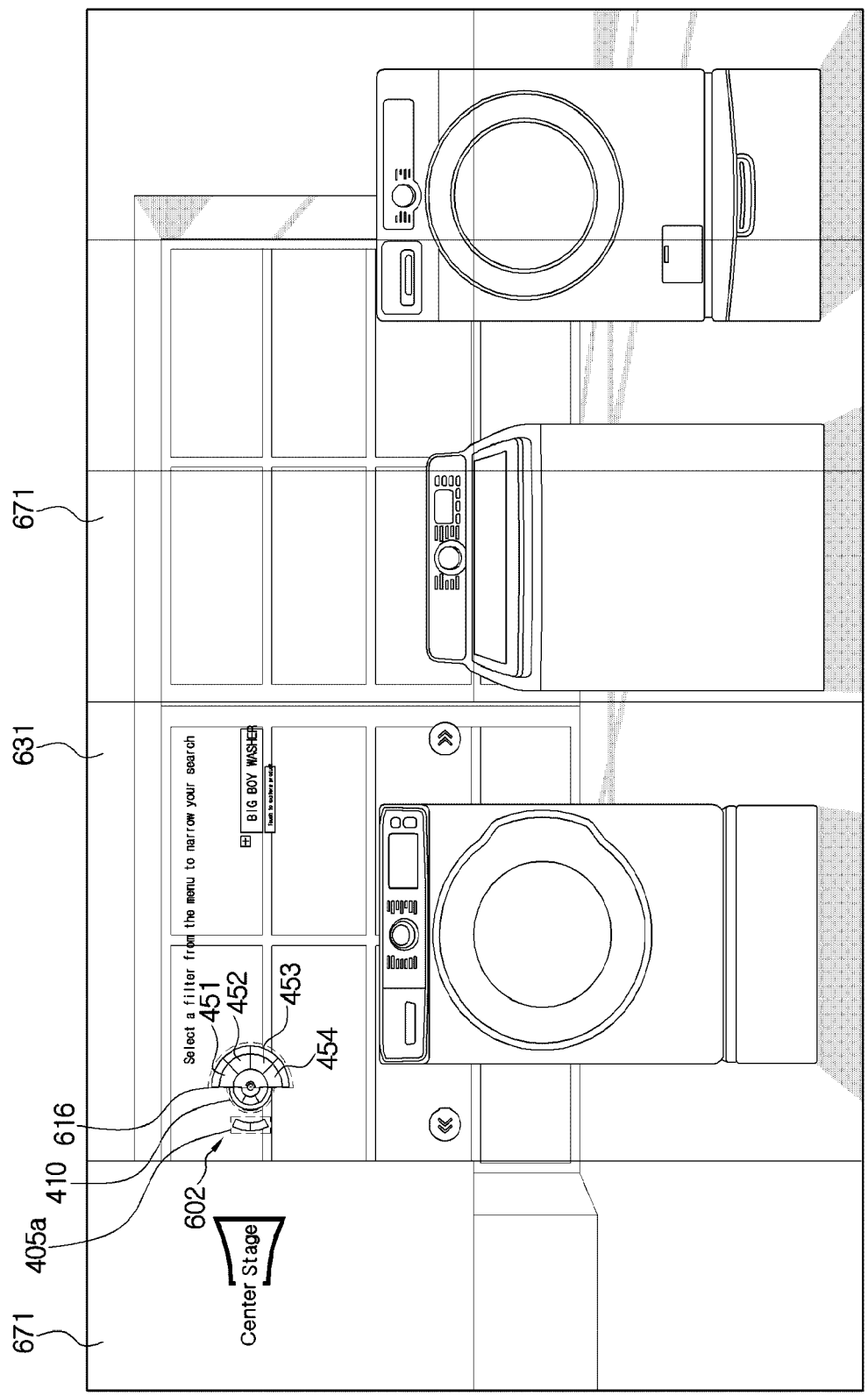

[Fig. 7b]
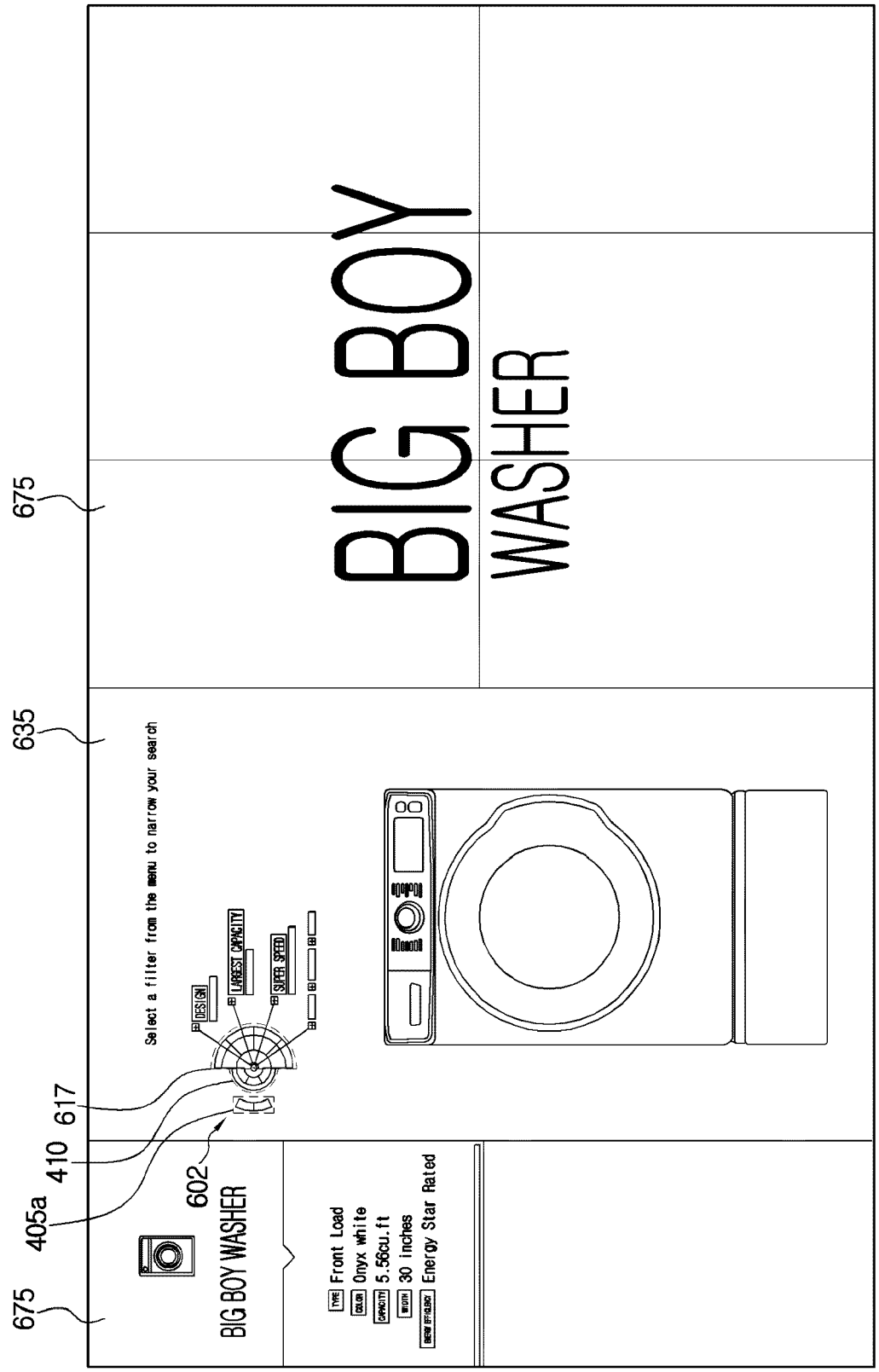

[Fig. 7c]
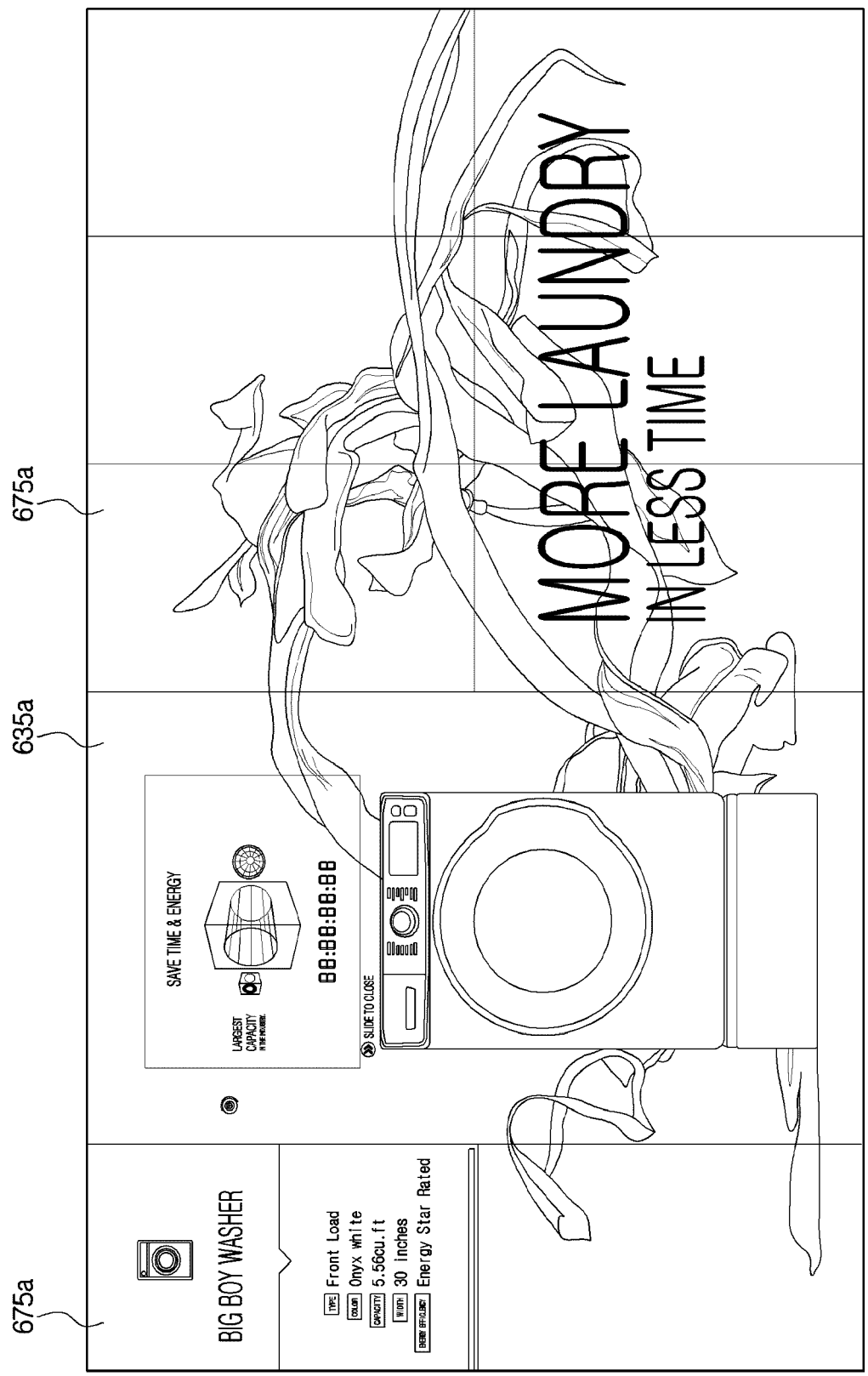

[Fig. 8a]
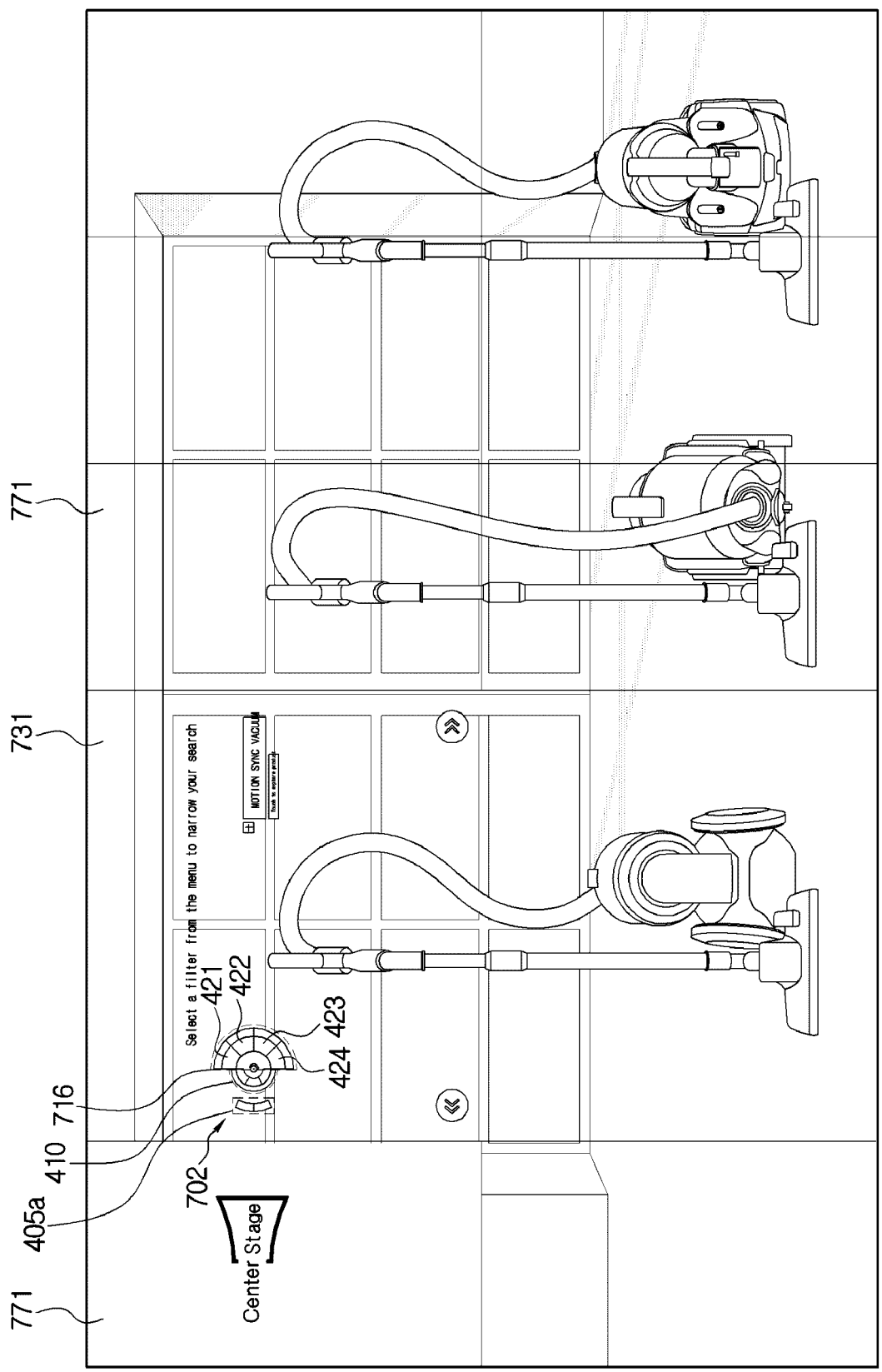

[Fig. 8b]
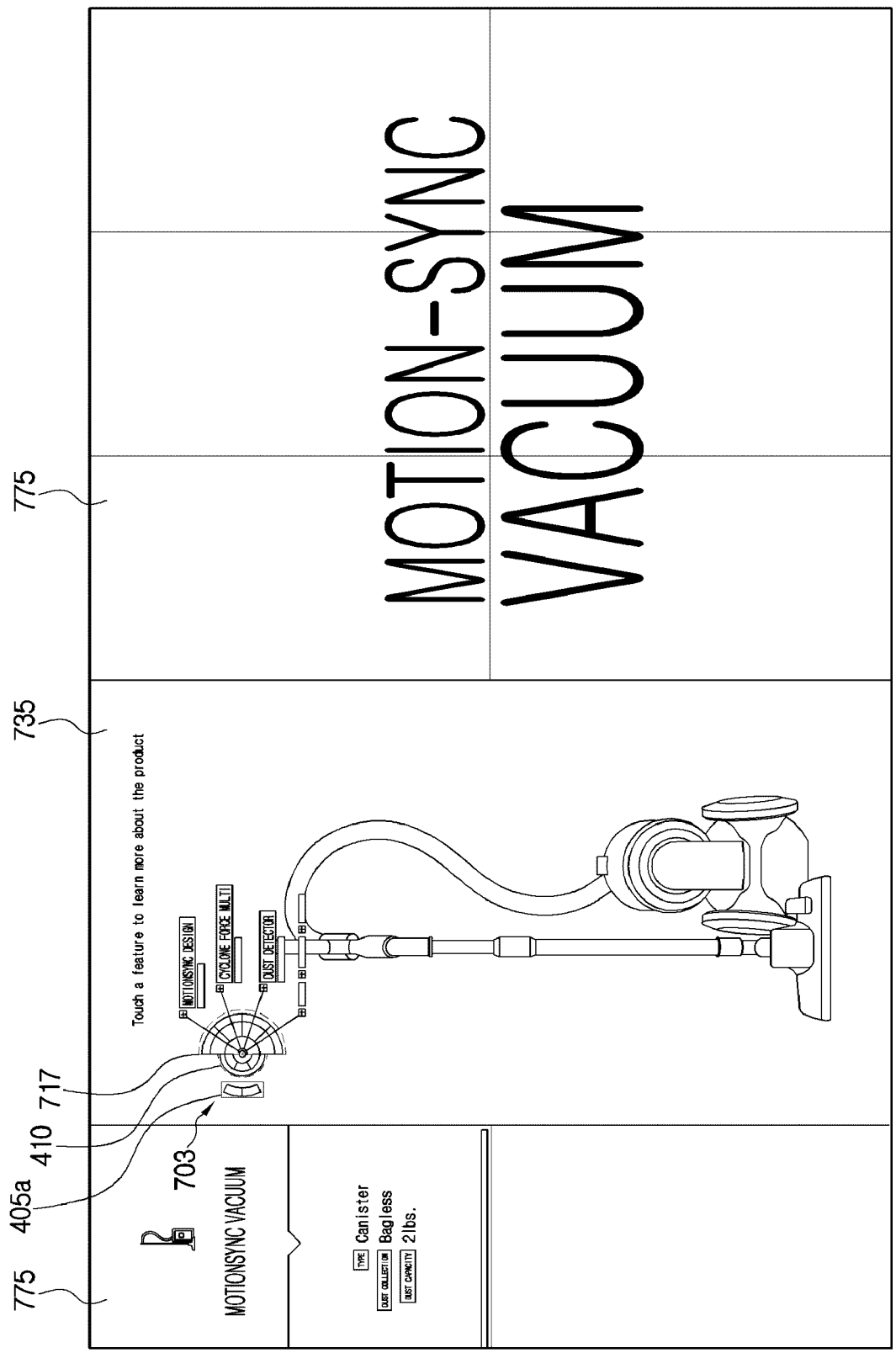

[Fig. 8c]
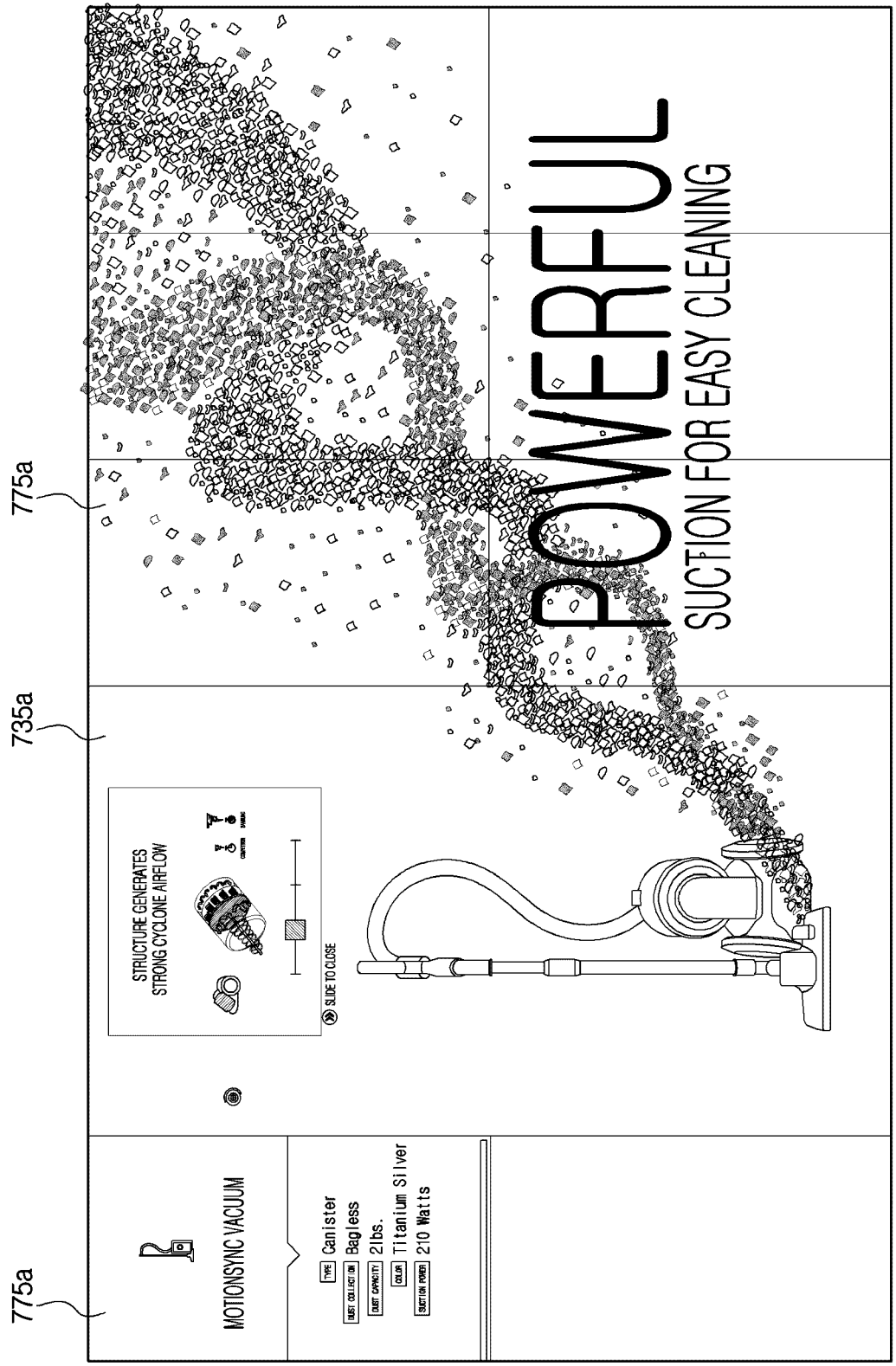

[Fig. 9]
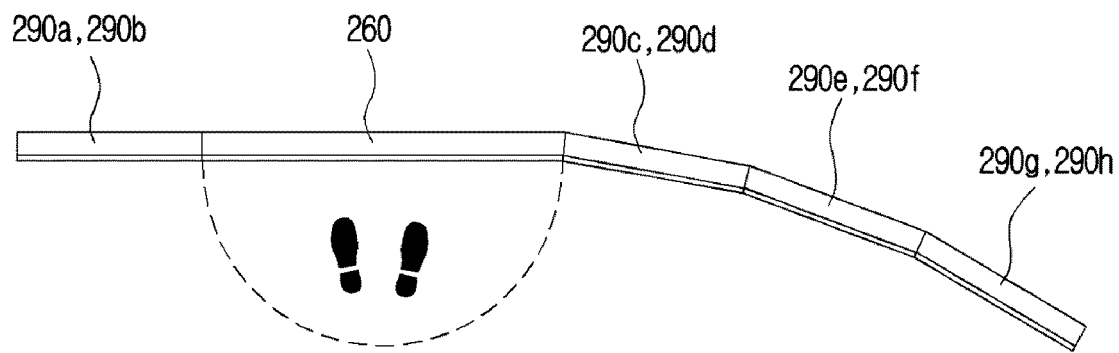
[Fig. 10]
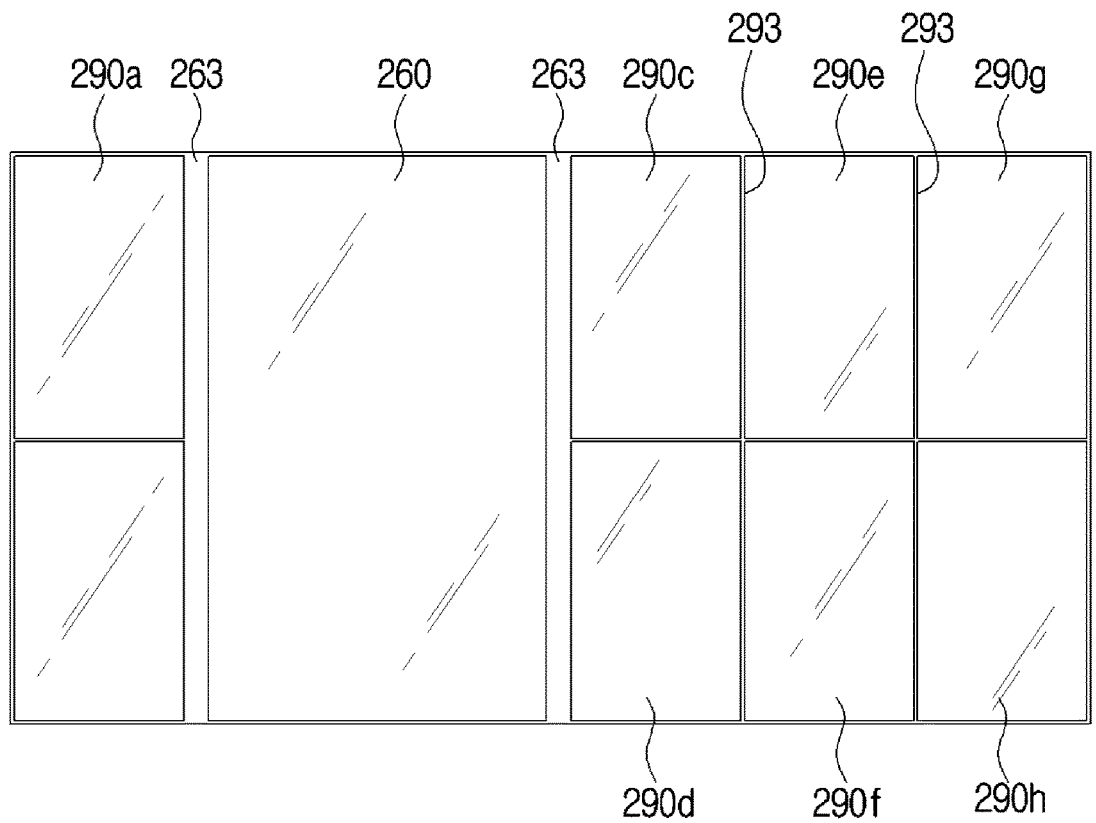

[Fig. 11]
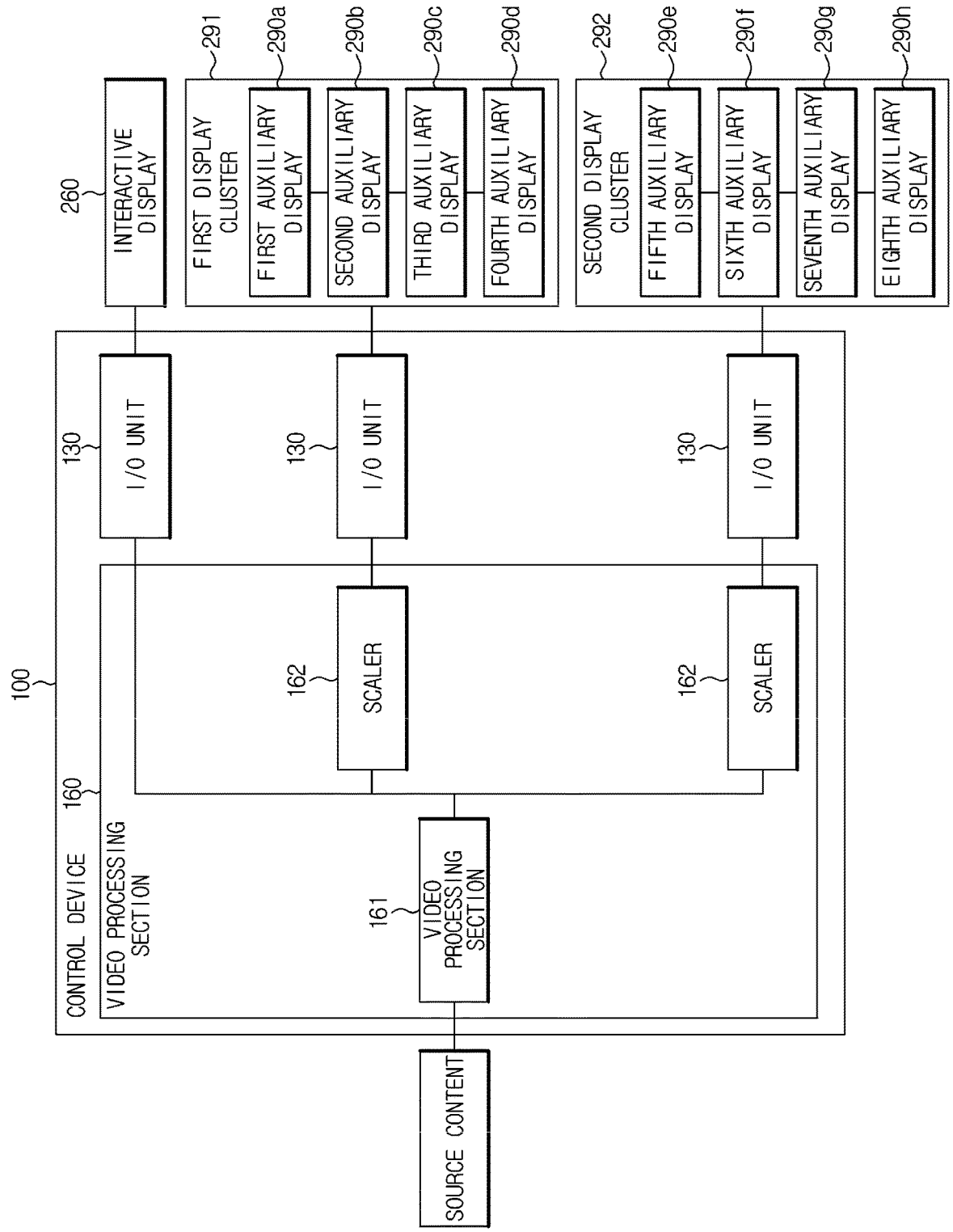

[Fig. 12]
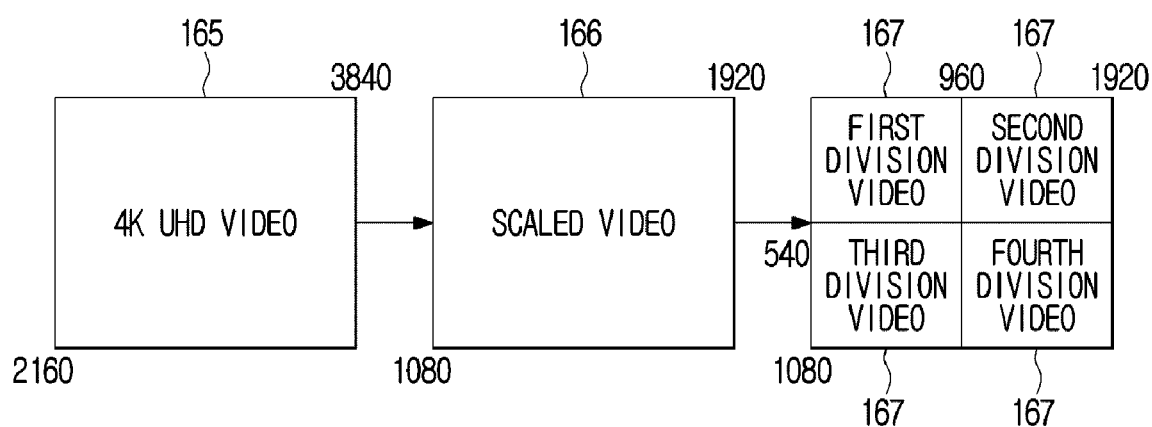

[Fig. 13]
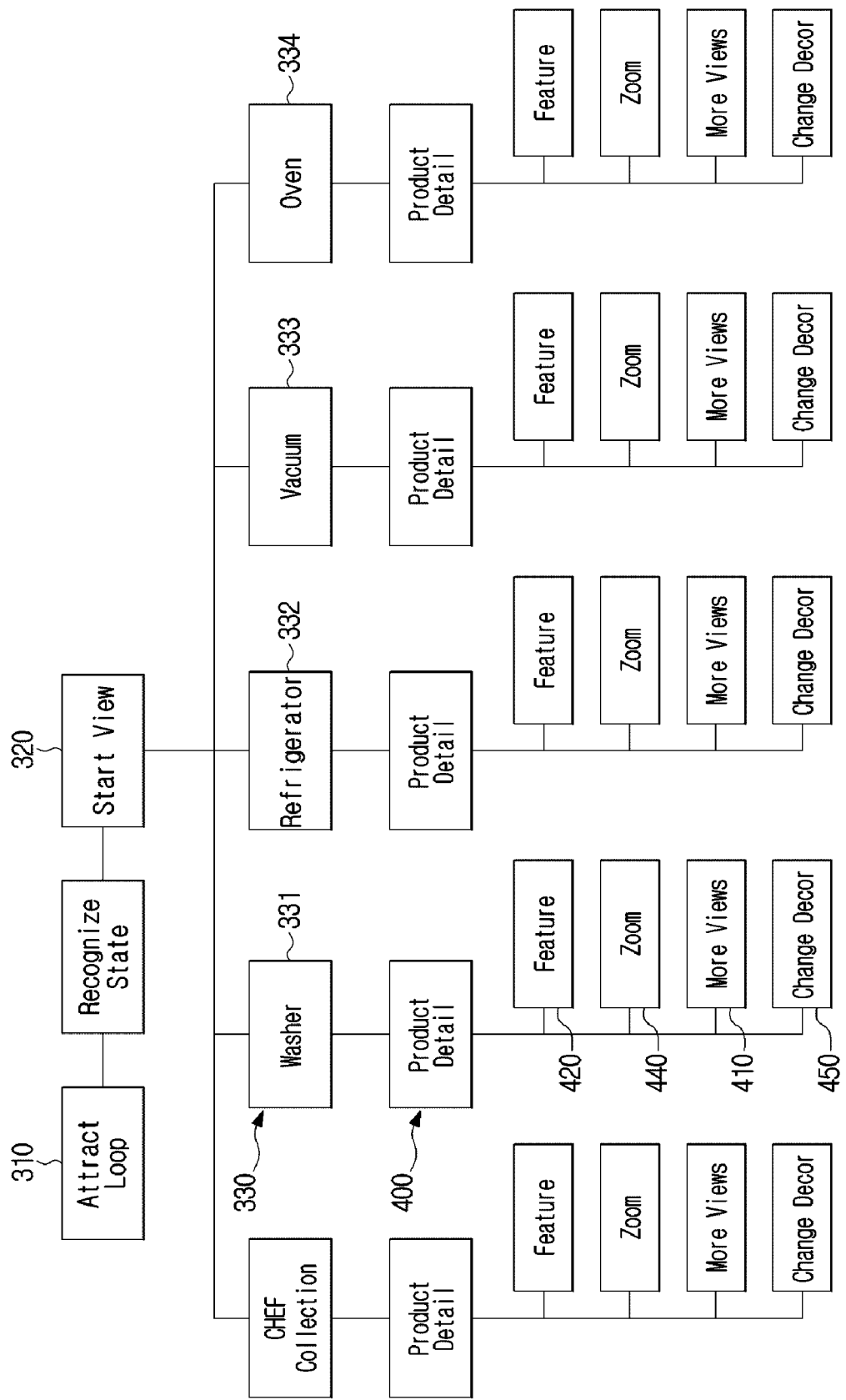

[Fig. 14]
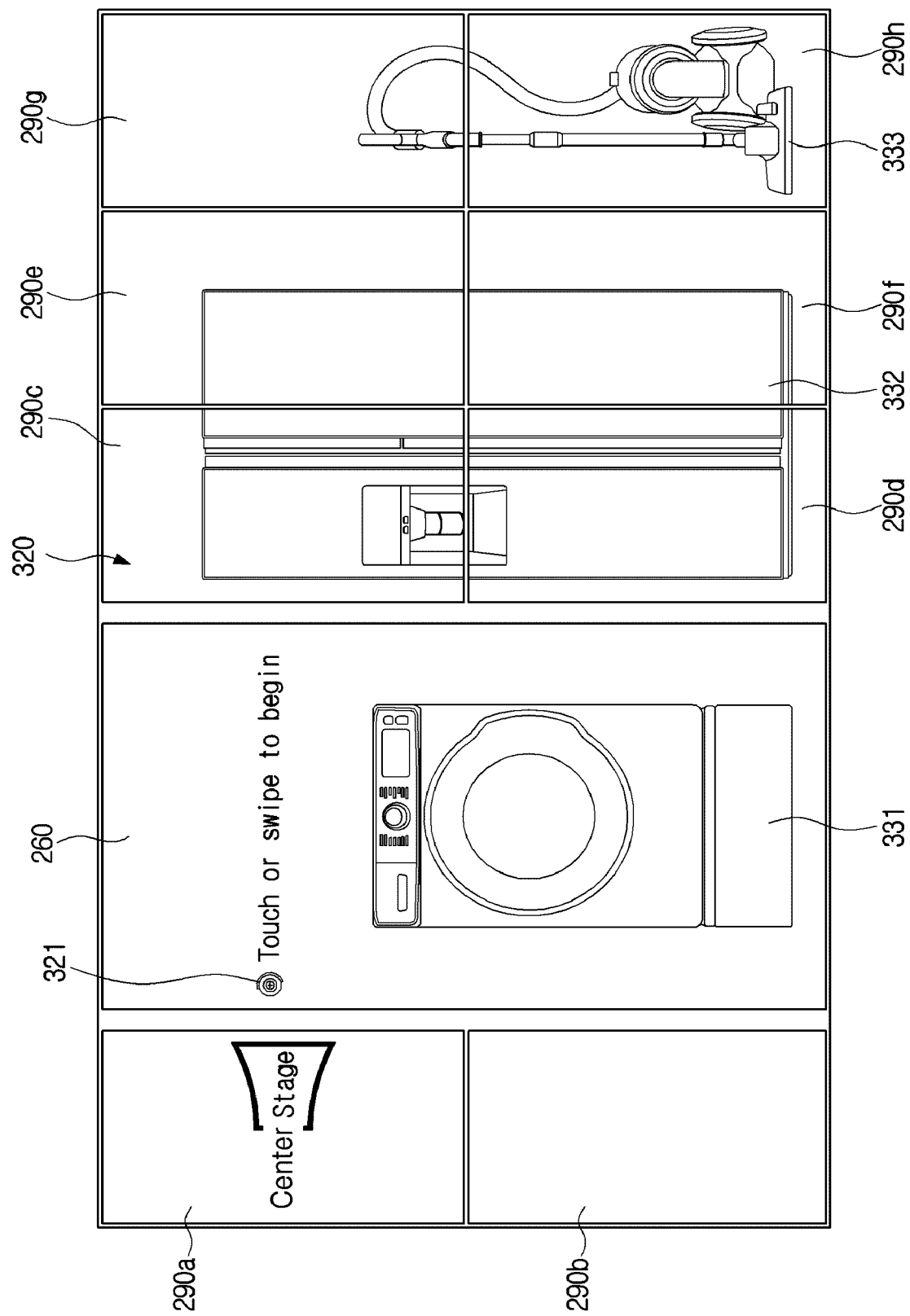

[Fig. 15]
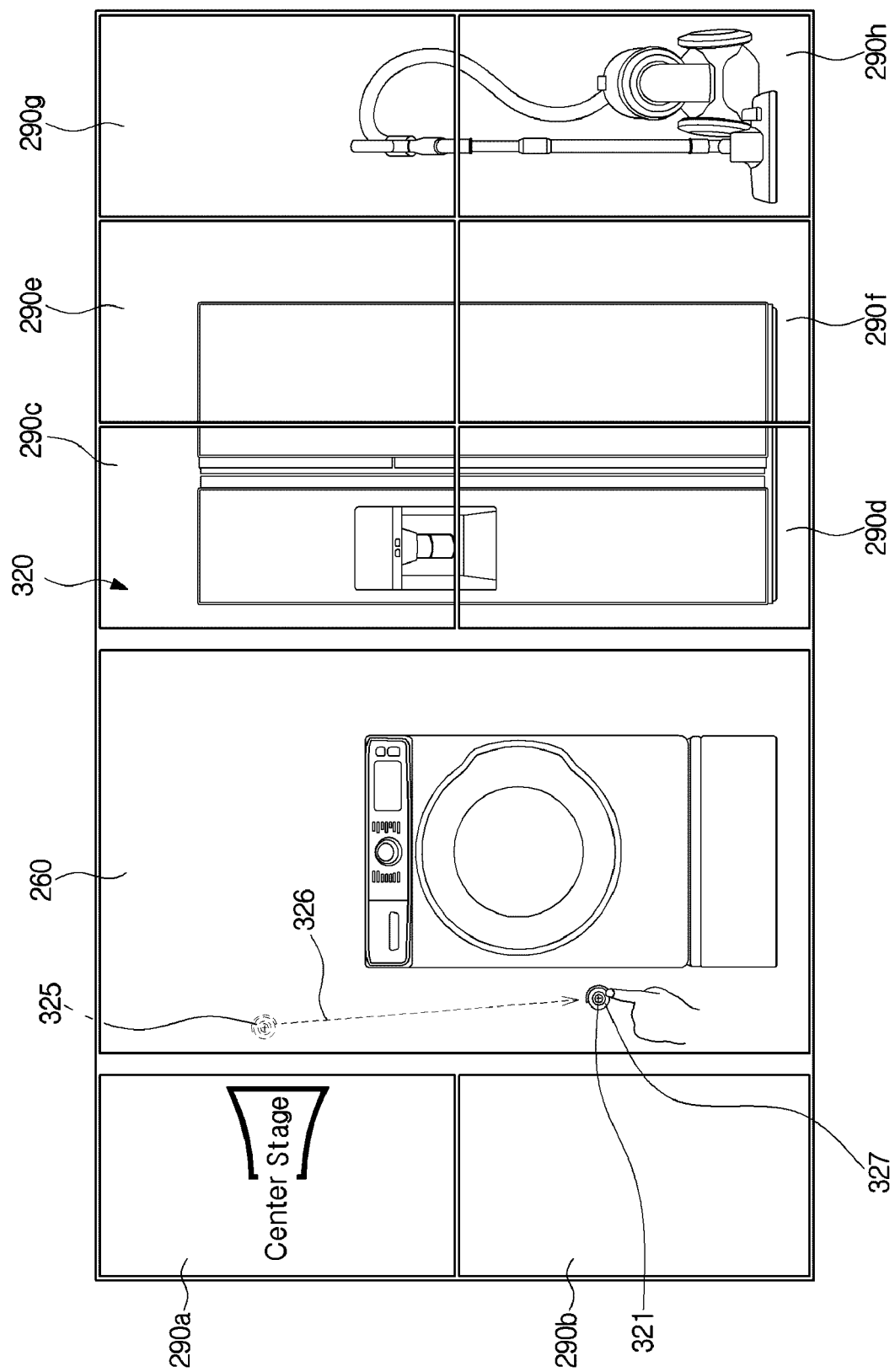

[Fig. 16]
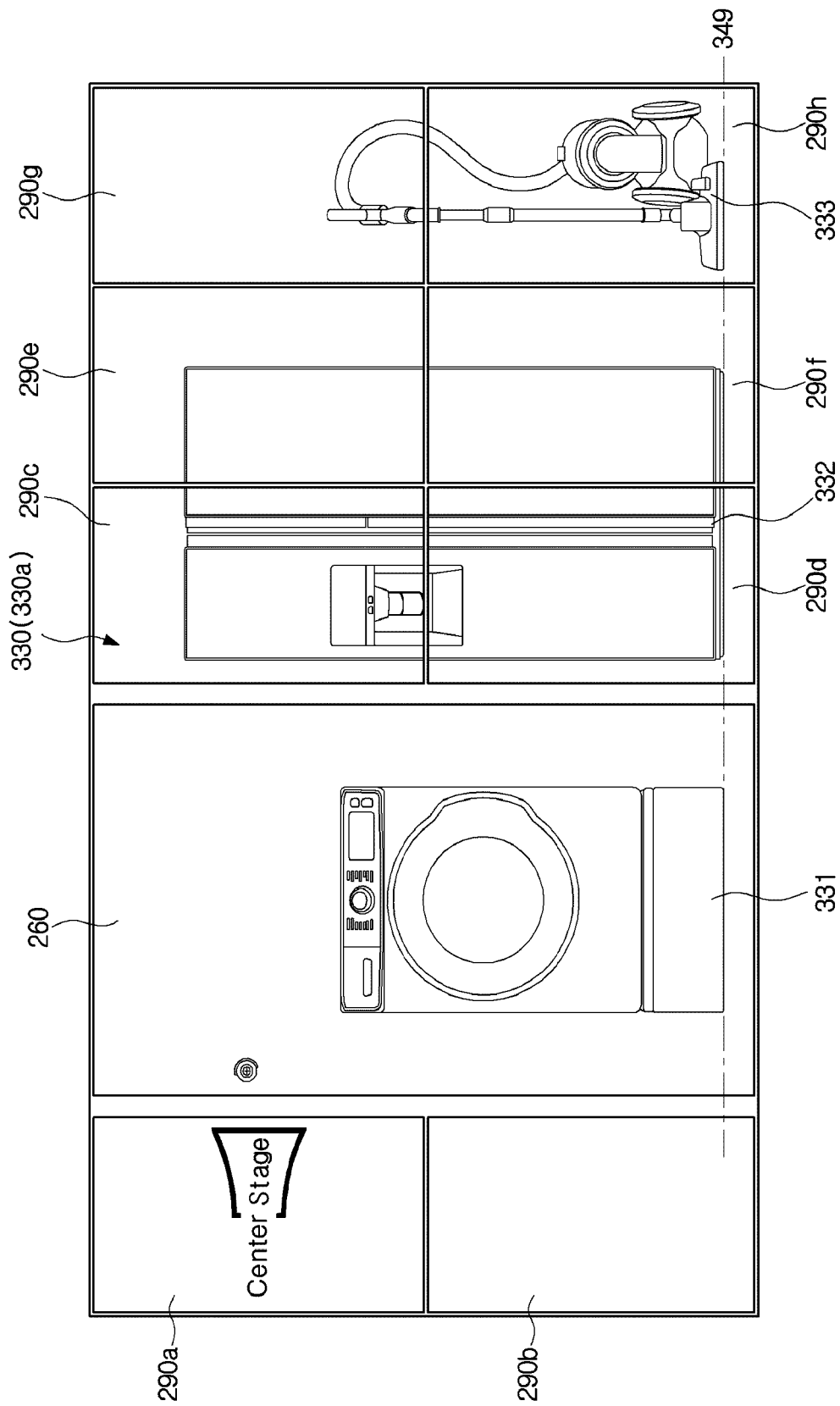<br>

[Fig. 17]
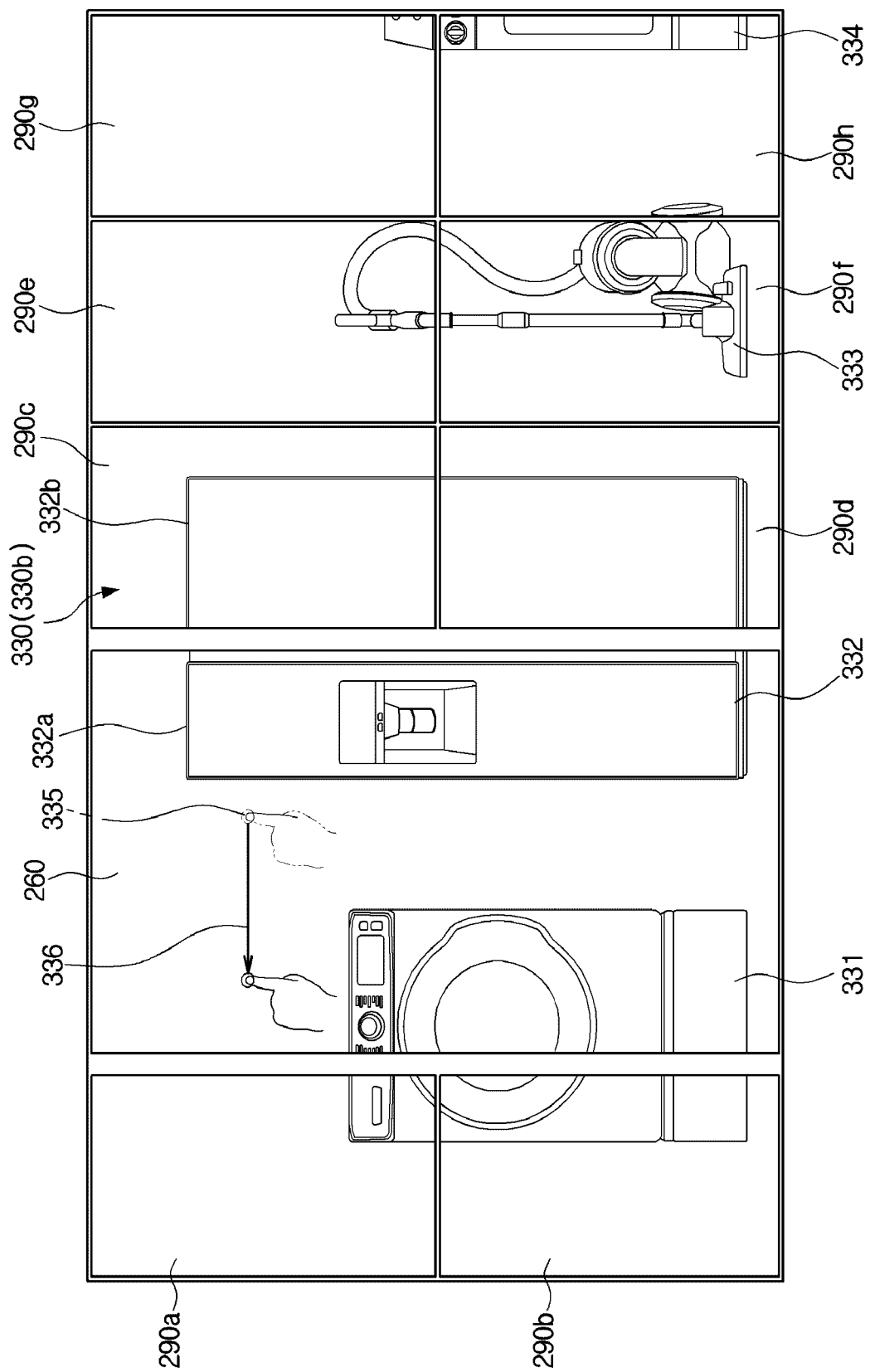

[Fig. 18]
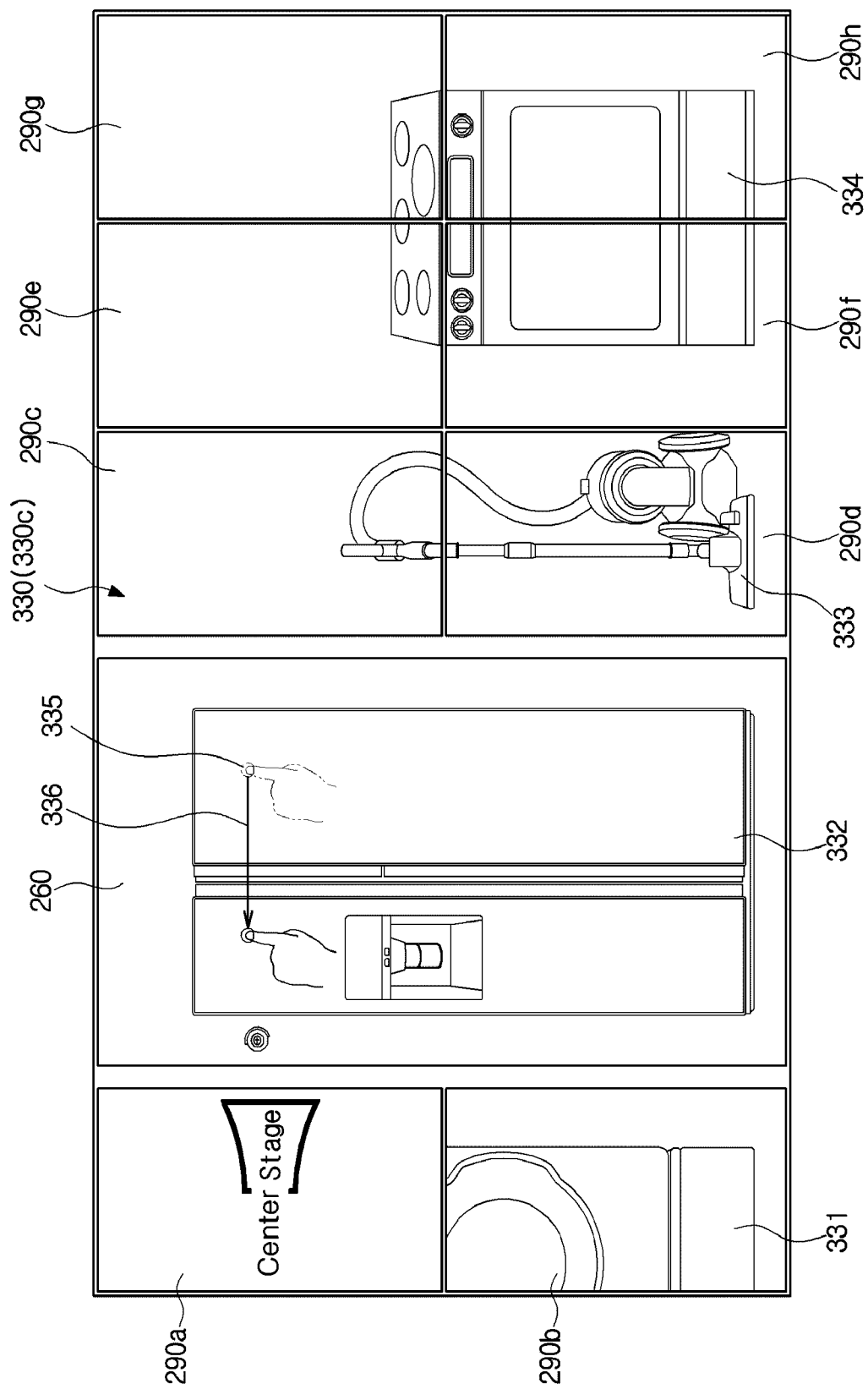

[Fig. 19]
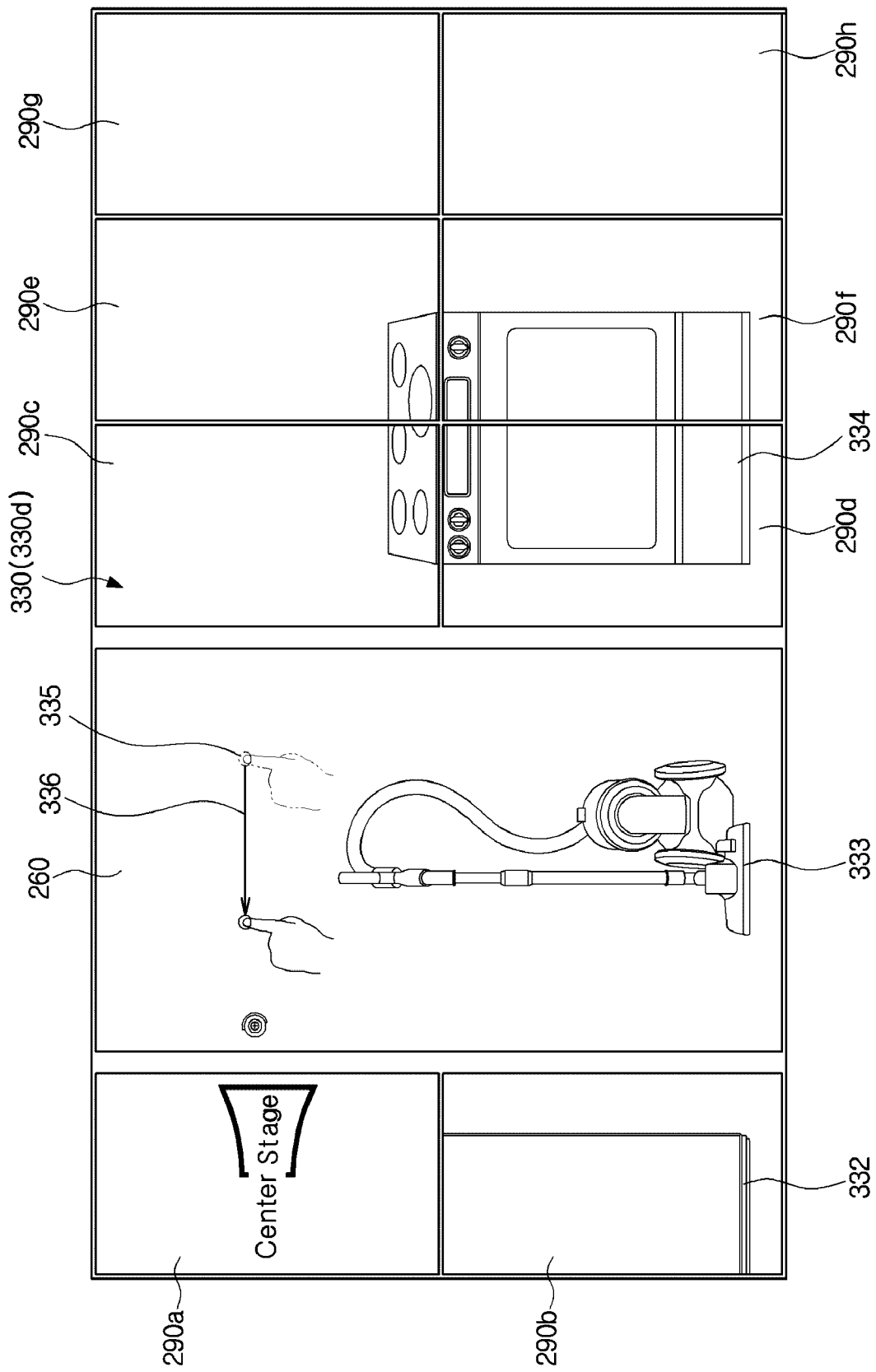

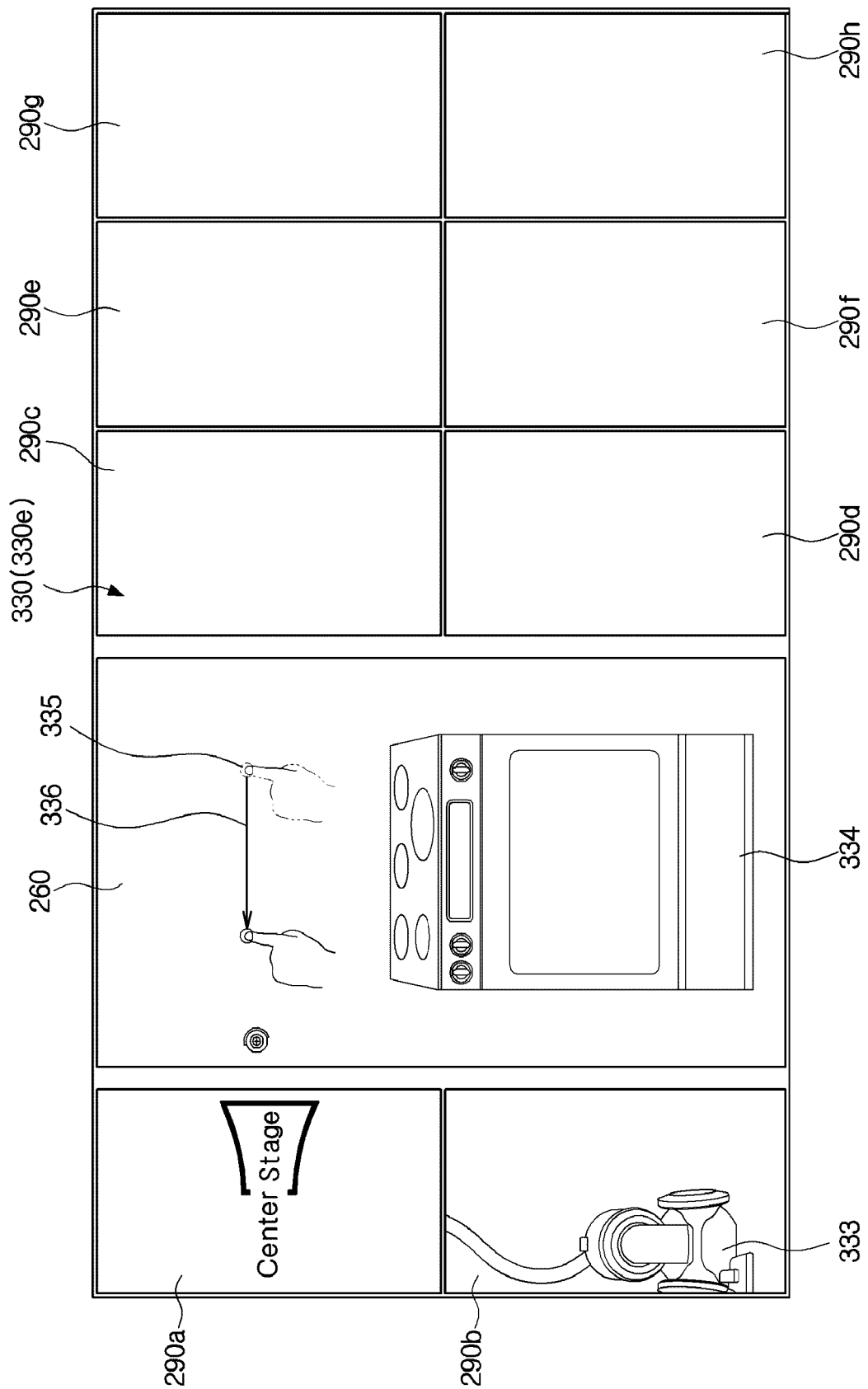
[Fig. 20]

[Fig. 21]
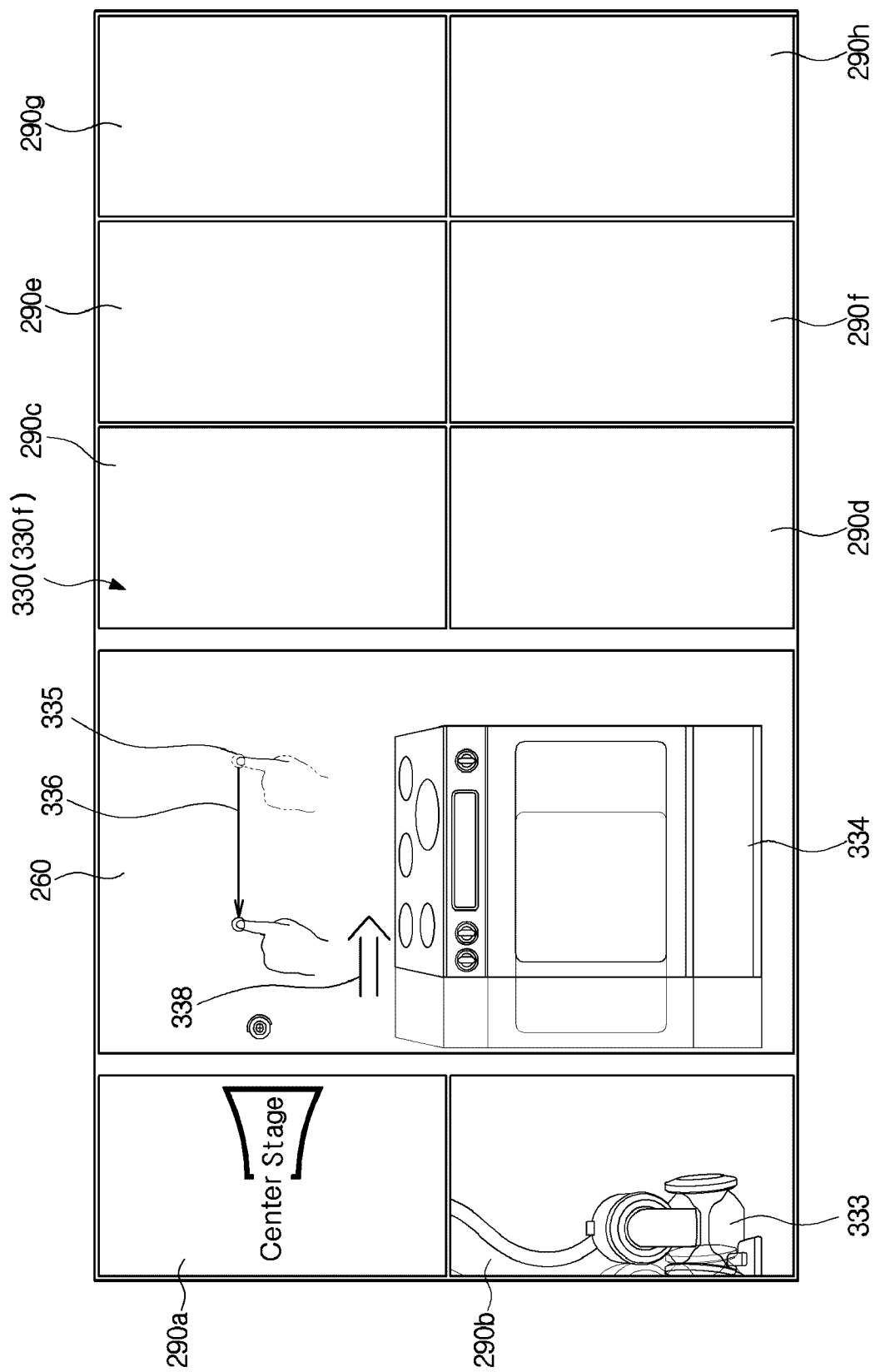

[Fig. 22]
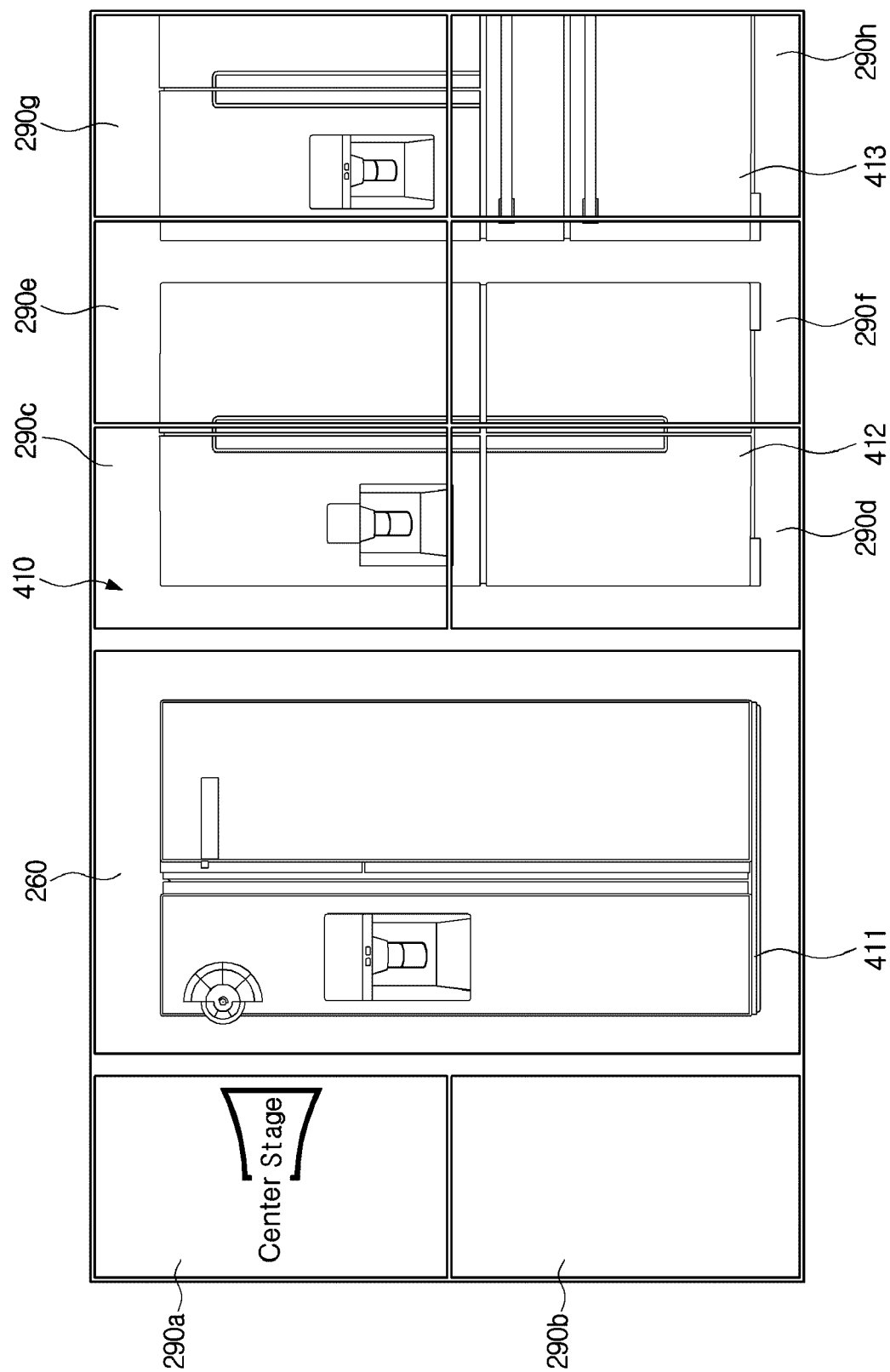

[Fig. 23]
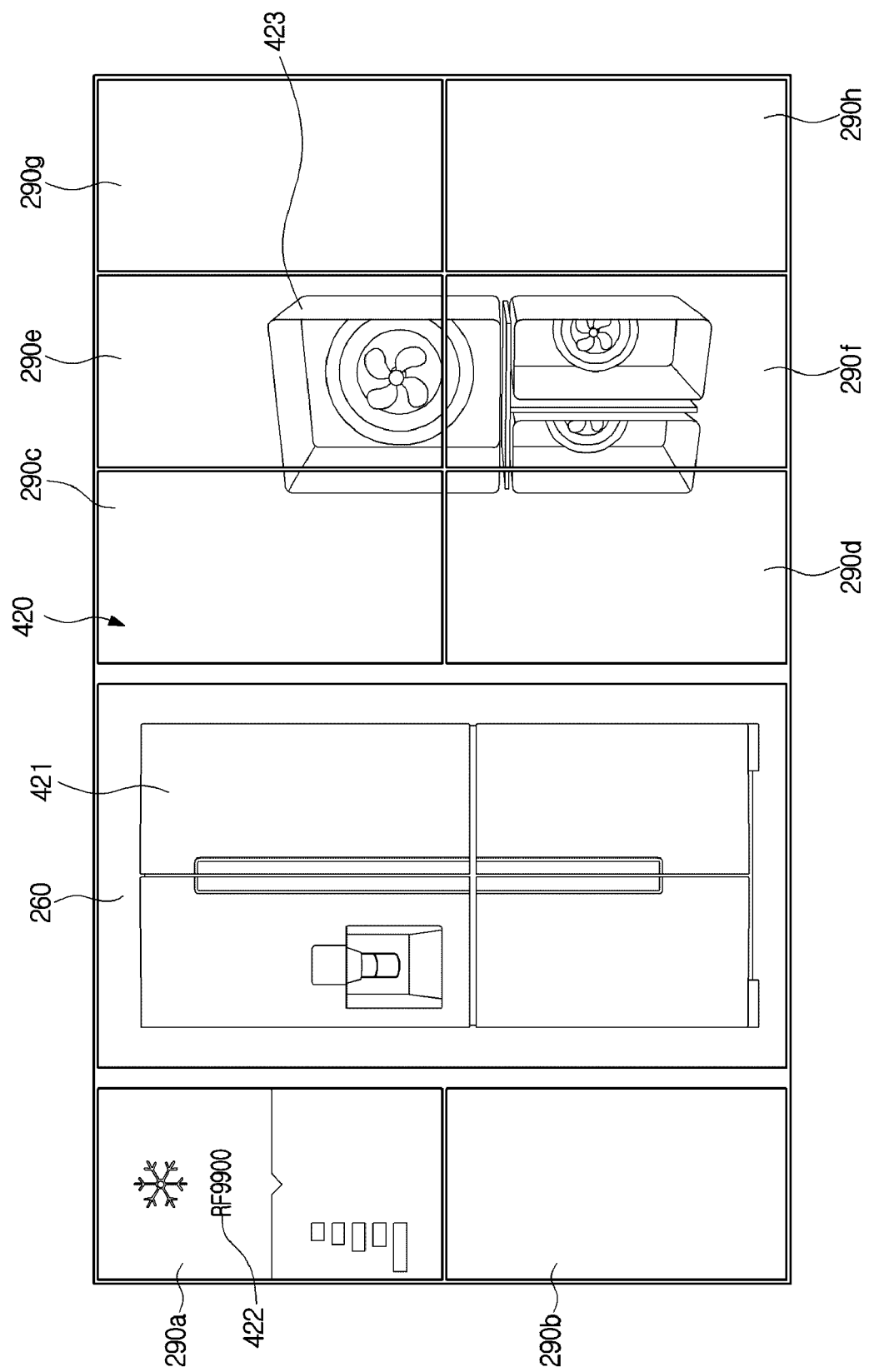

[Fig. 24]
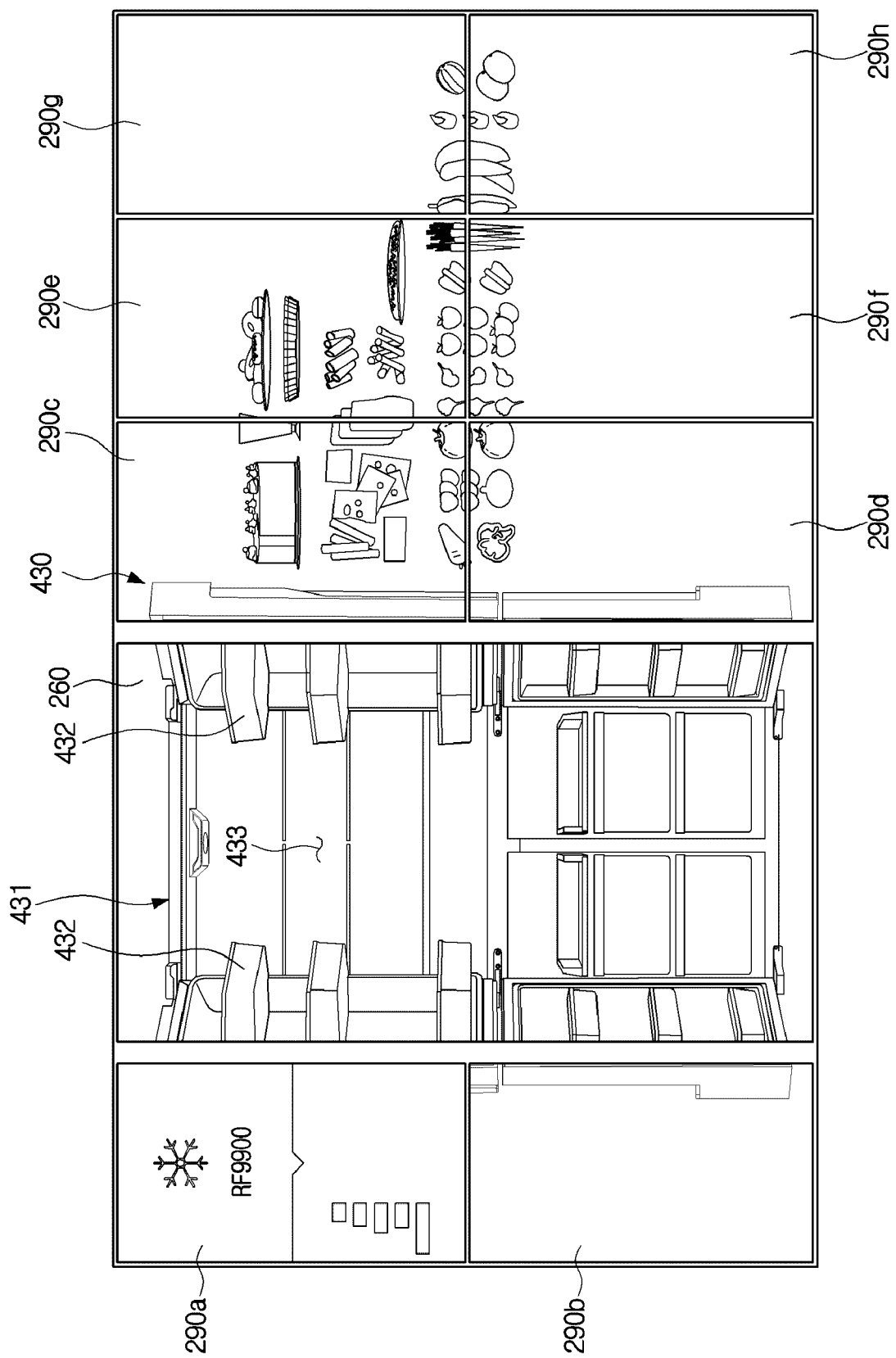

[Fig. 25]
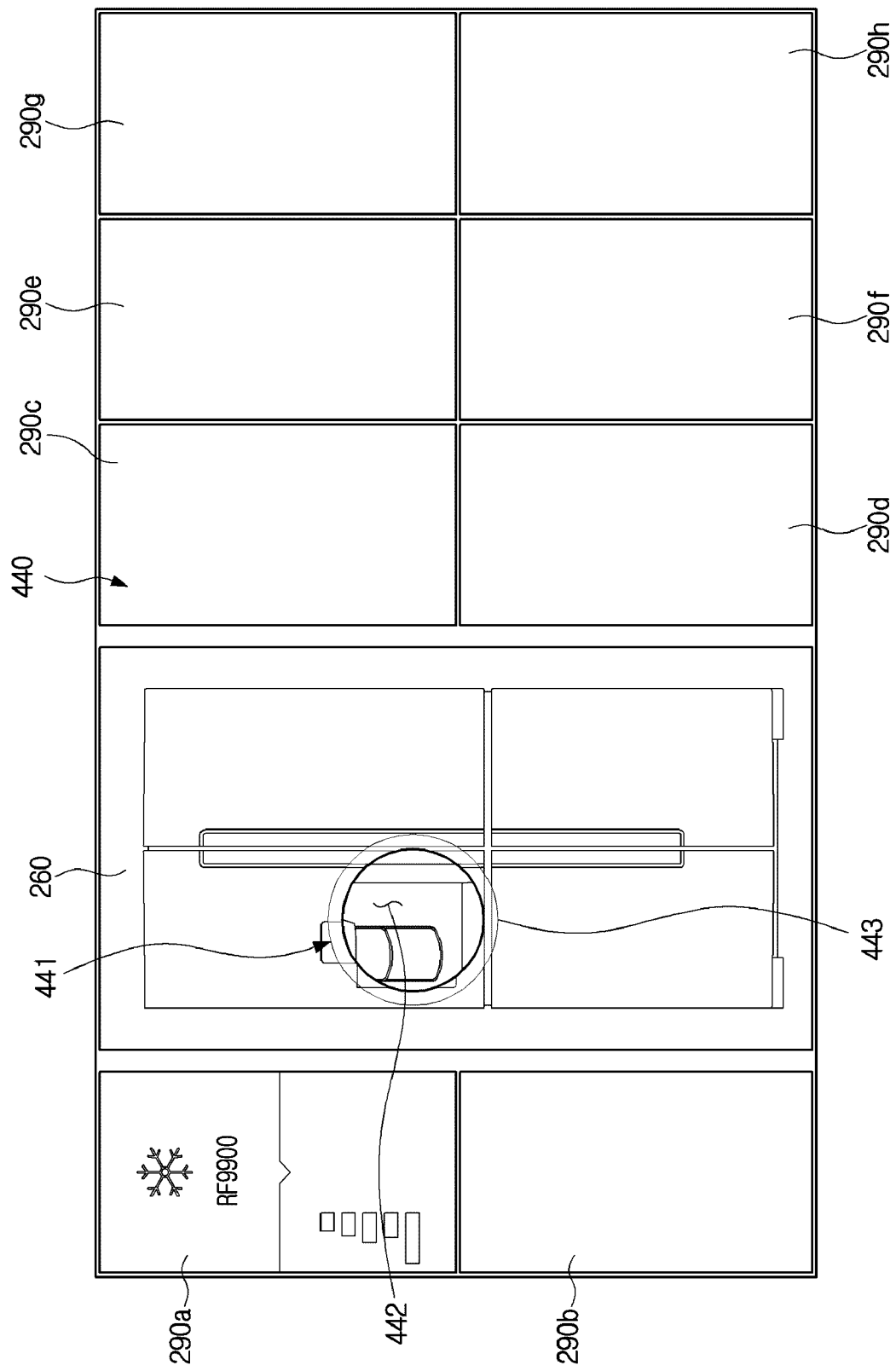

[Fig. 26]
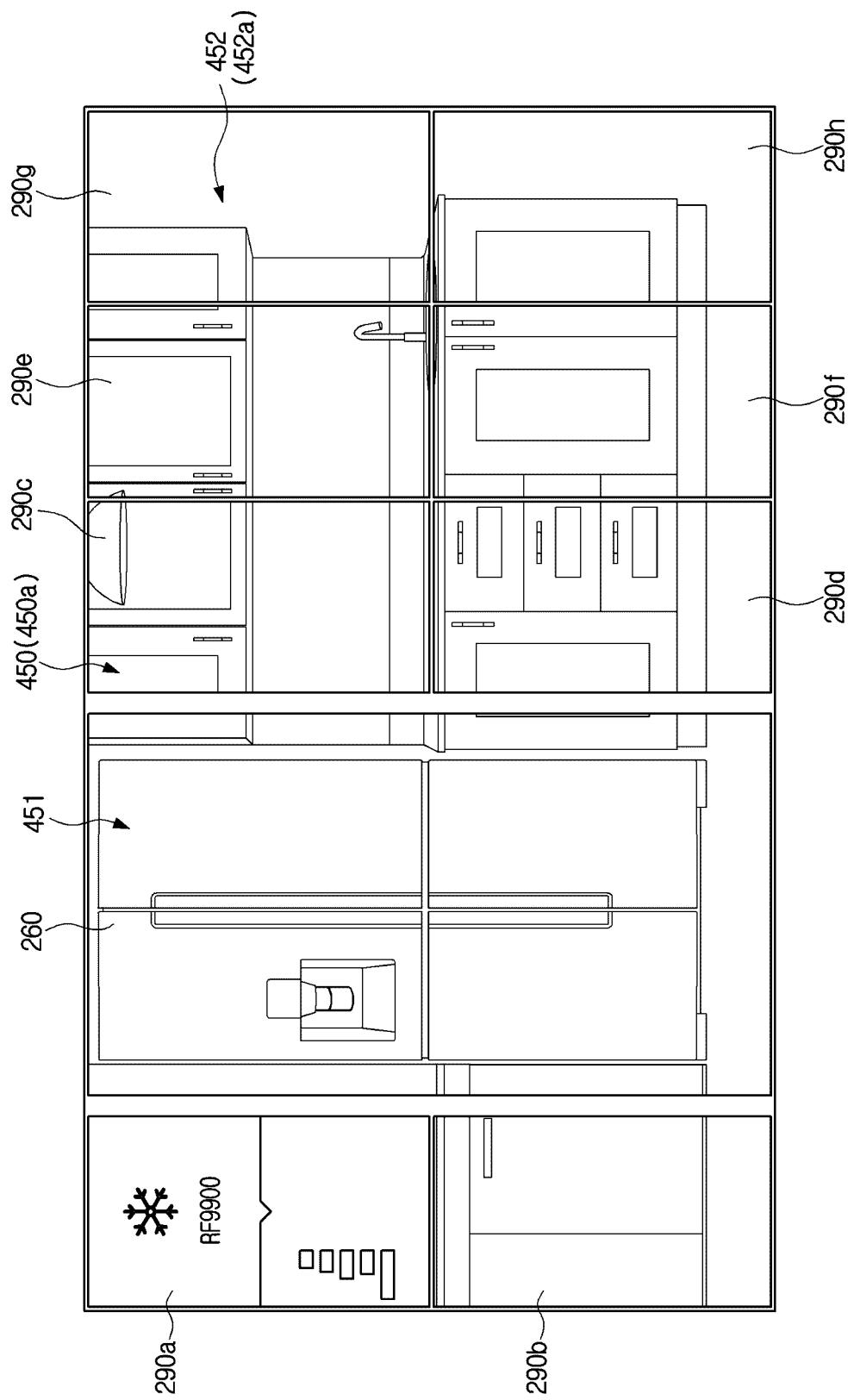

[Fig. 27]
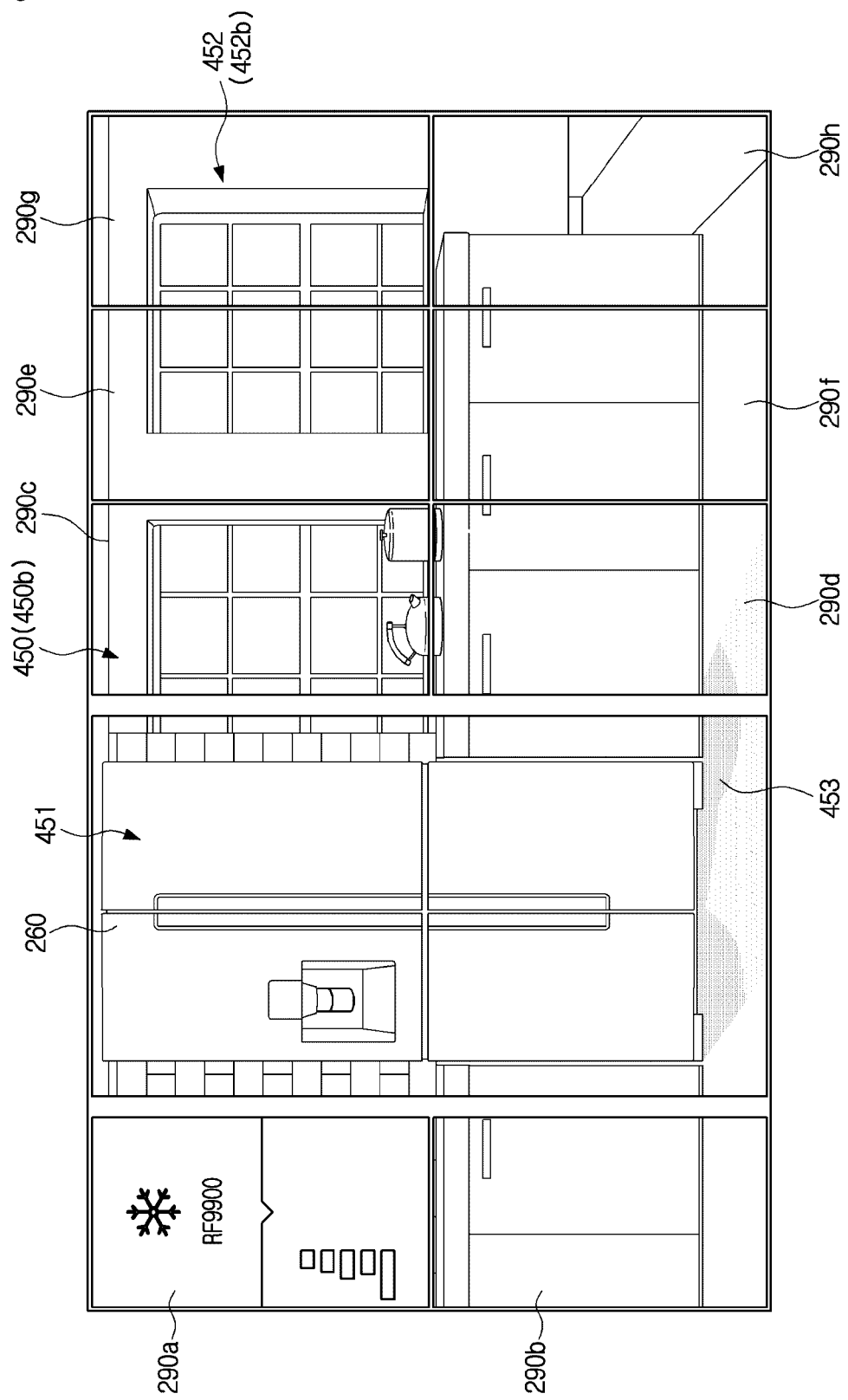

MULTI-DISPLAY SYSTEM, ELECTRONIC DEVICE, AND CONTENT OUTPUT METHOD

TECHNICAL FIELD

The following exemplary embodiments relate to an electronic device and a content output method of the same, and more particularly, to an electronic device and a content output method of the same for outputting synchronized content to a large format display (LFD) and a small format display (SFD) in correspondence with a user's proximity or touch.

BACKGROUND ART

In general, users may directly experience actual home appliance products and electronic products arranged in stores. Because it is not easy to provide the users with detailed information about major functions applied to the product through the actual product, printing materials or videos provided around the product are additionally used in many cases.

Recently, sizes and volumes of products have increased and a time schedule of the product launch has been gradually shortened so as to provide various services and functions to the users in terms of home appliance products and displays. It is not easy to change and arrange home appliance products and electronic products having large sizes and volumes in a store having a limited space according to the time schedule of the product launch.

DISCLOSURE OF INVENTION

Technical Problem

An electronic device and a content output method of the same for outputting synchronized content to an LFD and an SFD in correspondence with a user's proximity or touch are provided.

Solution to Problem

According to one exemplary embodiment of the present invention, a multi-display system includes: a first display; at least one display cluster including a plurality of second displays each having relatively lower resolution and a relatively smaller size screen than the first display; a touch panel provided in the first display and configured to receive an input of a command of a user; and an electronic device configured to output mutually interlocked content to the first display and the plurality of second displays of the at least one display cluster according to the command of the user input through the touch panel.

The second displays included in the at least one display cluster may be disposed on a left or right side of the first display in a two-dimensional 2×M (M is a positive integer) layout.

The plurality of second displays included in the at least one display cluster may be mutually connected in series.

The multi-display system may include: a first wire configured to electrically connect the electronic device and the first display; at least one second wire configured to electrically connect the electronic device and the at least one display cluster; and a third wire configured to electrically connect the electronic device and the touch panel.

The electronic device may include: a video processing unit configured to process and divide source content; and a scaler configured to scale the content processed and divided by the video processing unit.

The video processing unit may divide the source content into divisions equal in number to the total number of displays including the first display and the at least one display cluster.

The content divided by the video processing unit may be distributed to the first display and the at least one display cluster, and the scaler may scale the content distributed from the video processing unit to the at least one display cluster in accordance with the resolution of the second display.

The content distributed from the video processing unit to the first display may be transmitted without separate scaling.

The content scaled by the scaler may be sub-divided into divisions equal in number to the second displays belonging to the display cluster and distributed to the second displays.

According to another exemplary embodiment of the present invention, a multi-display system includes: an interactive display having a user input device and configured to display first content according to an input of a user through the user input device; an auxiliary display configured to display second content corresponding to the first content according to the input of the user through the user input device; and an electronic device configured to store source content, generate first content and second content by dividing and scaling the source content according to the input of the user through the user input device, transmit the first content and the second content to the interactive display and the auxiliary display, respectively, and control the interactive display and the auxiliary display to display the first content and the second content, respectively.

A plurality of auxiliary displays may be provided.

The auxiliary display may be disposed on a left or right side of the interactive display in a curved manner.

The interactive display and the auxiliary display may have different screen sizes and different resolutions.

The interactive display may have a relatively large screen, and the auxiliary display may have a relatively small screen.

The interactive display has relatively high resolution, and the auxiliary display may have relatively low resolution.

The source content may be generated to be displayed on the interactive display without separate scaling.

The electronic device may include: a scaler configured to scale the source content in accordance with a size and resolution of the auxiliary display.

The electronic device may cause the interactive display to output a user menu.

The electronic device may move the user menu to another position within a predetermined region in which movement is possible according to a touch gesture of the user.

The electronic device may cause a horizontal or vertical line of an image object to be equally aligned between the interactive display and the auxiliary display when the image object moves between the interactive display and the auxiliary display.

The electronic device may cause motion blur to be output when an image object moves.

The first content and the second content may include product category content in which products of various categories are displayed to be scrollable by a touch gesture of the user.

The products of various categories displayed in the product category content may be disposed on the same horizontal plane.

The electronic device may cause a screen to be flicked in a direction opposite to a scroll direction when the user scrolls on a last part of the product category content.

The first content and the second content may include product details content in which details of each product are shown.

The product details content may include product feature content in which a feature of the product is shown.

The product feature content may include product operation content in which an operation of the product is shown.

The product details content may include zoom content for enlarging a partial region of the product to display the enlarged partial region.

The electronic device may cause a zoom menu through which movement to the interactive display is enabled to be output when the user selects the zoom content.

The product details content may include background-switched content for changing and showing a background in which the product is disposed.

The first content and the second content may include a background layer and a product layer overlaid on the background layer, and the background-switched content may be shown by switching the background layer.

The background layer may include a shadow of the product generated according to a light source effect.

According to still another exemplary embodiment of the present invention, an electronic device includes: an input/output (I/O) unit connected to an LFD having a screen of a first diagonal length and a plurality of SFDs each having a screen of a diagonal length shorter than the first diagonal length; and a control unit configured to control the I/O unit, wherein the control unit outputs synchronized content to the LFD and the SFDs through the I/O unit, and wherein the control unit outputs a radial menu selected by a touch of the user to one of the LFD and the SFDs.

According to still another exemplary embodiment of the present invention, an electronic device includes: an I/O unit connected to an LFD having a screen of a first diagonal length and a plurality of SFDs having a screen of a diagonal length shorter than the first diagonal length; and a control unit configured to control the I/O unit, wherein the control unit outputs first content synchronized in synchronized content to the LFD through the I/O unit, wherein the control unit outputs second content synchronized in the synchronized content to the plurality of SFDs through the I/O unit, and wherein the control unit divides the second content into content divisions equal in number to the plurality of SFDs and outputs the content divisions to the plurality of SFDs.

According to still another exemplary embodiment of the present invention, a content output method of an electronic device includes the steps of: outputting synchronized idle content to an LFD having a screen of a first diagonal length and a plurality of SFDs having a screen of a diagonal length shorter than the first diagonal length, wherein the LFD is connected to the plurality of SFDs; detecting proximity of a user; and outputting hooking content synchronized in correspondence with the detected proximity of the user to the LFD and the plurality of SFDs, wherein a radial menu is output to one of the LFD and the SFDs in correspondence with the detected proximity of the user.

Advantageous Effects of Invention

An electronic device and a content output method of the same for outputting synchronized content having different resolutions to an LFD and an SFD in an idle state may be provided.

An electronic device and a content output method of the same for outputting synchronized content corresponding to the proximity of a user detected by a proximity sensor to an LFD and an SFD in an idle state may be provided.

An electronic device and a content output method of the same for outputting synchronized content corresponding to the touch of a user detected by a touch panel to an LFD and an SFD may be provided.

An electronic device and a content output method of the same for outputting a radial menu to one of an LFD and an SFD according to one of the proximity of the user detected by the proximity sensor and the touch of the user detected by the touch panel may be provided.

An electronic device and a content output method of the same for outputting a radial menu configured in a hierarchical structure in the form of left and right semicircles having different diameters to one of an LFD and an SFD may be provided.

An electronic device and a content output method of the same for outputting product information included in product content to one of an LFD and an SFD, wherein the product content includes a product image and the product information, may be provided.

In addition, according to various exemplary embodiments of the present invention, an electronic device and a content output method of the same for outputting synchronized content to an LFD and an SFD in correspondence with a user's proximity or touch may be provided.

According to an exemplary embodiment of the present invention in another aspect, a multi-display system includes an interactive display in which interaction with a user is possible and an auxiliary display configured to display relevant content corresponding to content displayed on the interactive display, thereby causing curiosity and excitement for a large number of store customers as well as users joining interaction.

BRIEF DESCRIPTION OF DRAWINGS

FIGS. 1A and 1B are schematic perspective views illustrating screen displays of an electronic device according to an exemplary embodiment of the present invention.

FIGS. 2A and 2B are schematic diagrams illustrating an overall system for a screen display process of the electronic device according to another exemplary embodiment of the present invention.

FIG. 3 is a schematic block diagram illustrating an electronic device according to an exemplary embodiment of the present invention.

FIG. 4 is a schematic flowchart illustrating a screen display method of the electronic device according to an exemplary embodiment of the present invention.

FIGS. 5A to 5L and FIG. 6A to FIG. 6L are diagrams illustrating examples of screens output from the electronic device according to an exemplary embodiment of the present invention.

FIGS. 7A to 7C are diagrams illustrating examples of screens output from the electronic device according to another exemplary embodiment of the present invention.

FIGS. 8A to 8C are diagrams illustrating examples of screens output from the electronic device according to another exemplary embodiment of the present invention.

FIG. 9 is a plan view illustrating a curved layout structure of a display according to an exemplary embodiment of the present invention.

FIG. 10 is a front view illustrating a display according to an exemplary embodiment of the present invention.

FIG. 11 is a block diagram illustrating a video processing process of the electronic device according to an exemplary embodiment of the present invention.

FIG. 12 is a conceptual diagram illustrating a process of dividing and scaling a source video in an electronic device according to an exemplary embodiment of the present invention.

FIG. 13 is a diagram illustrating a map of content of the display according to an exemplary embodiment of the present invention.

FIG. 14 is a diagram illustrating a home screen of the display according to an exemplary embodiment of the present invention.

FIG. 15 is a diagram illustrating movement of a user menu of the display according to an exemplary embodiment of the present invention.

FIGS. 16 to 21 are diagrams illustrating an operation of scrolling product category content of the display according to an exemplary embodiment of the present invention.

FIG. 22 is a diagram illustrating a screen in which a refrigerator is selected among product categories of the display according to an exemplary embodiment of the present invention.

FIG. 23 is a diagram illustrating product feature content of the display according to an exemplary embodiment of the present invention.

FIG. 24 is a diagram illustrating product operation content of the display according to an exemplary embodiment of the present invention.

FIG. 25 is a diagram illustrating zoom content of the display according to an exemplary embodiment of the present invention.

FIGS. 26 and 27 are diagrams illustrating background-switched content of the display according to an exemplary embodiment of the present invention.

MODE FOR THE INVENTION

Hereinafter, exemplary embodiments of the present invention will be described in detail with reference to the accompanying drawings. In addition, a method of manufacturing and employing an electronic device according to an exemplary embodiment of the present invention will be described in details with reference to details illustrated in the accompanying drawings. The same reference numerals or signs illustrated in the drawings represent components or elements configured to perform substantially the same functions.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

A "touch" may be generated by one of fingers including a thumb or a touchable input unit (for example, a stylus or the like). The touch may include hovering by one of the fingers including the thumb or the touchable input unit. In addition, the "touch" may include a touch gesture (for example, a drag, a flick, or the like), a single touch, or a multi-touch.

"Continuous motion of the touch" may include continuous motion of the single touch or continuous motion of the multi-touch.

"Content" may be used as the term including an idle video (which is also referred to as "idle content") output from an LFD and/or an SFD in an idle state of the electronic device by control of an electronic device, a hooking video (which is also referred to as "hooking content") output to a display in correspondence with detection of proximity of a user, a product video (which is also referred to as "product content") for introducing a feature of a product selected by the user, and a hooking user interface (UI) (which is also referred to as a "hooking menu") or a product UI (which is also referred to as a "product menu") displayed on the display when the proximity of the user (including the touch of the user) is detected. In addition, the hooking video may be referred to as an "attraction video," and the hooking UI may be referred to as an "attraction UI."

The content may be stored in the electronic device, the display, and/or the SFD (not illustrated). The electronic device may output content stored in a storage unit of the electronic device and a control signal to the display and the SFD (not illustrated). The electronic device may output a control signal for outputting the content stored in the display and/or the SFD (not illustrated) to the display and/or the SFD (not illustrated).

The content may include a video, an image, text, or a web document. The content may include a video which is a set of still images. Resolution of the content may include ultra high definition (UHD) of 3840×2160 pixels, quad high definition (QHD) of 2560×1440 pixels, full high definition (FHD) of 1920×1080 pixels, or high definition (HD) of 1280×720 pixels. In addition, the resolution of the content may be implemented with other resolution to be developed or commercialized in the future.

A "circular UI" to be displayed on the display has a menu in a circular form or a plurality of semicircular forms and therefore may be referred as a "radial menu." Alternatively, the "circular UI" may be referred as the "circular menu." The circular UI according to the exemplary embodiment of the present invention may include a redial menu or a circular menu.

The terminology used herein to describe exemplary embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof. The same reference numerals or signs illustrated in the drawings represent members configured to perform substantially the same functions.

FIGS. 1A and 1B are schematic perspective views illustrating screen displays of an electronic device according to an exemplary embodiment of the present invention.

Referring to FIGS. 1A and 1B, synchronized content output from the electronic device 100 (see FIG. 2A) is output through an LFD 260 and a plurality of SFDs 290*a* to 290*h*.

Multi-display systems 1*a* and 1*b* may include the electronic device 100, the LFD 260, and the plurality of SFDs 290*a* to 290*h*.

The LFD 260 and the SFDs 290a to 290h may have a display screen having a curvature. The display may have a curvature of 4200R. For example, the curvature of the display may be a value between 4000R and 4600R. In addition, the curvature of the display may be a value between 3500R and 5000R. The LFD 260 and the SFDs 290a to 290h may have a flat display screen.

At least one SFD, for example, 290a, 290b, or 290a and 290b, of the plurality of SFDs may display a logo, an icon, or a trademark (for example, a center stage). In addition, the at least one SFD, for example, 290a, 290b, or 290a and 290b, of the plurality of SFDs may display product information of a product displayed on the LFD 260. For example, the product information may include a plurality of items of a manufacturer, a product name, a model name, a product type, a product size, a product finish/design, a product capacity, a dispenser, and a feature.

Those skilled in the art will easily understood that a position of the SFD for displaying the product information may change.

In order to prevent the contact (for example, contact by a shoe or the like) unintended by the user, a protection bar 10b may be installed on the floor facing lower ends of the LFD 260 and the SFDs 290a to 290h.

FIGS. 2A and 2B are schematic diagrams illustrating an overall system for a screen display process of the electronic device according to an exemplary embodiment of the present invention.

Referring to FIGS. 2A and 2B, components for the screen display process of the electronic device may include a wall 10, the electronic device 100, a mobile device 200, a proximity sensor 220, a touch panel 240, the LFD 260, a fixed stand 265, and the SFD 290.

FIGS. 2A and 2B may be distinguished by curvatures of the displays 260 and 290. In FIG. 2A, display screens of the displays 260 and 290 may have the curvatures. In addition, in FIG. 2A, the displays 260 and 290 having flat display screens may be disposed in the form of a curve. In FIG. 2B, the display screens of the displays 260 and 290 may be flat.

The electronic device 100 may be connected to some of the components of the system in a wired or wireless mode. The electronic device 100 may be electrically connected to some of the components of the system. The electronic device 100 may control some connected components (for example, an LFD, an SFD, or the like). In addition, the number of electronic devices 100 may be two or more. In the case of a plurality of electronic devices (not illustrated), a component of the system connected to each electronic device (not illustrated) may differ. For example, a first electronic device (not illustrated) may be connected to the LFD 260 and/or the SFD 290. A second electronic device (not illustrated) may be connected to the proximity sensor 220 and/or the touch panel 240. Those skilled in the art will easily understand that the component of the system connected to each electronic device (not illustrated) may change.

The electronic device 100 will be described later in detail with reference to FIG. 3.

The wall 10 may include an opening 10a. The displays, for example, 260 and/or 290, may be inserted through the opening 10a. An area of the opening 10a is wider than an area of a screen of the LFD 260. The opening 10a may be formed to be closer to one side (for example, a lower side) of upper and lower sides of the wall 10. The opening 10a may be formed to be closer to one side (for example, a left side) of left and right sides of the wall 10. The opening 10a may be positioned in a center region of the wall 10. In addition, the number of openings 10a formed in the wall 10 may be two or more.

In addition, the LFD 260 and the SFDs 290a to 290h may be fixed to the wall 10 using a separate fixing means (for example, a wall-mountable stand or bracket (not illustrated) or the like) without the opening 10a.

The mobile device 200 may be remotely connected to the electronic device 100 to manage and control the system. The mobile device 200 and the electronic device 100 may be connected in the wired or wireless mode using a network connection device (for example, a router, a sharer, or the like). The mobile device 200 may manage the electronic device 100 and the component connected to the electronic device 100 using a center-stage management system (CMS) installed in the mobile device 200 or the electronic device 100. The mobile device 200 may transmit a control signal to the connected electronic device 100. The control signal, for example, may include a control signal for outputting content to the LFD 260 and the SFD 290 or a control signal for downloading content from outside to the electronic device 100.

The proximity sensor 220 detects a user approaching a region (for example, within a radius of 1 m from the LFD 260) set based on the LFD 260 in a non-contact or contact mode.

The proximity sensor 220 detects the user approaching a region (for example, within a radius of 1 m from the display) set based on the display equipped with the touch panel 240 in the non-contact or contact mode. The proximity sensor 220 detects the user approaching a region (for example, within a radius of 1 m from the wall 10) set based on the wall 10 in the non-contact or contact mode. The proximity sensor 220 may transmit an analog signal or a digital signal varying with the proximity of the user to the electronic device 100.

There may be various types of proximity sensors 220. The proximity sensor 220, for example, may include a magnetic type proximity sensor, an inductance type proximity sensor, a high-frequency oscillation type proximity sensor, a capacitive type proximity sensor, an infrared type proximity sensor, or a closed circuit television (CCTV) camera.

The proximity sensor 220 may be installed at a position at which content displayed on the display 260 is not interfered with (for example, a position at which the sight of the user is not impeded by the proximity sensor 220). In addition, the proximity sensor 220 may be positioned in a region between the wall 10 and the user (for example, within a radius of 3 m from the wall 10).

The touch panel 240 receives the user's touch. The user's touch may include the touch of the user's body and/or the input unit. The touch panel 240 may receive the touch by the user's body (for example, fingers including the thumb) or the input unit (for example, a stylus (not illustrated)). In addition, the user's touch may include a touch, hovering, a touch gesture (for example, a drag, a flick, or the like), a single touch, or a multi-touch. It is only necessary for the input unit (not illustrated) to be a unit capable of detecting touches on the touch panel 240 corresponding to various touch detection schemes.

The touch panel 240 may transmit an analog signal corresponding to the input touch of the user to a touch panel controller (not illustrated). The touch panel controller (not illustrated) may convert the received analog signal into a digital signal and transmit the digital signal to the electronic device 100. The electronic device 100 may calculate a position (for example, X and Y coordinates) corresponding to the user's touch using a signal received from the touch panel controller (not illustrated). In addition, the touch panel controller (not illustrated) may calculate the user's touch position (for example, X and Y coordinates) using an analog signal received from the touch panel 240 and transmit the calculated touch position of the user to the electronic device 100.

The touch panel 240 may be implemented in a capacitive type, a resistive type, an infrared type, or an acoustic type, and is not limited thereto. In addition, the touch panel 240 may be implemented as a touch panel to be developed or commercialized in the future.

The touch panel 240 may be mounted on one of the LFD 260 and the plurality of SFDs 290. The touch panel 240 may be mounted on any of the LFD 260 and the plurality of SFDs 290. In addition, the touch panel 240 may be mounted on one of the plurality of SFDs 290*a* to 290*h*. For example, when the touch panel 240 is mounted on the SFD 290*c*, the proximity sensor 220 may detect the user approaching a region set based on the SFD 290*b* in the non-contact or contact mode.

The touch panel 240 may be installed in a front surface of the LFD 260 and/or at least one of front surfaces of the plurality of SFDs 290. When the touch panel 240 is installed in the front surface of the LFD 260, the touch panel 240 may be coupled to a bezel or a rear surface cover (not illustrated) of the LFD 260 (for example, using a fastening member such as an adhesive, an adhesive tape, or a screw). When the touch panel 240 is installed in the front surface of one of the SFDs 290*a* to 290*h*, the touch panel 240 may be coupled to a bezel or a rear surface cover (not illustrated) of the SFD (for example, using a fastening member such as an adhesive, an adhesive tape, or a screw).

The touch panel 240 may be configured to be integrated with the LFD 260. For example, the touch panel 240 may be implemented in an on-cell scheme in an upper region of a display unit (not illustrated) of the LFD 260 or in an in-cell scheme in an internal region of the display unit (not illustrated) of the LFD 260. When the touch panel 240 is integrated with the LFD 260, the thickness of each of the touch panel 240 and the LFD 260 may be less than that of a separation type.

When the LFD 260 has a curvature, the touch panel 240 may also have a curvature in correspondence with the curvature of the LFD 260. The touch panel 240 having the curvature is likely to be mounted on the LFD 260 having the curvature.

A support frame (not illustrated) may house the touch panel 240 and the LFD 260 which are coupled. The support frame (not illustrated) may be inserted into the opening 10*a* of the wall 10. The support frame (not illustrated) may support the touch panel 240 and the LFD 260 which are coupled. In addition, the support frame (not illustrated) may be fitted into the opening 10*a* of the wall 10. It is preferable that an upper/lower/left/right width of the support frame (not illustrated) be smaller so that interference with synchronized content to be displayed on the LFD 260 and the SFD 290 is minimized (for example, reduced).

The LFD 260 displays synchronized content received from the electronic device 100. Content of the LFD 260 received from the electronic device 100 is synchronized with content output from the electronic device 100 to the SFD 290.

The LFD 260 may be an analog television (TV), a digital TV, a three-dimensional (3D) TV, a smart TV, a light-emitting diode (LED) TV, an organic LED (OLED) TV, a plasma TV, a monitor, a curved TV having a screen with a fixed curvature, a flexible TV having a screen with a fixed curvature, a bent TV having a screen with a fixed curvature, and/or a variable curvature TV in which the curvature of a current screen can be changed by an input received from the user.

The LFD 260 may output content having FDH or UHD resolution. The UHD resolution (for example, about 4000× about 2000 pixels) may include 4096×2160 pixels or 3840× 2160 pixels as resolution which is about four times the FHD resolution. In addition, the LFD may be a display capable of outputting HD content.

In the exemplary embodiment of the present invention, 4K resolution content may be used as the term indicating content having the resolution of UHD or more.

In the exemplary embodiment of the present invention, the LFD 260 may have a diagonal length of a display screen having 1,520 mm (60 inches) or more. In the exemplary embodiment of the present invention, the SFD 290 may be a display having a diagonal length of the display screen which is shorter than a diagonal length of the display screen of the LFD 260.

In the LFD 260 and/or the SFD 290, the terms "large format" and "small format" have relative meanings. One display having a longer diagonal length in the display screen between the displays may be referred to as the LFD and the other display having a shorter diagonal length in the display screen may be referred to as the SFD. For example, when there are a display having a diagonal length of 2,150 mm (or 85 inches) in a display screen and a display having a diagonal length of 1,169 mm (46 inches) in a display screen, the former may become the LFD 260 and the latter may become the SFD 290.

In the exemplary embodiment of the present invention, the display having the diagonal length of the same display screen may have a diagonal length of a display screen with a margin of ±50 mm. For example, when the diagonal length of the display screen is 2,150 mm, the display having the diagonal length of the same display screen may have a diagonal length of the display screen from 2,100 mm to 2,200 mm.

In the exemplary embodiment of the present invention, the SFD 290 may be a display capable of outputting content at resolution less than or equal to resolution of content displayed on the LFD 260. For example, when the LFD 260 outputs content at 4K content resolution, the SFD 290 may output content at 2K content resolution. In addition, when the LFD 260 outputs content at 4K content resolution, the SFD 290 may output content at HD content resolution.

The SFD 290 may display content at the same resolution as that of the LFD 260 and have a diagonal length of the display screen shorter than a diagonal length of the display screen of the LFD 260.

The screen of the content output from the LFD 260 is the same as the screen of the content output from the SFD 290 and may only have different resolution or luminance of the content from the SFD 290. For example, the luminance of the content displayed on the LFD 260 may be displayed to be higher than the luminance of the same content output from the SFD 290. The screen of the content displayed on the LFD 260 may be part of the screen of the same content output from the SFD 290.

The content received from the electronic device 100 and output from the LFD 260 is synchronized with content output from the SFD 290.

Types and sizes of products (for example, a refrigerator, a washer, an electric oven, and the like) capable of being displayed on the LFD 260 may be diverse. A size of the LFD 260 (width×height: 2004×1085 mm) may be larger than an actual size (908×1850 mm) of a product (for example, the refrigerator) to be displayed. For example, the size (for example, an area of a screen) of the LFD 260 may be 1.05 times or more the actual size of a product (for example, a front-surface area of the product) to be displayed. The size of the LFD 260 may be 2.5 times or more the actual size (686×990 mm) of a product (for example, a washer) to be displayed. In addition, the size of the LFD 260 may be 2.5 times or more the actual size (740×920 mm) of a product (for example, the electric oven) to be displayed. In addition, in the case of a small product such as a mobile phone, a notebook personal computer (PC), or a tablet PC, the display 260 or 290 having a screen size larger than a size of the small product may be used.

In the LFD 260, the term "large format" has a relative meaning, and may be used as the term indicating a display having a screen larger than a size of a product (for example, the refrigerator, the washer, or the like) displayed on the display screen.

Because products having various types and sizes may be introduced through a system including the LFD 260 and the SFD 290, the number of products, a space, and a cost can be reduced as compared to those in actual stores. In addition, because products having various types and sizes can be introduced to users in one place without movement inside a store through the system including the LFD 260 and the SFD 290, new shopping experience may be provided.

The LFD 260 may be mounted on the fixed stand 265. In addition, the plurality of SFDs 290a to 290h may be mounted on the fixed stand 265. The LFD 260 coupled to the touch panel 240 may be mounted on the fixed stand 265. The LFD 260 integrated with the touch panel 240 may be mounted on the fixed stand 265. One of the SFDs 290a to 290h coupled to the touch panel 240 and the remaining SFDs may be mounted on the fixed stand 265. One of the SFDs 290a to 290h integrated with the touch panel 240 and the remaining SFDs may be mounted on the fixed stand 265. In addition, the support frame (not illustrated), the touch panel 240, and the LFD 260 may be mounted on the fixed stand 265. The support frame (not illustrated), the touch panel 240, and one of the SFDs 290a to 290h may be mounted on the fixed stand 265.

The SFD 290 outputs synchronized content received from the electronic device 100. The content of the SFD 290 received from the electronic device 100 is synchronized with the content output to the LFD 260.

The SFD 290 may be an analog TV, a digital TV, a 3D TV, a smart TV, an LED TV, an OLED TV, a plasma TV, a monitor, a curved TV having a screen with a fixed curvature, a flexible TV having a screen with a fixed curvature, a bent TV having a screen with a fixed curvature, and/or a variable curvature TV in which the curvature of a current screen can be changed by an input received from the user.

The SFD 290 may output HD resolution content, 2K resolution content, and 4K resolution content received from the electronic device 100.

The synchronized content may mean two pieces of content. For example, when the screen size (for example, width×height) of the LFD 260 and the screen sizes (for example, width×height) of the plurality of SFDs 290 are referred to as a "total screen size," a screen of the synchronized content output from the LFD 260 may be part of the total screen size. A screen of the synchronized content output from the SFDs 290a to 290h may be the remaining part excluding the screen size of the LFD from the total screen size.

The synchronized content may mean two pieces of content. When the user's touch is input on a content screen output to the LFD 260, the content screen output from the SFD 290 may be a content screen corresponding to the user's touch. For example, when the user's touch (for example, a touch of one of product features) is detected in the LFD 260, the electronic device 100 may output the synchronized content (a feature introduction video corresponding to the detected feature) corresponding to the user's touch to the SFD 290.

The SFDs 290 may be positioned in various layouts in left and right directions based on the LFD 260. For example, the SFDs 290 may be positioned in a 2D left layout (2×1 layout) and a 2D right layout (2×1 layout) based on the LFD 260. The SFDs 290 may be positioned in a 2D left layout (2×1 layout) and a 2D right layout (2×2 layout) based on the LFD 260. The SFDs 290 may be positioned in a 2D left layout (2×2 layout) and a 2D right layout (2×2 layout) based on the LFD 260. The SFDs 290 may be positioned in a 2D left layout (2×1 layout) and a 2D right layout (2×3 layout) based on the LFD 260. Those skilled in the art will easily understand that the SFDs 290 are not limited to the aforementioned layouts, but may be positioned in various layouts based on the LFD 260.

In the exemplary embodiments of the present invention, the "display" may be used as the term including the LFD 260 and/or the SFD 290. In addition, the "display" may be used as the term including the LFD 260 and/or one of the SFDs 290a to 290h. At least one component may be added or deleted in correspondence with performances of the components of the system illustrated in FIGS. 2A and 2B. In addition, those skilled in the art will easily understand that mutual positions of the components may be changed in correspondence with the performance or structure of the system.

FIG. 3 is a schematic block diagram illustrating the electronic device according to an exemplary embodiment of the present invention.

Referring to FIG. 3, the electronic device 100 may be connected with an external device in a wired or wireless mode using a communication unit 120 or an I/O unit 130. The external device, for example, may include a mobile device 200, a proximity sensor 220, the touch panel 240, a network connection device, a display unit 180, the LFD 260, or the SFD 290. Those skilled in the art will easily understand that a display including the LFD 260 and/or the SFD 290 may be implemented as an analog TV, a digital TV, a 3D TV, a smart TV, an LED TV, an OLED TV, a plasma TV, a monitor, a curved TV having a screen with a fixed curvature, a flexible TV having a screen with a fixed curvature, a bent TV having a screen with a fixed curvature, and/or a variable curvature TV in which the curvature of a current screen can be changed by an input received from the user, but is not limited thereto.

The external device may include another LFD (not illustrated), another SFD (not illustrated), a mobile phone (not illustrated), a smartphone (not illustrated), a tablet PC (not illustrated), an electronic bulletin board (not illustrated), and a server (not illustrated).

The electronic device 100 may include a control unit 110, a communication unit 120, an I/O unit 130, a storage unit 140, and a power unit 150. In addition, the electronic device 100 may include a sensor (not illustrated) (for example, an illumination sensor, a temperature sensor, or the like) for detecting an internal state or an external state of the electronic device 100.

The control unit 110 may include a processor 111, a read only memory (ROM) 112 configured to store a control program for control of the electronic device 100, and a random access memory (RAM) 113 configured to store a signal or data input from outside of the electronic device 100 and used as a storage region corresponding to various tasks to be performed in the electronic device 100.

The control unit 110 performs a function of controlling an overall operation of the electronic device 100 and signal flows between the internal components 120 to 150 of the electronic device 100 and processing data. The control unit 110 controls power to be supplied from the power unit 150 to the internal components 120 to 150. In addition, when a user input condition and/or a user preset and stored condition is satisfied, the control unit 110 may execute one of an operating system (OS) stored in the storage unit 140 and various installed applications.

The processor 111 may include a graphic processing unit (GPU) (not illustrated) for graphic processing of an image or a video. The processor 111 may be implemented in the form of a system on chip (SoC) including a core (not illustrated) and the GPU (not illustrated). The processor 111 may include a single core, a dual core, a triple core, a quad core, etc.

The control unit 110 may include a graphic processing board (not illustrated) which is a separate circuit board electrically connected to the control unit 110. The graphic processing board (not illustrated) may include a graphic processor (not illustrated), a RAM (not illustrated), and/or a ROM (not illustrated). In addition, the processor 111, the ROM 112, and the RAM 113 may be mutually connected through a bus.

In the exemplary embodiment of the present invention, the "control unit" may be used as the term indicating a component including the processor 111, the ROM 112, and the RAM 113. In addition, the "control unit" may be used as the term indicating a component including the processor 111, the ROM 112, the RAM 113, and the graphic processing board (not illustrated).

The control unit may output a control signal so that various types of content (for example, a video, an image, text or a web document, etc.) according to an exemplary embodiment of the present invention is displayed on the LFD 260 and the SFD 290. Here, synchronized content may include synchronized content output to the LFD 260 and synchronized content divided in correspondence with the number of SFDs 290 and output to the SFDs 290.

The control unit may divide content according to the number of SFDs 290 and synchronize the content through the I/O unit 130 using an installed multiple display control (MDC) (not illustrated) application and transmit the content to the plurality of SFDs 290 through the I/O unit 130. For example, when the number of SFDs is 4, the content to be output to the SFDs may be divided into synchronized quarters. When the number of SFDs is 6, the content to be output to the SFDs may be divided into synchronized sixths. In addition, when the number of SFDs is 8, the content to be output to the SFDs may be divided into synchronized eighths.

The control unit may control various environmental settings such as contrast, brightness, sharpness, and color control on content output by the user's input using a multi-display control application.

The SFDs 290 may be positioned in various layouts in left and right directions based on the LFD 260. For example, the SFDs 290 may be positioned in a 2D left layout (2×1 layout) and a 2D right layout (2×1 layout) based on the LFD 260. The SFDs 290 may be positioned in a 2D left layout (2×1 layout) and a 2D right layout (2×2 layout) based on the LFD 260. The SFDs 290 may be positioned in a 2D left layout (2×2 layout) and a 2D right layout (2×2 layout) based on the LFD 260. The SFDs 290 may be positioned in a 2D left layout (2×1 layout) and a 2D right layout (2×3 layout) based on the LFD 260. Those skilled in the art will easily understand that the SFDs 290 are not limited to the aforementioned layouts, but may be positioned in various layouts based on the LFD 260.

The control unit may output the synchronized content to a plurality of LFDs (not illustrated). The synchronized content may include synchronized content that corresponds to the LFD 260 and other LFDs (not illustrated) and is output to the other LFDs (not illustrated) in correspondence with the number of other LFDs (not illustrated).

The control unit may divide content according to the number of LFDs 290 and synchronize the content through the I/O unit 130 using the installed MDC (not illustrated) application and transmit the content to the plurality of LFDs 290 through the I/O unit 130. For example, when the number of other LFDs is 2, the content may be divided into synchronized halves. When the number of other LFDs is 3, the content may be divided into synchronized thirds.

The control unit may control various environmental settings such as contrast, brightness, sharpness, and color control on content output by the user's input using a multi-display control application.

The other LFDs (not illustrated) may be positioned in one of the left and right directions based on the LFD 260. For example, the other LFDs may be positioned in a one-dimensional (1D) 1×2 layout (for example, a layout of 260*a* and 260*b* or a layout of 260*b* and 260*a*), a 1×3 layout (for example, a layout of 260*a*, 260*b*, and 260*c* or a layout of 260*b*, 260*a*, and 260*c*), or a 1×4 layout (for example, a layout of 260*a*, 260*b*, 260*c*, and 260*d* or a layout of 260*b*, 260*a*, 260*c*, and 260*d*) in the left and right directions based on the LFD 260. Those skilled in the art will easily understand that the LFDs are not limited to the aforementioned layouts, but may be positioned in various layouts based on the LFD 260.

The control unit according to the exemplary embodiment of the present invention may control an I/O unit connected to an LFD having a screen of a first diagonal length and a plurality of SFDs having a screen of a diagonal length less than the first diagonal length, the control unit may output the synchronized content to the LFD and the SFDs through the I/O unit, and output a radial menu selected by the user's touch to one of the LFD and the SFDs.

The synchronized content may include first content and second content that are synchronized, and the control unit may output the first content to the screen of the LFD and output the second content to the screens of the plurality of SFDs having a size less than the screen size of the LFD.

The control unit may output synchronized idle content to the LFD and the plurality of SFDs in the idle state of the electronic device.

The control unit may output high-resolution content to the LFD among the synchronized content and output content of resolution lower than the resolution of the content output to the LFD to the SFDs.

The control unit and the I/O unit are connected to the proximity sensor and the control unit may output synchronized hooking content corresponding to the user's proximity detected through the proximity sensor in the idle state to the LFD and the plurality of SFDs.

The control unit and the I/O unit are connected to the touch panel and the control unit may output at least one of the radial menu corresponding to the user's touch detected through the touch panel and synchronized product content to the LFD and the SFDs.

The control unit may further include the communication unit connected to the external mobile device, and receive a control signal for controlling the electronic device from the mobile device through the communication unit.

The control unit may output high-resolution content of the synchronized content to the LFD and output content of resolution lower than the resolution of the high-resolution content to the plurality of SFDs.

The control unit may output the radial menu including right and left semicircles each having a plurality of divisions and the diameter of the outermost semicircle of the right semicircles may be different from that of the outermost semicircle of the left semicircles.

The control unit may output text corresponding to a product displayed on the display to one side of the radial menu.

The control unit may control the I/O unit connected to the LFD having a screen of the first diagonal length and the plurality of SFDs each having a screen of a diagonal length shorter than the first diagonal length. The control unit may output first content synchronized in synchronized content to the LFD through the I/O unit, output second content synchronized in the synchronized content to the plurality of SFDs through the I/O unit, and divide the second content into content divisions equal in number to the plurality of SFDs to output the content divisions to the plurality of SFDs.

Those skilled in the art will easily understand that a configuration and operation of the control unit may be implemented in various types according to the exemplary embodiment of the present invention.

The communication unit 120 may connect the electronic device 100 to the external device according to control of the control unit. The control unit may perform downloading or web browsing on an application from the external device connected through the communication unit 120. In addition, the electronic device 100 may control the external device connected through the communication unit 120 according to control of the control unit. The electronic device 100 may be controlled by a control unit (not illustrated) of the external device connected through the communication unit 120.

In the exemplary embodiment of the present invention, the mobile device 200 may be connected to the electronic device 100 through the communication unit 120. The communication unit 120 may receive a control signal corresponding to remote control from the mobile device 200 according to control of the control unit.

The communication unit 120 may include one of a wired Ethernet 121, a wireless local area network (WLAN) unit 122, and a short-range communication unit 123 in correspondence with the performance and structure of the electronic device 100. The communication unit 120 may include a combination of the wired Ethernet 121, the WLAN unit 122, and the short-range communication unit 123. The WLAN unit 122 may be wirelessly connected to an access point (AP) (not illustrated) in a place in which the AP (not illustrated) is installed according to control of the control unit. The WLAN unit 122 supports Institute of Electrical and Electronics Engineers (IEEE) 802.11x of a WLAN standard. Short-range communication of the short-range communication unit 123 may include Bluetooth, Bluetooth low energy, infrared data association (IrDA), wireless fidelity (Wi-Fi), ultra wideband (UWB), near field communication (NFC), and the like.

The I/O unit 130 may connect the electronic device 100 to the external device according to control of the control unit.

The I/O unit 130 may receive an input of a signal corresponding to the user's proximity by the proximity sensor 220 according to control of the control unit. In addition, the I/O unit 130 may receive an input of a signal corresponding to the user's touch by the touch panel 240 according to control of the control unit.

The I/O unit 130 may output content corresponding to the user's proximity or touch to the LFD 260 and the SFDs 290 according to control of the control unit. The I/O unit 130 may output content corresponding to the user's proximity or touch to the LFD 260 and a projector (not illustrated) according to control of the control unit. In addition, the I/O unit 130 may output content corresponding to the user's proximity or touch to the plurality of LFDs 260 according to control of the control unit.

The I/O unit 130 may output audio (for example, voice or sound) corresponding to the content output to the external device according to control of the control unit. In addition, the I/O unit 130 may output a UI (not illustrated) of a CMS application to the display unit 180 according to control of the control unit.

The I/O unit 130 may include a high-definition multimedia interface (HDMI) port 131, a display port 132, a digital video interface (DVI) port 133, a D-subminiature port 134, an unshielded twisted pair (UTP) cable port 135, a universal serial bus (USB) jack 136, and an audio port 137. The audio port 137 may output the audio to a speaker (not illustrated) and a headphone (not illustrated).

The I/O unit 130 according to the exemplary embodiment of the present invention may output a visual feedback corresponding to an output of content to the LFD 260 and the SFDs 290 according to control of the control unit. The I/O unit 130 may output a visual feedback corresponding to an output of content to the LFD 260 and the projector (not illustrated) according to control of the control unit. In addition, the I/O unit 130 may output a visual feedback corresponding to an output of content to a plurality of LFDs 260 according to control of the control unit. For example, the visual feedback may include a visual effect (for example, a separate image or an animation effect such as a fade applied to a separate image) distinguished from the content.

The I/O unit 130 according to the exemplary embodiment of the present invention may output an auditory feedback corresponding to an output of content to the speaker according to control of the control unit.

In terms of the illustrated components, for example, 131 to 137, in the I/O unit 130, at least one component may be added or deleted in correspondence with the performance of the electronic device 100. In addition, those skilled in the art will easily understand that positions of the illustrated components, for example, 131 to 137, in the I/O unit 130 may be changed in correspondence with the performance or structure of the electronic device 100.

The storage unit 140 may store various data, an OS, and/or an application for driving and controlling the electronic device 100 according to control of the control unit. The storage unit 140 may store signals or data to be input/output to drive the communication unit 120, the I/O unit 130, and the power unit 150.

The storage unit 140 may store a control program for the electronic device 100 and control of the control unit, a dedicated application to be initially provided by a manufacturer, a general-purpose application downloaded from outside, a UI related to the application, an object (for example, an image, text, an icon, a button, or the like) for providing the UI, user information, a document, a database (DB), or related data.

In the exemplary embodiment of the present invention, the term "storage unit" may be used as the term including the storage unit 140, the ROM 112 and the RAM 113 of the control unit, or a memory card (for example, a micro secure digital (SD) card (not illustrated) or a UBS memory (not illustrated)) mounted on the electronic device 100. In addition, the storage unit may include a non-volatile memory, a volatile memory, a hard disk drive (HDD), or a solid state drive (SSD).

Although not illustrated, the storage unit may include a communication module, an I/O module, a storage module, a power module, a display control module, a mobile device module, a proximity sensor module, a touch panel module, or a related DB. The modules (not illustrated) and the DB (not illustrated) of the storage unit may be implemented in the form of software to perform a communication control function, an I/O control function, a display control function, a mobile device control function, a proximity sensor control function, a touch panel control function, a storage control function, a power control function, or a related DB control function. The control unit may control the electronic device 100 using each module and software stored in the storage unit. In addition, the control unit may control the mobile device 200, the proximity sensor 220, the touch panel 240, the LFD 260, the SFD 290, or the projector (not illustrated) connected to the electronic device 100 using each module and the software stored in the storage unit.

The storage unit may store content. For example, the storage unit may store an idle video (which is also referred to as "idle content"), a hooking video (which is also referred to as "hooking content"), a product video (which is also referred to as "product content"), a hooking UI (which is also referred to as a "hooking menu"), or a product UI (which is also referred to as a "product menu") corresponding to content. The storage unit may store content including a video, an image, text, or a web document.

The storage unit may store user proximity information detected by the proximity sensor 220 according to control of the control unit.

The storage unit may store a plurality of pieces of touch position information corresponding to touches (for example, first to seventh touches) and/or hovering detected in the touch panel 240 according to control of the control unit.

The storage unit may store a plurality of pieces of touch position information corresponding to touches (for example, tenth to seventeenth touches) and/or hovering detected in a radial menu (or circular UI) of the touch panel 240 according to control of the control unit.

The storage unit may store position information of continuous touches corresponding to a touch gesture (for example, a drag, a flick, or the like) detected in the touch panel 240 according to control of the control unit.

The storage unit may store a product image to be displayed in content (for example, a product video) and product information according to control of the control unit.

The storage unit may store a product image and product information corresponding to a touch of the user detected in a radial menu (or circular UI) of the touch panel 240.

The storage unit may store the radial menu (or circular menu) output in a hierarchical structure according to control of the control unit.

The storage unit may store a visual feedback and/or an auditory feedback to be output according to control of the control unit.

The power unit 150 supplies power input from an external power source to the internal components 120 to 150 of the electronic device 100 according to control of the control unit. In addition, the power unit 150 may supply power to one or more batteries (not illustrated) located inside the electronic device 100 according to control of the control unit.

In terms of the components, for example, 110 to 150, in the electronic device 100 illustrated in FIG. 3, at least one component may be added or deleted in correspondence with the performance of the electronic device 100. In addition, those skilled in the art will easily understand that positions of the components, for example, 110 to 150, may be changed in correspondence with the performance or structure of the electronic device 100.

FIG. 4 is a schematic flowchart illustrating a screen display method of the electronic device according to an exemplary embodiment of the present invention.

FIGS. 5A to 5L and FIG. 6A to FIG. 6L are diagrams illustrating examples of screens output from the electronic device according to an exemplary embodiment of the present invention.

FIGS. 7A to 7C are diagrams illustrating examples of screens output from the electronic device according to another exemplary embodiment of the present invention.

FIGS. 8A to 8C are diagrams illustrating examples of screens output from the electronic device according to another exemplary embodiment of the present invention.

In step S401 of FIG. 4, the idle video is output to the displays.

Referring to FIG. 5A, a synchronized idle video 300 output from the LFD 260 and the SFDs 290a to 290h is displayed. The idle video may be output when the proximity or touch of the user is not detected during booting of the electronic device 100 and/or a determined time (for example, one minute) (which is changeable).

In the LFD 260 and the SFDs 290, a screen of the idle video (or product menu) 300 is displayed by control of the control unit of the electronic device 100. The idle video 300 may include an idle video 310 output from the LFD 260 and idle videos 350 output from the SFDs 290a to 290h. The idle video 310 output from the LFD 260 and the idle videos 350 output from the SFDs 290a to 290h may be parts of the idle video 300. An overall screen of the idle video 300 may be configured by combining the screens of the idle videos 310 and 350. In addition, the idle video 310 output from the LFD 260 and the idle videos 350 output from the SFDs 290a to 290h may be classified and displayed on separate screens, respectively. In addition, the idle video 300 may be output from one of the LFD 260 and the SFDs 290a to 290h.

When the reproduction of the idle video 300 is completed, the control unit may iteratively reproduce the idle video 300.

The control unit outputs the synchronized idle video 300 to the LFD 260 and the SFDs 290a to 290h. In addition, the control unit may output the idle video 300 to the LFD 260 and the SFDs 290a to 290h. The idle video 300 output from the electronic device 100 may be a 4K resolution video 310 and/or a 2K resolution video 350. In addition, the idle video 300 output from the electronic device 100 may be a 4K resolution video, a QHD resolution video, a 2K resolution video, or an HD resolution video. Those skilled in the art will easily understand that, although an example of the synchronized idle video 300 is displayed as one screen in FIG. 5A, the synchronized idle video 300 may include various screens when a reproduction time of the synchronized idle video 300 output for several seconds to several tens of minutes from the LFD 260 and the SFDs 290 is considered.

The control unit may output a still image which is one piece of content as an idle image (not illustrated) to the LFD 260 and the SFDs 290. The idle image (not illustrated) may be a synchronized 4K resolution image (not illustrated) and/or 2K resolution image (not illustrated). When the electronic device 100 is connected to the components 220 to 280, the control unit may output an idle web page (document) (not illustrated) to the LFD 260 and the SFDs 290. The idle web page (document) may be the synchronized 4K resolution image (not illustrated) and/or 2K resolution image (not illustrated).

The idle video 300 may be configured to include both an idle video and an idle image. The control unit may output one of the synchronized video and image to the LFD 260 and output the remaining synchronized video or image to the SFDs 290a to 290h.

When the user does not approach the display, the control unit may cause the idle video output to the LFD 260 and the SFDs 290a to 290h to be iteratively reproduced.

Various products may be displayed on the LFD 260 and the SFDs 290a to 290h through the idle video 300. As the number of products to be displayed on the idle video increases, the number of screen changes of the synchronized idle video output from the LFD 260 and/or the SFDs 290a to 290h increases. In addition, when various products are output from the LFD 260 and the SFDs 290a to 290h, a reproduction time of the synchronized idle video may also increase.

In step S402 of FIG. 4, the user's proximity is detected.

The user approaches the wall 10 or the display. The proximity sensor 220 detects the user's proximity to the wall 10 or the display in a non-contact or contact mode. The proximity sensor 220 may transmit an analog signal or a digital signal corresponding to the detected proximity of the user to the control unit.

The user touches the touch panel 240. The touch panel 240 detects the user's touch. The touch panel 240 may transmit a signal corresponding to the detected touch of the user to the control unit.

The control unit may receive a signal transmitted from one of the proximity sensor 220 and the touch panel 240 through the I/O unit 130. The control unit may store user proximity information corresponding to the user's proximity in the storage unit. The stored user proximity information may include an identifier (ID) for history management, a detection time of the user's proximity, and an ID of a sensor detecting the user's proximity (or a plurality of sensor IDs in the case of a plurality of proximity sensors).

In step S403 of FIG. 4, an output of the idle video is stopped.

Referring to FIG. 5B, the output of the idle video from the LFD 260 and the projector 280 is stopped.

When the user's proximity is detected through the proximity sensor 220 and/or the touch panel 240 while the idle video 300 is output from the LFD 260 and the SFD 290 (for example, see FIG. 5A), the control unit controls the output of the idle video 300, which is output to the LFD 260 and the SFDs 290, to be stopped. For example, the control unit may stop or gradually stop moving bubbles illustrated in FIG. 5A.

When the user's proximity is detected through the proximity sensor 220 and/or the touch panel 240 while the idle video 300 is output from the LFD 260 and the SFDs 290 (for example, see FIG. 5A), the control unit controls the output of the idle video 300, which is output to one of the LFD 260 and the SFDs 290, to be stopped. For example, the control unit may stop both the idle video to be output to one of the LFD 260 and the SFD 290 and the idle video to be output to the LFD 260 and the SFDs 290.

In step S404 of FIG. 4, the hooking video is output to each of the LFD and the projector.

Referring to FIGS. 5B and 5C, the hooking video 301 is output from the LFD 260 and the SFDs 290. The control unit controls the hooking video 301 to be output to the LFD 260 and the SFDs 290 in correspondence with the user's proximity. The hooking video 301 may include a hooking video 320 output from the LFD 260 and a hooking video (which is also referred to as "hooking content") 360 output from the SFD 290. For example, the control unit may burst at least one of moving bubbles illustrated in FIG. 5A. In addition, the control unit may change a screen of the bubbles illustrated in FIG. 5A to another screen (for example, a screen of another video distinguished from the idle video). Those skilled in the art will easily understand that various hooking videos (for example, sudden disappearance, whirlpool suction, etc.) may be displayed. The user approaching the wall 10 or the display may have interest in a product through the displayed hooking video 301. In the case of a display illustrated in FIG. 5C, it can be seen that an output of the hooking video (which is also referred to as "hooking content") 301 is completed.

The hooking video 301 is distinguished from the idle video 300 illustrated in FIG. 5A. The idle video 300 is a video output in the idle state which is an idle stage and the hooking video 301 may mean a video output in an intermediate stage for going from the idle stage to a product stage for introducing a product and/or a product feature.

In other words, the content output in the electronic device 100 may be divided into three stages. The three stages may include the idle stage (not illustrated), the hooking stage (not illustrated), and the product stage (not illustrated).

In addition, one stage may include three layers. The three layers may be an interaction layer (not illustrated) corresponding to the user's touch, a play (or player) layer (not illustrated) corresponding to a content output, and a sensor UI layer (not illustrated) corresponding to detection of the user's proximity. In one stage, one or two layers may be activated. In addition, in one stage, all the three layers may be activated.

In the idle stage which is the first stage, only the play layer corresponding to the content output is activated. The play layer which is a highest-order layer in the idle stage may output the idle video 300 to the LFD 260 and the SFDs 290 according to control of the control unit.

When the user's proximity is detected in the proximity sensor 220 and/or the touch panel 240, the idle stage which is the first stage is changed to the hooking stage which is the next stage. In the hooking stage, the play layer for outputting the hooking video 301 and the sensor UI layer for receiving the user's input are activated. In the hooking stage, the sensor UI layer is superimposed on the play layer according to control of the control unit and changed to the highest-order layer. The sensor UI layer may include a hooking UI for the user's input (for example, a touch or hovering). The hooking UI may include an icon, a button, an image, or text. A size (width×length) of the hooking UI of the sensor UI layer may be the same as a size (width×length) of the hooking video output from the play layer. The size (width× length) of the hooking UI of the sensor UI layer may be less than the size (width×length) of the hooking video output from the play layer. In addition, a coordinate origin (0, 0) of the hooking UI of the sensor UI layer may be the same as a coordinate origin (0, 0) of the hooking video output from the play layer. A margin (or the remaining region) excluding an icon region, a button region, an image region, or a text region included in the hooking UI may be transparently displayed.

When the user's input is detected in the hooking UI, the hooking stage is changed to the product stage which is the third stage according to control of the control unit. In the product stage, the interaction layer representing the product UI (which is also referred to as a "product menu") and the play layer representing the product video are activated. In the product stage, the interaction layer is changed to the highest-order layer superimposed on the play layer according to control of the control unit.

The interaction layer may include a product UI for the user's input (for example, a touch or hovering). The product UI may include an icon, a button, an image, or text. A size (width×length) of the product UI of the product layer may be the same as a size (width×length) of the product video output from the play layer. The size (width×length) of the product UI may be less than the size (width×length) of the product video output from the play layer. In addition, a coordinate origin (0, 0) of the product layer may be the same as a coordinate origin (0, 0) of the product video (which is also referred to as "product content") output from the play layer. Even after step S404 of FIG. 4, a coordinate origin (0, 0) of the product UI may be applied to be the same as a coordinate origin (0, 0) of the product video (which is also referred to as "product content") output from the play layer. A margin excluding an icon region, a button region, an image region, or a text region included in the product UI may be transparently displayed.

When the user's input is detected in the icon of the product UI, the control unit may output a product video corresponding to an icon from which the user's input is detected from the play layer. When the product video is output from the play layer, the play layer is changed to the highest-order layer. When the output of the product video is completed, the interaction layer is changed to the highest-order layer again in place of the play layer.

When the user's input is not detected for a preset time (for example, 1 minute) (which is changeable) in the product UI, the control unit may change the product stage to the idle state. The control unit outputs the idle video in the idle stage.

In step S405 of FIG. 4, the hooking UI is output to the LFD.

Referring to FIG. 5C, the control unit controls the hooking UI 324 to be output to the LFD 260 in correspondence with the detected proximity of the user. In addition, the control unit may output the hooking UI 324 to the display in correspondence with the detected proximity of the user.

In the hooking stage, the sensor UI layer, which is the highest-order layer, includes the hooking UI 324. The hooking UI 324 may include a circular UI 400, an icon, a button, an image, or text. The hooking UI 324 may be displayed to be superimposed on the hooking video 301 output from the play layer. The hooking UI 324 may include the circular UI 400 corresponding to "Touch or swipe to begin." A margin (or the remaining region) excluding the circular UI 400 from the hooking UI 325 may be transparently displayed. When the interaction layer is displayed, the play layer may be positioned in the lower-order layer of the interaction layer.

When the LFD 260 has a size corresponding to an actual product, a position of the circular UI 400 to be displayed on the LFD 260 may move in consideration of a height or wheelchair use of the user. For example, when the user inputs a touch gesture (for example, a drag) on the circular UI 400, the position of the circular UI 400 may change to a final drag position. The touch gesture may be various touch gestures (for example, a double tap, a flick, and the like) as well as the drag. In addition, the user may change the position of the circuit UI 400 using a multi-touch gesture as well as a single-touch gesture.

The control unit may output the hooking UI 324 to each of the LFD 260 and the SFD 290 in correspondence with the detected proximity of the user.

When the user does not select a product on the LFD 260, the SFD 290a may display a logo, an icon, or a trademark (for example, a center stage 290a1).

In step S406 of FIG. 4, the touch panel detects a touch in the hooking UI.

Referring to FIG. 5C, the user makes a first touch 326 on the circular UI 400 displayed on the hooking UI 324. The control unit may detect the first touch 326 using the touch panel 240 and a touch panel controller (not illustrated). The control unit may receive a first touch position 326a (for example, X1 and Y1 coordinates) corresponding to the first touch 326 from the touch panel controller.

The control unit may store first touch position information corresponding to the first touch position 326a in the storage unit. The stored first touch position information may include an ID for history management, a touch position, a touch detection time, and touch information (for example, a touch pressure, a touch direction, a touch duration time, or the like). Those skilled in the art will easily understand that the stored first touch position information may differ according to the scheme of the touch panel 240.

The first touch 326 may be made by one of fingers including the thumb or a touchable input unit. In addition, the first touch 326 may include hovering and include a touch gesture (for example, a drag, a flick, or the like), a single touch, or a multi-touch.

In step S407 of FIG. 4, the product UI is output to the display.

Referring to FIG. 5D, the control unit controls the LFD 260 to output a product UI 334 corresponding to the first touch 326.

When the first touch 326 is detected in the hooking UI 324, the control unit outputs the product UI 334 to the LFD 260. When the first touch 326 is detected in the hooking UI 324, the control unit may output the product UI 334 to the LFD 260 and the SFDs 290. The output product UI 334 may include a circular UI 401 and texts 420a, 430a, and 450a. The control unit may perform an output in which the product UI 334 output from the LFD 260 is superimposed on the product video 330.

The LFD 260 and the SFDs 290 output a product video 302. When the first touch 326 is detected in the hooking UI 324, the control unit may output the product video 330 to the LFD 260 and output product videos 370 to the SFDs 290.

The control unit may output the synchronized product videos 370 through the LFD 260 and the SFDs 290. The control unit may output the synchronized product videos 370 having different resolutions to the LFD 260 and the SFDs 290. The synchronized product videos 370 having the different resolutions may be a 4K resolution, a QHD resolution video, a 2K resolution video, or an HD resolution video.

In the product UI 334 which is the highest-order layer in the product stage, the circular UI 401 may be a UI of a form including a plurality of semicircles having different diameters based on a center 401a. The semicircles of the circular UI 401 are divided in a diameter direction and a radial direction. A left semicircle of the circular UI 401 may be a higher-order layer (for example, a first layer 405) in a menu of a tree structure. The first layer 405 may include a plurality of items (for example, icons). For example, the plurality of items may include a start-over item 406, a category item 407, and a help item 409. Those skilled in the art will easily understand that the plurality of items to be included in the first layer 405 may be added, deleted, or changed.

The right semicircle may be a layer (for example, a second layer 410) lower than a left higher-order layer. The second layer 410 may include a plurality of items (for example, icons). For example, the plurality of items may include a cleaner 420, a refrigerator 430, an electric oven 440, and a washer 450. A category icon corresponding to a higher-order layer corresponds to a left semicircle and a right semicircle may include a product icon (for example, a refrigerator, a washer, or the like) of a lower-order layer corresponding to a category icon of the higher-order layer. Those skilled in the art will easily understand that the plurality of items to be included in the second layer 410 may be added, deleted, or changed.

In the circle UI 401, divisions may be classified into a division in which there is an icon (or text) and a division in which there is no icon. For example, the left semicircle, which is the first layer, may be divided into a division 405*a* in which there is an icon (or text) and a division 405*b* in which there is no icon. The right semicircle, which is the second layer, may be divided into a division 410*a* in which there is an icon (or text) and a division 410*b* in which there is no icon. In addition, in the circular UI 401, the divisions may be identified by colors.

Divisions 405*a* and 410*a* in which there is an icon (or text) may be closer to a center 401*a* than divisions 405*b* and 410*b*. In addition, a position changes and the divisions 405*b* and 410*b* in which there is no icon may be closer to the center 401*a* than the divisions 405*a* and 410*a* in which there is an icon (or text).

A diameter of an outermost right semicircle of the circular UI 401 is larger than a diameter of an outermost left semicircle. In addition, the diameter of the outermost left semicircle of the circular UI 401 may be larger than the diameter of the outermost right semicircle.

In the circular UI 401, there may be a hollow region from the center 401*a* to the division 405*a* or 410*a* in which there is an icon (or text). The division 405*a* in which there is an icon (or text) of the left semicircle may be in contact with the division 410*a* in which there is an icon (or text) of the right semicircle. In addition, the division 405*b* in which there is no icon of the left semicircle may be in contact with the division 410*a* in which there is an icon of the right semicircle.

In addition, text corresponding to a category icon (or icons 420*a*, 430*a*, and 450*a*) may be displayed on one side of the circular UI 401. Text (or icons 420*a*, 430*a*, and 450*a*) may be connected with a product displayed on a display by an extension line. Text corresponding to the category icon (or icons 420*a*, 430*a*, and 450*a*) may be selected by a user.

Products initially displayed on the display may be diverse in a product video 370. For example, the initially displayed products may include a washer, a two-door refrigerator, and a cleaner. In addition, the products capable of being displayed initially may include other products (for example, an air conditioner, an electric range, an oven, an air freshener, and the like).

Referring to FIG. 5K, a position of the circular UI 400 or 324 to be displayed on the LFD 260 may move in consideration of a height or wheelchair use of the user because the LFD 260 has a size corresponding to an actual product. For example, when the user inputs a touch gesture (for example, a drag) on the circular UI 400, the position of the circular UI 400 may change to a final drag position. The touch gesture may be various touch gestures (for example, a double tap, a flick, and the like) as well as the drag. In addition, the position may change using a multi-touch gesture as well as a single-touch gesture.

Those skilled in the art will easily understand that a diameter of a semicircle displayed on the circular UI 401, the number and positions of divisions, a division color, and the number and positions of divisions in which there is an icon (or text) may change in correspondence with a type and feature of a product.

When a first touch 326 is detected in the hooking UI 324, the control unit may output synchronized product videos 302 to the display. The control unit 110 may output the synchronized product videos 302 having different resolutions to the LFD 260 and the SFDs 290. A synchronized product video 370 having different resolution may be 4K resolution videos, QHD resolution videos, 2K resolution videos, or HD resolution videos.

In step S408 of FIG. 4, a touch is detected in a product UI through a touch module.

Referring to FIG. 5D, the control unit controls a product UI 334 to be output to the LFD 260. The control unit may extend and output the product UI 334 to the LFD 260 and the SFDs 290.

The user makes a second touch 470 on the circular UI 401. The control unit may detect a second touch 470 using the touch panel 240 and the touch panel controller (not illustrated). The control unit may receive a second touch position 470*a* (for example, X2 and Y2 coordinates) corresponding to the second touch 470 from the touch panel controller.

The control unit may store second touch position information corresponding to the second touch position 470*a* in the storage unit. The stored second touch position information may include an ID for history management, a touch position, a touch detection time, and touch information (for example, a touch pressure, a touch direction, a touch duration time, or the like). Those skilled in the art will easily understand that the stored second touch position information may differ according to the scheme of the touch panel 240.

The second touch 470 may be made by one of fingers including the thumb or a touchable input unit. In addition, the second touch 470 may include hovering and include a touch gesture (for example, a drag, a flick, or the like), a single touch, or a multi-touch.

According to another exemplary embodiment of the present invention, the user may make a 30th touch (not illustrated) on the washer 450 of the circular UI 401. Because the detection of the 30th touch (not illustrated) and the storage of the 30th touch position information are substantially the same as those of FIG. 5D, redundant description thereof will be omitted.

According to another exemplary embodiment of the present invention, the user may make a 40th touch (not illustrated) on the cleaner 420 of the circular UI 401. Because the detection of the 40th touch (not illustrated) and the storage of the 40th touch position information are substantially the same as those of FIG. 5D, redundant description thereof will be omitted.

In step S409 of FIG. 4, a product video is output to each display.

Referring to FIG. 5E, the control unit controls a product UI 334*a* corresponding to the second touch 470 to be output to the display. The product UI 334*a* includes a circular UI 402 and text 430a in which a position changes. The control unit outputs product videos 331 and 371 corresponding to the second touch 470 to the display. The control unit outputs the product videos 331 and 371 including various refrigerators in correspondence with the second touch 470.

The circular UI 402 may be a UI of a form including a plurality of semicircles having different diameters based on a center 401a and separated divisions 405a in the semicircles. The semicircles of the circular UI 401 are divided in a diameter direction and a radial direction. A left semicircle of the circular UI 401 may be a higher-order layer (for example, the second layer 410) in a menu of a tree structure. The second layer 410 may include a plurality of items. For example, the plurality of items may include a cleaner 420, a refrigerator 430, an electric oven 440, and a washer 450. Those skilled in the art will easily understand that the plurality of items to be included in the second layer 410 may be added, deleted, or changed.

The right semicircle may be a layer (for example, a third layer 415) lower than a left higher-order layer. The third layer 415 may include a plurality of items (for example, icons). For example, the plurality of items may include icons of a refrigerator type 431, a refrigerator size 432, a refrigerator finish/design 433, a dispenser 434, and a refrigerator capacity 435. Those skilled in the art will easily understand that a plurality of items included in the third layer 415 may be added, deleted, or changed.

In the circle UI 401, divisions may be classified into a division in which there is an icon (or text) and a division in which there is no icon. For example, the left semicircle, which is the second layer, may be divided into a division 410a in which there is an icon (or text) and a division 410b in which there is no icon. The right semicircle, which is the third layer, may be divided into a division 415a in which there is an icon (or text) and a division 415b in which there is no icon. In addition, in the circular UI 402, the divisions may be identified by colors.

Divisions 410a and 415a in which there is an icon (or text) may be closer to a center 401a than divisions 410b and 415b. In addition, a position changes and the divisions 401b and 415b in which there is no icon may be closer to the center 401a than the divisions 410a and 415a in which there is an icon (or text).

A diameter of an outermost right semicircle of the circular UI 402 is larger than a diameter of an outermost left semicircle. In addition, the diameter of the outermost left semicircle of the circular UI 402 may be larger than the diameter of the outermost right semicircle.

In the circular UI 402, there may be a hollow region from the center 401a to the division 410a or 415a in which there is an icon (or text). The division 410a in which there is an icon (or text) of the left semicircle may be in contact with the division 415a in which there is an icon (or text) of the right semicircle. In addition, the division 410b in which there is no icon of the left semicircle may be in contact with the division 415a in which there is an icon (or text) of the right semicircle.

On one side of the circular UI 402, a division 405a separated in correspondence with the second touch 470 may be displayed to be separated from the semicircles. The separated division 405a may include some of items of the first layer 405. The separated division 405a may be positioned in an internal region of a circle (for example, a virtual left semicircle corresponding to an outermost right semicircle) illustrated in the diameter of the outermost right semicircle.

On one side of the circular UI 402, text (or an icon 430a) corresponding to the second touch 470 may be moved and displayed. The text (or icon 430a) may be selected by the user.

Referring to FIG. 5L, a position of the circular UI 401 or 334 to be displayed on the LFD 260 may move in consideration of a height or wheelchair use of the user because the LFD 260 has a size corresponding to an actual product. For example, when the user inputs a touch gesture (for example, a drag) on the circular UI 401, the position of the circular UI 401 may change to a final drag position. The touch gesture may be various touch gestures (for example, a double tap, a flick, and the like) as well as the drag. In addition, the position may change using a multi-touch gesture as well as a single-touch gesture.

Those skilled in the art will easily understand that a diameter of a semicircle displayed on the circular UI 402, the number and positions of divisions, a division color, and the number and positions of divisions in which there is an icon (or text) may change in correspondence with a type and feature of a product.

Referring to FIG. 7A according to another exemplary of the present invention, the control unit outputs a circular UI 602 corresponding to the 30th touch (not illustrated). The circular UI 602 is substantially similar to the circular UI 402 of FIG. 5E. The first layer 405 and the second layer 410 are the same and only the right semicircle, which is a third layer 616, is different from the third layer 415 of FIG. 5E. A plurality of items of a product (for example, a washer) corresponding to the 30th touch (not illustrated) are displayed in the third layer 616. For example, the plurality of items may include a washer type 451, a refrigerator finish/design 452, a washer capacity 453, and a steam 454. Those skilled in the art will easily understand that the plurality of items to be included in the third layer 616 may be added, deleted, or changed.

The control unit outputs product videos 631 and 671 corresponding to the 30th touch (not illustrated).

Because detailed description of FIG. 7A is substantially the same as detailed descriptions of FIGS. 5D and 5E, redundant description will be omitted.

Referring to FIG. 8A according to another exemplary of the present invention, the control unit outputs a circular UI 702 corresponding to the 40th touch (not illustrated). The circular UI 702 is substantially similar to the circular UI 402 of FIG. 5E. The first layer 405 and the second layer 410 are the same and only the right semicircle, which is a third layer 716, is different from the third layer 415 of FIG. 5E. A plurality of items of a product (for example, a cleaner) corresponding to the 40th touch (not illustrated) are displayed in the third layer 716. For example, the plurality of items may include a cleaner type 421, a cleaner finish/design 422, a washer capacity 423, and suction power 424. Those skilled in the art will easily understand that the plurality of items to be included in the third layer 716 may be added, deleted, or changed.

The control unit outputs product videos 731 and 771 corresponding to the 40th touch (not illustrated).

Because detailed description of FIG. 8A is substantially the same as detailed descriptions of FIGS. 5D and 5E, redundant description will be omitted.

Referring to FIG. 5F, the control unit outputs a circular UI 402a corresponding to a third touch 471 from the display. The control unit outputs product videos 331 and 371 corresponding to the third touch 471. The control unit may output another product video corresponding to the third touch 471 to the display.

The user makes the third touch 471 on the refrigerator type 431 of the circular UI 402. The control unit may detect the third touch 471 using the touch panel 240 and the touch panel controller (not illustrated). The control unit may receive a third touch position 471a (for example, X3 and Y3 coordinates) corresponding to the third touch 471 from the touch panel controller.

The control unit may store third touch position information corresponding to the third touch position 471a in the storage unit. The stored third touch position information may include an ID for history management, a touch position, a touch detection time, and touch information (for example, a touch pressure, a touch direction, a touch duration time, or the like). Those skilled in the art will easily understand that the stored third touch position information may differ according to the scheme of the touch panel 240.

The third touch 471 may be made by one of fingers including the thumb or a touchable input unit. In addition, the third touch 471 may include hovering and include a touch gesture (for example, a drag, a flick, or the like), a single touch, or a multi-touch.

The control unit displays sub-items 431a to 431c of the refrigerator type 431 on one side of the refrigerator type 431 in correspondence with the third touch 471. The sub-items 431a to 431c may be displayed to extend as indicated by extension lines from the division of the refrigerator type 431 based on the center 401a. In addition, the sub-items 431a to 431c may be displayed to be spread from the division of the refrigerator type 431. Sub-items corresponding to the refrigerator type 431 other than the displayed sub-times 431a to 431c include a T-type refrigerator (TDR) 431a, a French door refrigerator (FDR) 431b, and a food showcase refrigerator (FSR) 431c. Each sub-item may include text and a thumbnail image (for example, a display of a color or pattern).

When the FDR 431b is selected by the user's touch (not illustrated), the control unit may output a product video (not illustrated) including various FDRs to the display in correspondence with the detected touch of the user. In addition, the sub-item may include a top mounted freezer (TMF), a bottom mounted freezer (BMF), or a side by side refrigerator (SBS).

Referring to FIG. 5G, the control unit outputs a circular UI 402b corresponding to a fourth touch 472 to the display. The control unit outputs product videos 331 and 371 corresponding to the fourth touch 472 to the display. The control unit may output other product videos corresponding to the fourth touch 472 to the display.

The user makes the fourth touch 472 on a refrigerator size 432 of the circular UI 402. The control unit may detect the fourth touch 472 using the touch panel 240 and the touch panel controller (not illustrated). The control unit may receive a fourth touch position 472a (for example, X4 and Y4 coordinates) corresponding to the fourth touch 472 from the touch panel controller.

The control unit may store fourth touch position information corresponding to the fourth touch position 472a in the storage unit. The stored fourth touch position information may include an ID for history management, a touch position, a touch detection time, and touch information (for example, a touch pressure, a touch direction, a touch duration time, or the like). Those skilled in the art will easily understand that the stored fourth touch position information may differ according to the scheme of the touch panel 240.

The fourth touch 472 may be made by one of fingers including the thumb or a touchable input unit. In addition, the fourth touch 472 may include hovering and include a touch gesture (for example, a drag, a flick, or the like), a single touch, or a multi-touch.

The control unit displays sub-items 432a to 432c of the refrigerator size 432 on one side of the refrigerator size 432 in correspondence with the fourth touch 472. The sub-items 432a to 432c may be displayed to extend as indicated by extension lines from the division of the refrigerator size 432 based on the center 401a. In addition, the sub-items 432a to 432c may be displayed to be spread from the division of the refrigerator size 432. The displayed sub-items include 36 inches 432a, 33 inches 432b, and 30 inches 432c. Each sub-item may include text and a thumbnail image (for example, a display of a color or pattern).

When 36 inches 432a is selected by the user's touch (not illustrated), the control unit may output a product video (not illustrated) including a refrigerator of 36 inches in correspondence with the detected touch of the user to the display. The sub-item corresponding to the refrigerator size 432 other than the displayed sub-items 432a to 432c may include 29 inches and below or 39 inches and above.

Referring to FIG. 5H, the control unit outputs a circular UI 402c corresponding to a fifth touch 473 to the display. The control unit outputs product videos 331 and 371 corresponding to the fifth touch 473 to the display. The control unit may output other product videos corresponding to the fifth touch 473 to the display.

The user makes the fifth touch 473 on a refrigerator finish/design 433 of the circular UI 402. The control unit may detect the fifth touch 473 using the touch panel 240 and the touch panel controller (not illustrated). The control unit may receive a fifth touch position 473a (for example, X5 and Y5 coordinates) corresponding to the fifth touch 473 from the touch panel controller.

The control unit may store fifth touch position information corresponding to the fifth touch position 473a in the storage unit. The stored fifth touch position information may include an ID for history management, a touch position, a touch detection time, and touch information (for example, a touch pressure, a touch direction, a touch duration time, or the like). Those skilled in the art will easily understand that the stored fifth touch position information may differ according to the scheme of the touch panel 240.

The fifth touch 473 may be made by one of fingers including the thumb or a touchable input unit. In addition, the fifth touch 473 may include hovering and include a touch gesture (for example, a drag, a flick, or the like), a single touch, or a multi-touch.

The control unit displays sub-items 433a to 433d of the refrigerator finish/design 433 on one side of the refrigerator type 431 in correspondence with the fifth touch 473. The sub-items 433a to 433d may be displayed to extend as indicated by extension lines from the division of the refrigerator finish/design 433 based on the center 401a. In addition, the sub-items 433a to 433d may be displayed to be spread from the division of the refrigerator finish/design 433. The displayed sub-times include a real stainless steel (RSS) 433a, a stainless steel premium (SSP) 433b, white 433c, and black 433d. Each sub-item may include text and a thumbnail image (for example, a display of a color or pattern).

When the SSP 433b is selected by the user's touch (not illustrated), the control unit may output a product video (not illustrated) including the finished refrigerator to the display in correspondence with the detected touch of the user. Sub-items corresponding to the refrigerator finish/design 433 other than the displayed sub-items 433a to 433d may include various colors (for example, silver (not illustrated)) and a pattern (for example, a timeless design pattern (not illustrated)).

Referring to FIG. 5I, the control unit outputs a circular UI 402d corresponding to a sixth touch 474 to the display. The control unit outputs product videos 331 and 371 corresponding to the sixth touch 474 to the display. The control unit may output other product videos corresponding to the sixth touch 474 to the display.

The user makes the sixth touch 474 on a refrigerator dispenser 434 of the circular UI 402. The control unit may detect the sixth touch 474 using the touch panel 240 and the touch panel controller (not illustrated). The control unit may receive a sixth touch position 474a (for example, X6 and Y6 coordinates) corresponding to the sixth touch 474 from the touch panel controller.

The control unit may store sixth touch position information corresponding to the sixth touch position 474a in the storage unit. The stored sixth touch position information may include an ID for history management, a touch position, a touch detection time, and touch information (for example, a touch pressure, a touch direction, a touch duration time, or the like). Those skilled in the art will easily understand that the stored sixth touch position information may differ according to the scheme of the touch panel 240.

The sixth touch 474 may be made by one of fingers including the thumb or a touchable input unit. In addition, the sixth touch 474 may include hovering and include a touch gesture (for example, a drag, a flick, or the like), a single touch, or a multi-touch.

The control unit displays sub-items 434a to 434d of the refrigerator dispenser 434 on one side of the refrigerator dispenser 434 in correspondence with the sixth touch 474. The sub-items 434a to 434d may be displayed to extend as indicated by extension lines from the division of the refrigerator dispenser 434 based on the center 401a. In addition, the sub-items 434a to 434d may be displayed to be spread from the division of the refrigerator dispenser 434. The displayed sub-items include normal 434a for providing ice and water, sparkling 434b for providing carbonated water, a twin ice maker 434c, and not available (N/A) 434d. Each sub-item may include text and a thumbnail image (for example, a display of a color or pattern).

When the sparkling 434b is selected by the user's touch (not illustrated), the control unit may output a product video (not illustrated) including a refrigerator having the sparkling 434b corresponding to the detected touch of the user to the display. A sub-item corresponding to the refrigerator dispenser 434 other than the displayed sub-items 434a to 434d may include various items.

Referring to FIG. 5J, the control unit outputs a circular UI 402e corresponding to a seventh touch 475 to the display. The control unit outputs product videos 331 and 371 corresponding to the seventh touch 475 to the display. The control unit may output other product videos corresponding to the seventh touch 475 to the display.

The user makes the seventh touch 475 on a refrigerator capacity 435 of the circular UI 402. The control unit may detect the seventh touch 475 using the touch panel 240 and the touch panel controller (not illustrated). The control unit may receive a seventh touch position 475a (for example, X7 and Y7 coordinates) corresponding to the seventh touch 475 from the touch panel controller.

The control unit may store seventh touch position information corresponding to the seventh touch position 475a in the storage unit. The stored seventh touch position information may include an ID for history management, a touch position, a touch detection time, and touch information (for example, a touch pressure, a touch direction, a touch duration time, or the like). Those skilled in the art will easily understand that the stored seventh touch position information may differ according to the scheme of the touch panel 240.

The seventh touch 475 may be made by one of fingers including the thumb or a touchable input unit. In addition, the seventh touch 475 may include hovering and include a touch gesture (for example, a drag, a flick, or the like), a single touch, or a multi-touch.

The control unit displays sub-items 435a to 435d of the refrigerator capacity 435 on one side of the refrigerator capacity 435 in correspondence with the seventh touch 475. The sub-items 435a to 435d may be displayed to extend as indicated by extension lines from the division of the refrigerator capacity 435 based on the center 401a. In addition, the sub-items 435a to 435d may be displayed to be spread from the division of the refrigerator capacity 435. The displayed sub-item include 34 cubic feet and above 435a, 33 to 29 cubic feet 435b, 28 to 26 cubic feet 435c, and 25 cubic feet and below 435d. Each sub-item may include text and a thumbnail image (for example, a display of a color or pattern).

When 33 to 29 cubic feet 435b is selected by the user's touch (not illustrated), the control unit may output a product video (not illustrated) including a refrigerator having a capacity of 33 to 29 cubic feet 435b to the display in correspondence with the detected touch of the user. In addition, a sub-item corresponding to various refrigerator capacities 435 other than the displayed sub-items 435a to 435d may be included.

Referring to FIG. 6A, an image of a selected product (for example, a refrigerator) (which is changeable) and product information are output to the display. The control unit may output product videos 335 and 375 corresponding to a selected product (for example, a refrigerator) (which is changeable) to the display in correspondence with the user's input detected in the circular UIs 400 to 402. In addition, the control unit may output the product video 375 corresponding to the product information of the selected product to the display in correspondence with the user's input detected in the circular UIs 400 to 402.

A product image and product information corresponding to a product may be configured as one product video or a plurality of product videos. For example, the product image and the product information corresponding to the product may be one product video (one screen). In addition, the product image and the product information corresponding to the product may be a plurality of product videos (a plurality of screens). For example, one product video output to the LFD 260 and the SFDs 290c to 290h and one product video output to the SFDs 290a and 290b may be a plurality of product videos (a plurality of screens). In addition, one product video output from the LFD 260, one product video output to the LFD 260 and the SFDs 290c to 290h, and one product video output to the SFDs 290a and 290b may be a plurality of product videos (a plurality of screens).

The control unit may select a relevant product by referring to the user's input detected in the circular UIs 400 to 402. The user's input, for example, may select the circular UI 400, then select the refrigerator 430 in the circular UI 401, then select FSR 431c in the refrigerator type 431 of the circular UI 402, then select the 36 inches 432a in the refrigerator size 432, then select the silver (not illustrated) in the refrigerator finish/design 433, then select the normal 434a in the refrigerator dispenser 434, and then select the 25 cubic feet and below 435d in the refrigerator capacity 435.

The user's input may be input in an arbitrary sequence in the circular UI 402. For example, the refrigerator capacity 435 may be first selected, then the refrigerator type 431 may be selected, and the refrigerator dispenser 434 may be selected.

The circular UI 403 is similar to the circular UI 402 of FIG. 5E. The circular UI 403 is the same as the circular UI 402 in terms of a separated section which is a first layer 405 and a left semicircle which is a second layer 410, and the circular UI 403 is different from the circular UI 402 in that a third layer 415 is not a right semicircle and only a fourth layer 416 is a right semicircle. For example, the right semicircle of the circular UI 403 may be configured by the fourth layer 416 rather than the third layer 415.

The right semicircle which is the fourth layer 416 may include an item corresponding to the refrigerator 500 as the selected product. The fourth layer 416 includes 'Zoom' 461 displayed by enlarging the refrigerator 500, 'Scene' 462 for displaying an image of a refrigerator, 'Compare' 463 for comparing the refrigerator to another refrigerator or comparing the refrigerator to another product (for example, a washer), 'Buy it' 464 for buying the refrigerator, and 'Save & Share' 465 for sharing images of refrigerators or product specs.

The circular UI 403 includes features 510 to 530 extending from the center 401a. Extension lines extending from the center 401a to the features 510 to 530 may overlap separation lines for separating divisions included in the right semicircle.

An item included in the feature includes an incase/showcase 510, a metal cooling door 520, and a sliding drawer 530. In addition, the item included in the feature may include self-clean and VHT technology.

Those skilled in the art will easily understand that a plurality of items included in the fourth layer 416 may be added, deleted, or changed.

Referring to FIG. 6A, the user makes an eleventh touch 570 on the incase/showcase 510 of the circular UI 403. The control unit may detect the eleventh touch 570 using the touch panel 240 and the touch panel controller (not illustrated). The control unit may receive an eleventh touch position 570a (for example, X11 and Y11 coordinates) corresponding to the eleventh touch 570 from the touch panel controller.

The control unit may store eleventh touch position information corresponding to the eleventh touch position 570a in the storage unit. The stored eleventh touch position information may include an ID for history management, a touch position, a touch detection time, and touch information (for example, a touch pressure, a touch direction, a touch duration time, or the like). Those skilled in the art will easily understand that the stored eleventh touch position information may differ according to the scheme of the touch panel 240.

The eleventh touch 570 may be made by one of fingers including the thumb or a touchable input unit. In addition, the eleventh touch 570 may include hovering and include a touch gesture (for example, a drag, a flick, or the like), a single touch, or a multi-touch.

Referring to FIG. 7B according to another exemplary embodiment of the present invention, an image of a selected product (for example, a refrigerator) (which is changeable) and product information are output to the display. The control unit outputs product videos 635 and 675 corresponding to a selected product (for example, the refrigerator) (which is changeable) to the display in correspondence with the user's input detected in the circular UIs 400, 401, and 602. In addition, the control unit may output the product video 675 corresponding to the product information of the selected product to the display in correspondence with the user's input detected in the circular UIs 400, 401, and 602.

Because detailed description of FIG. 7B is substantially the same as detailed descriptions of FIGS. 6A and 6B, redundant description thereof will be omitted.

Referring to FIG. 8B according to another exemplary embodiment of the present invention, an image of a selected product (for example, a cleaner) (which is changeable) and product information are output to the display. The control unit outputs product videos 735 and 775 corresponding to a selected product (for example, the cleaner) (which is changeable) to the display in correspondence with the user's input detected in the circular UIs 400, 401, and 702. In addition, the control unit may output the product video 775 corresponding to the product information of the selected product to the display in correspondence with the user's input detected in the circular UIs 400, 401, and 702.

Because detailed description of FIG. 8B is substantially the same as those of FIGS. 6A and 6B, redundant description thereof will be omitted.

When the user's input is not detected during a time (for example, one minute) (which is changeable) set in FIG. 6A, the control unit may change a product stage to an idle stage.

Referring to FIG. 6B, texts (or icons) 511 and 512 are displayed on the display. The control unit outputs the texts (or icons) 511 and 512 corresponding to the eleventh touch 570 to the display so that the texts (or icons) 511 and 512 are separated from a circular UI 503. The text 511 may be 'slide to open incase' and the text 512 may be 'slid to open showcase.' In addition, the control unit may control the circular UI 403 rather than the circular UI 503 to be displayed. The control unit may output the texts (or icons) 511 and 512 corresponding to the eleventh touch 570 to the LFD 260. The control unit may output product videos 335a and 375a corresponding to the eleventh touch 570 to the display.

Referring to FIG. 6B, the user makes a twelfth touch 571 on the text 511. The control unit may detect the twelfth touch 571 using the touch panel 240 and the touch panel controller (not illustrated). The control unit may receive a twelfth touch position 571a (for example, X12 and Y12 coordinates) corresponding to the twelfth touch 571 from the touch panel controller.

The control unit may store twelfth touch position information corresponding to the twelfth touch position 571a in the storage unit. The stored twelfth touch position information may include an ID for history management, a touch position, a touch detection time, and touch information (for example, a touch pressure, a touch direction, a touch duration time, or the like). Those skilled in the art will easily understand that the stored twelfth touch position information may differ according to the scheme of the touch panel 240.

The twelfth touch 571 may be made by one of fingers including the thumb or a touchable input unit. In addition, the twelfth touch 571 may include hovering and include a touch gesture (for example, a drag, a flick, or the like), a single touch, or a multi-touch.

Referring to FIGS. 6C to 6F, the control unit controls product videos 335b to 335e or 375b to 375e corresponding to the twelfth touch 571 to be output to the display. The product videos 335b to 335e or 375b to 375e may indicate that drinking water, food materials, vegetables, fruits, or the like capable of being housed in the refrigerator may be easily housed in a housing space (for example, a shelf, a drawer, or the like) of the refrigerator or may be easily found from the housing space of the refrigerator.

The control unit may output a pop-up 335*c*1 to the product videos 335*b* to 335*e* corresponding to the twelfth touch 571. The pop-up 335*c*1 may include a slide bar 335*c*2. The control unit outputs product videos 335*b* to 335*e* showing drinking water, food materials, or the like housed in each housing space inside the incase of the refrigerator to the LFD 260 in correspondence with the user's touch (or a touch gesture such as a drag).

Referring to FIGS. 6D to 6F, the user makes a thirteenth touch 572 on a slide bar 335*c*2. The control unit may detect the thirteenth touch 572 using the touch panel 240 and the touch panel controller (not illustrated). The control unit may receive a thirteenth touch position 572*a* (for example, X13 and Y13 coordinates) corresponding to the thirteenth touch 572 from the touch panel controller. The control unit may output product videos 335*b* to 335*e* or 375*b* to 375*e* corresponding to thirteenth touch positions 572*a* to 572*c* in the slide bar 335*c*2 to the display.

The user may make the thirteenth touch gestures 572*a*→572*b*→572*c* on the slide bar 335*c*2. The control unit may make the thirteenth touch gestures 572*a*→572*b*→572*c* using the touch panel 240 and the touch panel controller (not illustrated). The control unit may receive a plurality of thirteenth touch gestures 572*a*1→572*b*1→572*c*1 (for examples X13a, X13b, and X13c coordinates and Y13a, Y13b, and Y13c coordinates) corresponding to the thirteenth touch gestures 572*a*→572*b*→572*c* from the touch panel controller. For example, there may be many touch positions (not illustrated) detected on the touch panel 240 and the touch panel controller (not illustrated) between thirteenth touch gesture positions 572*a*1→572*b*1. The control unit may output the product videos 335*b* to 335*e* or 375*b* to 375*e* corresponding to the thirteenth touch gestures 572*a*→572*b*→572*c* on the slide bar 335*c*2 to the display.

Referring to FIG. 6G, the control unit displays FIG. 6G when the reproduction of the product videos 335*b* to 335*e* or 375*b* to 375*e* is completed. In addition, the product videos 335*a* and 375*a* illustrated in FIG. 6G may be partially different from the product videos 335*a* and 375*a* illustrated in FIG. 6B.

The user makes a fourteenth touch 573 on the text 512. The control unit may detect the fourteenth touch 573 using the touch panel 240 and the touch panel controller (not illustrated). The control unit may receive a fourteenth touch position 573*a* (for example, X14 and Y14 coordinates) corresponding to the fourteenth touch 573 from the touch panel controller.

The control unit may store fourteenth touch position information corresponding to the fourteenth touch position 573*a* in the storage unit. The stored fourteenth touch position information may include an ID for history management, a touch position, a touch detection time, and touch information (for example, a touch pressure, a touch direction, a touch duration time, or the like). Those skilled in the art will easily understand that the stored fourteenth touch position information may differ according to the scheme of the touch panel 240.

The fourteenth touch 573 may be made by one of fingers including the thumb or a touchable input unit. In addition, the fourteenth touch 573 may include hovering and include a touch gesture (for example, a drag, a flick, or the like), a single touch, or a multi-touch.

Referring to FIG. 6H, the control unit controls product videos 335*f* and 375*f* corresponding to the fourteenth touch 573 to be output to the display. The product videos 335*f* and 375*f* may provide the user with the fact that food materials, vegetables, fruits, or the like capable of being housed in the refrigerator may be easily found from a housing space (for example, a shelf, a drawer, or the like) of the refrigerator.

The control unit may output a pop-up 335*f*1 to the product video 335*c* corresponding to the fourteenth touch 573. The pop-up 335*f*1 may include a slide bar 335*f*2 capable of being dragged. The control unit outputs the product videos 335*f* and 375*f* showing food materials or the like greenly stored in each housing space inside the showcase of the refrigerator in correspondence with the user's touch (or a touch gesture such as a drag) on the slide bar 335*f*2 to the display.

The user makes a fifteenth touch (not illustrated) on the slide bar 335*f*2. The control unit may detect the fifteenth touch (not illustrated) using the touch panel 240 and the touch panel controller (not illustrated). The control unit may output the product videos 335*f* and 375*f* corresponding to a position of the fifteenth touch (not illustrated) on the slide bar 335*f*2 to the display.

Referring to FIG. 6I, the control unit displays FIG. 6I when the reproduction of the product videos 335*f* and 375*f* is completed. In addition, the product videos 336 and 376 illustrated in FIG. 6G may be partially different from the product videos 335 and 375 illustrated in FIG. 6A.

The user makes a sixteenth touch 575 on a metal cooling door 520 of the circular UI 403. The control unit may detect the sixteenth touch 575 using the touch panel 240 and the touch panel controller (not illustrated). The control unit may receive a sixteenth touch position 575*a* (for example, X16 and Y16 coordinates) corresponding to the sixteenth touch 575 from the touch panel controller.

The control unit may store sixteenth touch position information corresponding to the sixteenth touch position 575*a* in the storage unit. The stored sixteenth touch position information may include an ID for history management, a touch position, a touch detection time, and touch information (for example, a touch pressure, a touch direction, a touch duration time, or the like). Those skilled in the art will easily understand that the stored sixteenth touch position information may differ according to the scheme of the touch panel 240.

The sixteenth touch 575 may be made by one of fingers including the thumb or a touchable input unit. In addition, the sixteenth touch 575 may include hovering and include a touch gesture (for example, a drag, a flick, or the like), a single touch, or a multi-touch.

Referring to FIGS. 7B and 7C according to another exemplary embodiment of the present invention, the user makes a 41st touch (not illustrated) on a 'super-speed' item of a circular UI 617. The control unit may detect the 41st touch (not illustrated) using the touch panel 240 and the touch panel controller (not illustrated).

The control unit may output product videos 635*a* and 675*a* corresponding to the 41st touch (not illustrated) to the display. The product videos 635*a* and 675*a* may display the fact that much laundry may be washed for a short time to the user. The control unit may output a product video (not illustrated) corresponding to the user's touch (not illustrated) additionally detected in the circular UI 617 to the display.

Referring to FIG. 8C according to another exemplar embodiment of the present invention, the user makes a 51st touch (not illustrated) on a 'suction power' item of a circular UI 717. The control unit may detect the 51st touch (not illustrated) using the touch panel 240 and the touch panel controller (not illustrated).

The control unit may output product videos 735*a* and 775*a* corresponding to the 51st touch (not illustrated) to the display. The product videos 735*a* and 775*a* may display the fact that cleaning may be easily performed with powerful suction power to the user. The control unit may output a product video (not illustrated) corresponding to an additional touch (not illustrated) of the user in the circular UI 717 to the display.

Referring to FIG. 6J, the control unit outputs product videos 336*a* and 376*a* corresponding to a sixteenth touch 575 to the display. The product videos 336*a* and 376*a* may display a metal cooling door for maintaining various drinking water, food materials, vegetables, fruits, or the like capable of being housed in the refrigerator at an optimal refrigeration temperature in a housing space (for example, a shelf, a drawer, or the like) of the refrigerator to the user. In addition, the control unit may output a pop-up 336*a*1 to a product video 336*a* corresponding to the sixteenth touch 575.

Referring to FIG. 6K, the control unit controls a display of FIG. 6K when the reproduction of the product videos 336*a* and 376*a* is completed. In addition, the product videos 337 and 377 illustrated in FIG. 6K may be partially different from the product videos 335 and 375 illustrated in FIG. 6A.

The user makes a seventeenth touch 576 on text 512. The control unit may detect the seventeenth touch 576 using the touch panel 240 and the touch panel controller (not illustrated). The control unit may receive a seventeenth touch position 576*a* (for example, X17 and Y17 coordinates) corresponding to the seventeenth touch 576 from the touch panel controller.

The control unit may store seventeenth touch position information corresponding to the seventeenth touch position 576*a* in the storage unit. The stored seventeenth touch position information may include an ID for history management, a touch position, a touch detection time, and touch information (for example, a touch pressure, a touch direction, a touch duration time, or the like). Those skilled in the art will easily understand that the stored seventeenth touch position information may differ according to the scheme of the touch panel 240.

The seventeenth touch 576 may be made by one of fingers including the thumb or a touchable input unit. In addition, the seventeenth touch 576 may include hovering and include a touch gesture (for example, a drag, a flick, or the like), a single touch, or a multi-touch.

Referring to FIG. 6L, the control unit controls product videos 337*a* and 377*a* corresponding to the seventeenth touch 576 to be output to the display. The product videos 337*a* and 377*a* may provide the user with information indicating that food materials, vegetables, fruits, or the like may be easily drawn from a housing space (for example, a drawer) of the refrigerator.

The control unit may output a pop-up 337*a*1 to the product video 337*a* corresponding to the seventeenth touch 576.

In step S410 of FIG. 4, the output of the product video ends.

Referring to FIG. 6L, the control unit displays FIG. 6A when the reproduction of the product videos 337*a* and 377*a* is completed.

When the user's input is not detected during a time (for example, one minute) (which is changeable) set in FIG. 6A, the control unit may change a product stage to an idle stage. Referring to FIG. 5A, the control unit may output an idle video of the idle stage to the display.

In step S410 of FIG. 4, a screen display method of the electronic device ends when the control unit ends the output of the product video.

FIG. 9 is a plan view illustrating a curved layout structure of a display according to an exemplary embodiment of the present invention. FIG. 10 is a front view illustrating a display according to an exemplary embodiment of the present invention. FIG. 11 is a block diagram illustrating a video processing process of the electronic device according to an exemplary embodiment of the present invention. FIG. 12 is a conceptual diagram illustrating a process of dividing and scaling a source video in an electronic device according to an exemplary embodiment of the present invention.

The multi-display system according to the exemplary embodiment of the present invention will be additionally described in another aspect with reference to FIGS. 9 to 12. Description of the above-described configuration will be omitted.

Hereinafter, the term "display" may be used as the term representing the interactive display 260, the auxiliary display 290, or both thereof.

A plurality of auxiliary displays 290*a*, 290*b*, 290*c*, 290*d*, 290*e*, 290*f*, 290*g*, and 290*h* may be collectively referred to as the auxiliary display 290. When it is unnecessary to specify one of the plurality of auxiliary displays 290*a*, 290*b*, 290*c*, 290*d*, 290*e*, 290*f*, 290*g*, and 290*h*, the auxiliary display 290 may be used as the term representing any one thereof.

Content may include source content generated through a video capturing device such as a camera or a video camcorder and a recording device such as a microphone or transmitted to an electronic device through an external electrical communication facility such as a broadcasting station or a satellite and first content and second content generated by dividing and scaling the source content through the electronic device 100.

The plurality of displays 260 and 290 may include the interactive display 260 provided with the user input device and the auxiliary display 290 for displaying content corresponding to content displayed on the interactive display 260. The user input device may include the touch panel 240.

Multi-display systems 1*a* and 1*b* of this exemplary embodiment include the plurality of displays 260 and 290. Some of the plurality of displays 260 and 290 are provided with the user input device and the remaining displays may not be provided with the user input device.

Here, the interactive display 260 and the auxiliary display 290 display mutually interlocked content. Here, the term "mutually interlocked" means that first content and second content are interlocked to each other when content displayed on the interactive display 260 is referred to as the first content and content displayed on the auxiliary display 290 is referred to as the second content. For example, the first content and the second content may be part of the overall content, the first content and the second content may be the same content as each other, the second content may be part of the first content, the second content may be content for describing the first content, and the second content may be content independent of the first content and variant with a change in the first content.

Specifically, when the first content displays the exterior of a specific product, the second content may display various types of information of the specific product displayed in the first content. The second content may display a trademark, a logo, performance, a standard, a manufacturer, a product name, a model name, a product type, a product size, a product finish/design, a product capacity, a product feature, and the like of a specific product displayed on the first content.

The multi-display systems 1*a* and 1*b* have a plurality of auxiliary displays 290. For example, as illustrated in FIGS. 1, 9, and 10, the multi-display systems 1*a* and 1*b* may be provided with one interactive display 260 and eight auxiliary displays 290. It is only necessary to include at least one interactive display 260 and at least one auxiliary display 290. The number of interactive displays 260 and the number of auxiliary displays 290 are not limited.

Types, shapes, screen resolutions, and screen sizes of the interactive display 260 and the auxiliary display 290 are not limited.

That is, each of the interactive display 260 and the auxiliary display 290 may be an analog TV, a digital TV, a 3D TV, a smart TV, an LED TV, an OLED TV, a plasma TV, a monitor, a curved TV having a screen with a fixed curvature, a flexible TV having a screen with a fixed curvature, a bent TV having a screen with a fixed curvature, or a variable curvature TV in which the curvature of a current screen can be changed by an input received from the user.

In addition, the interactive display 260 and the auxiliary display 290 may output content having FDH or UHD resolution. The UHD resolution may include 4096×2160 pixels or 3840×2160 pixels as resolution which is about four times the FHD resolution. In addition, the interactive display 260 and the auxiliary display 290 may be a display capable of outputting HD content.

Accordingly, the interactive display 260 and the auxiliary display 290 may be distinguished by the presence/absence of the user input device without being distinguished according to types, shapes, screen resolutions, and screen sizes thereof.

Here, the interactive display 260 of this exemplary embodiment may have a relatively screen larger and relatively resolution higher than the auxiliary display 290, and the auxiliary display 290 may have a relatively small screen and relatively low resolution. The plurality of auxiliary displays 290 may have the same size, resolution, and shape as each other.

In this exemplary embodiment, the interactive display 260 may have a screen having a diagonal length of about 85 inches. The interactive display 260 may display the exterior of a general home appliance product in the same size as an actual display without a cut. For example, the interactive display 260 may display the exterior of the refrigerator in the real size without a cut. In addition, the interactive display 260 may have UHD resolution.

The auxiliary display 290 may have a screen of a size of about ¼ of the interactive display 260 and FHD resolution.

Because the adoption of the plurality of high-resolution displays leads to significant burden on processing of the electronic device and a cost increase when the general technical level and cost are considered, a display having a relatively small size and relatively low resolution is adopted as the auxiliary display 290 in the electronic device of this exemplary embodiment. In addition, in terms of the aesthetic sense, there is a disadvantage in that a bezel member 263 (FIG. 10) of the LFD is thicker than a bezel member 293 (FIG. 10) of the SFD and thus a cut region of the content is widened.

The interactive display 260 and the plurality of displays 290 may be disposed in various layouts. In this exemplary embodiment, the auxiliary displays 290 are arranged in a 2×1 layout on the left side and a 2×3 layout on the right side based on the interactive display 260. That is, the auxiliary display 290 include first to eighth auxiliary displays 290*a*, 290*b*, 290*c*, 290*d*, 290*e*, 290*f*, 290*g*, and 290*h*. Among these, the first auxiliary display 290*a* and the second auxiliary display 290*b* may be arranged in two rows on the left side of the interactive display 260 and six auxiliary displays of the third to eighth auxiliary displays 290*c*, 290*d*, 290*e*, 290*f*, 290*g*, and 290*h* may be arranged in two rows and three columns on the right side of the interactive display 260.

At this time, the total screen size of four auxiliary displays may be the same as about the screen size of the interactive display 260. For example, the total screen size of the auxiliary displays 290*c*, 290*d*, 290*e*, and 290*f* may be roughly the same as the screen size of the interactive display 260.

However, the layout of the interactive display 260 and the plurality of auxiliary displays 290 is not limited to this exemplary embodiment. Of course, various exemplary embodiments of the layout are possible.

In this exemplary embodiment, each of the interactive display 260 and the auxiliary display 290 may have a flat display screen. However, as illustrated in FIG. 9, the interactive display 260 and the auxiliary displays 290 may be arranged to be curved. In this configuration, the angle of view of the user may be widened, the sense of immersion may be increased, and the spaciousness may be improved.

The multi-display systems 1*a* and 1*b* of this exemplary embodiment may have the interactive display 260 having a large screen and high resolution and the plurality of auxiliary displays 290 having a plurality of small screens and low resolution, provide interactive content to the user through the interactive display 260, display a home appliance product in a real size without a cut, and provide more abundant information and experience to the user during interaction by additionally providing additional content interlocked with content displayed on the interactive display 260 through the auxiliary display 290, and maximize a marketing effect by causing curiosity and excitement for customers on standby.

In particular, the auxiliary display 290 of the small screen and the low resolution makes the interactive display 260 of the large screen and the high resolution more conspicuous, thereby improving the degree of concentration of the user.

The electronic device 100 may generate first content to be transmitted to the interactive display 260 and second content to be transmitted to the auxiliary display 290 by dividing and scaling source content and transmit the generated first and second content to the interactive display 260 and the auxiliary display 290 through the I/O unit 130.

For this, as illustrated in FIG. 11, the electronic device 100 may include a video processing section 160 configured to generate first and second content by dividing and scaling source content; and the I/O unit 130 configured to transmit the first and second content generated by the video processing section 160 to the interactive display 260 and the auxiliary display 290.

The video processing section 160 includes a reception unit (not illustrated) configured to receive the source content, a video processing unit 161 configured to process and divide the source content received through the reception unit, and a scaler 162 configured to scale the content processed and divided by the video processing unit 161.

On the other hand, even when the sizes and resolutions of the interactive display 260 and the auxiliary display 290 are different, a size of an image object may be the same when one image object is displayed on the interactive display 260 and the auxiliary display 290.

Further, when a screen scrolls by a touch gesture of the user, the image object may move between the interactive display 260 and the auxiliary display 290. At this time, a horizontal line (at the time of horizontal scrolling) or a vertical line (at the time of vertical scrolling) of the image object displayed on the interactive display 260 may be maintained to be the same as a horizontal line 832a or 832b (FIG. 12) or a vertical line of the image object displayed on the auxiliary display 290.

For this, the first content to be displayed on the interactive display 260 and the second content to be displayed on the auxiliary display 290 may be generated to have different resolutions.

A process of generating the first content to be displayed on the interactive display 260 and the second content to be displayed on the auxiliary display 290 with different resolutions when interactive display 260 and the auxiliary display 290 have different resolutions in the multi-display systems 1a and 1b according to the exemplary embodiment of the present invention will be described with reference to FIGS. 11 and 12.

In the exemplary embodiment of the present invention, it is assumed that one interactive display 260 and eight auxiliary displays 290 are provided, the first to fourth auxiliary displays 290a to 290d of the auxiliary displays 290 are recognized as one display cluster 291 (FIG. 11), and the fifth to eighth auxiliary displays 290e to 290h are recognized as the other display cluster 292 (FIG. 11).

Accordingly, the four auxiliary displays 290a, 290b, 290c, and 290d belonging to the first display cluster 291 may be mutually connected in series. The four auxiliary displays 290e, 290f, 290g, and 290h belonging to the second display cluster 292 may be mutually connected in series.

Accordingly, the multi-display systems 1a and 1b may include a first wire 294 (FIGS. 2A and 2B) configured to electrically connect the electronic device 100 and the interactive display 260, a second wire 295 (FIGS. 2A and 2B) configured to electrically connect the electronic device 100 and the first display cluster 291, and a third wire 296 (FIGS. 2A and 2B) configured to electrically connect the electronic device 100 and the second display cluster 292. In addition, the multi-display systems 1a and 1b may include a fourth wire 297 (FIGS. 2A and 2B) configured to electrically connect the electronic device 100 and the touch panel 240.

In addition, it is assumed that the sizes and resolutions of the auxiliary displays 290 are the same, sizes of the screens of the display clusters 291 and 292 each having the four auxiliary displays 290 are the same as the size of the screen of the interactive display 260, and the interactive display 260 and the display clusters 291 and 292 are disposed to be aligned side by side in the horizontal direction.

The video processing section 160 of the electronic device 100 includes a reception unit (not illustrated) configured to receive the source content, the video processing unit 161 configured to process and divide the source content received through the reception unit, and the scaler 162 configured to scale the content processed and divided by the video processing unit 161.

The reception unit receives the source content from the storage unit 140 or the like and transfers the received source content to the video processing unit 161. The source content may have various resolutions. For example, the source content may have a 2K resolution of 1920×1080, a 4K (UHD) resolution of 3840×2160, and an 8K resolution of 7680×4320.

The video processing unit 161 may perform video processing on the source content received from the reception unit in various preset methods. For example, the video processing unit 161 may perform de-multiplexing for dividing a predetermined signal into property-specific signals, decoding corresponding to a video format of a video signal, de-interlacing for converting an interlaced video signal into a progressive scheme, noise reduction for video quality improvement, detail enhancement, buffering in a frame buffer for storing decoded source content in units of frames, and the like.

The video processing unit 161 divides the source content on which video processing is performed in correspondence with the number of interactive displays 260 and the number of display clusters 291 and 292. That is, the video processing unit 161 divides the video-processed source content into three pieces of content.

The three pieces of the content may be distributed to the interactive display 260, the first display cluster 291, and the second display cluster 292, respectively, and displayed on the displays 260 and 290.

On the other hand, the divided content may be appropriately scaled according to differences between the resolution of the content itself and the resolutions of the displays 260 and 290. In this exemplary embodiment, the source content may have appropriate resolution so that it is not necessary to scale the content distributed to the interactive display 260. For example, if the resolution of the interactive display 260 is a 4K UHD resolution of 3840×2160, the source content is generated to have a resolution of 3840×2160 or more, and division content 165 obtained by dividing the content in the video processing unit 161 may have the same resolution of 3840×2160 as the resolution of the interactive display 260.

Accordingly, the content to be distributed to the interactive display 260 among content divided by the video processing unit 161 may be transmitted to the interactive display 260 through the I/O unit 130 with separate scaling.

However, it is necessary to appropriately scale the content to be distributed to the auxiliary display 290 so that the content is appropriate for the resolution of the auxiliary display 290.

For example, when the resolution of each auxiliary display 290 is 960×540 and the total resolution of a display cluster constituted of four auxiliary displays 290 is 1920×1080, it is necessary to scale the division content obtained by dividing the content through the video processing unit 161 from a resolution of 3840×2160 to a resolution of 1920×1080.

For this, the video processing section 160 includes the scaler 162 configured to scale the division content 165 obtained by dividing the content through the video processing unit 161. In this exemplary embodiment, the video processing section 160 includes two scalers 162 because the multi-display systems 1a and 1b include the two display clusters 291 and 292.

As described above, scaled content 166 of a resolution of 1920×1080 may be divided into four pieces of content 167 of a resolution of 960×540 in the display clusters 291 and 292 and the four pieces of the content 167 may be distributed to the auxiliary displays 190 (FIG. 12).

FIG. 13 is a diagram illustrating a map of content of the display according to an exemplary embodiment of the present invention. FIG. 14 is a diagram illustrating a home screen of the display according to an exemplary embodiment of the present invention. FIG. 15 is a diagram illustrating movement of a user menu of the display according to an exemplary embodiment of the present invention. FIGS. 16 to 21 are diagrams illustrating an operation of scrolling product category content of the display according to an exemplary embodiment of the present invention. FIG. 22 is a diagram illustrating a screen in which a refrigerator is selected among product categories of the display according to an exemplary embodiment of the present invention. FIG. 23 is a diagram illustrating product feature content of the display according to an exemplary embodiment of the present invention. FIG. 24 is a diagram illustrating product operation content of the display according to an exemplary embodiment of the present invention. FIG. 25 is a diagram illustrating zoom content of the display according to an exemplary embodiment of the present invention. FIGS. 26 and 27 are diagrams illustrating background-switched content of the display according to an exemplary embodiment of the present invention.

Content included in the electronic device according to an exemplary embodiment of the present invention will be described with reference to FIGS. 13 to 27.

As illustrated in FIG. 13, the content displayed on the interactive display 260 and the auxiliary display 290 can be divided into three layers.

Content of the first layer may include attraction content 810 to be iteratively displayed in an attraction state. The attraction content is content for attracting the user to be iteratively displayed before the proximity of the user is sensed by the proximity sensor 220 or before the touch of the user is detected. When the user's proximity or touch is selected in the attraction state, home screen content 820 (start view) (FIG. 14) may be displayed.

The home screen content 820 includes a user menu 821 for the user's input. The user menu 821 may be displayed on the interactive display 260. The user menu 821 may have various shapes, and, for example, may be provided in a circular form. The user menu 821 may have various detailed menus for the user's input.

The user menu 821 may be provided to be movable within a predetermined region on the screen of the interactive display 260. Accordingly, the user may move the user menu 821 to a convenient position suitable for his/her physical condition.

As illustrated in FIG. 15, the position of the user menu 821 may be moved by the user's touch gesture. When the user makes a touch 825 on one point of the user menu 821 and then performs a drag 826 and a drop 827, it is possible to move the position of the user menu 821. The user menu 821 may move to a position of the drop 827.

Content of the second layer includes product category content 830 for displaying and showing products of various categories. For example, the product category content 830 may include a washer 831, a refrigerator 832, a vacuum cleaner 833, and an oven 834. The product category content 830 may be provided to scroll on the screen by the user's touch gesture.

As illustrated in FIG. 16, various category products 831, 832, 833, and 834 included in the product category content 830 may be provided so that product bottom surfaces are placed on the same reference plane 849. Accordingly, the user may have a feeling as if the user is in a space in which the products are arranged.

Products of various categories included in the product category content 830 may be arranged in the horizontal direction. For example, the washer 831, the refrigerator 832, the vacuum cleaner 833, and the oven 834 included in the product category content 830 may be sequentially arranged in the horizontal direction.

One of the products included in the product category content 830 may be displayed on the interactive display 260 and the remaining products may be displayed on the auxiliary displays 290.

The interactive display 260 may have a sufficient size capable of completely covering a size of the displayed product. Accordingly, the product displayed on the interactive display 260 may be represented without a cut.

The product category content 830 may be provided to scroll in the horizontal direction by the user's touch gesture. The touch gesture may include a touch and drag. After the user makes a touch 835 (FIG. 17) on one point of the interactive display 260, the user may scroll the screen in the horizontal direction through an operation of a drag 836 (FIG. 17).

For example, as illustrated in FIG. 16, the washer 831 may be displayed on the interactive display 260 in the product category content 830a and the refrigerator 832 and the vacuum cleaner 833 may be displayed on the right auxiliary displays 290.

Here, as illustrated in FIG. 17, the screen may scroll to the left side when the user inputs the touch gesture of the touch and drag in the product category content 830b. Ultimately, as illustrated in FIG. 18, the washer 831 may be displayed on the left auxiliary display 290, the refrigerator 832 may be displayed on the interactive display 260, and the vacuum cleaner 833 and the oven 834 may be displayed on the right auxiliary display 290.

As illustrated in FIG. 17, in the product category content 830b, the refrigerator 832, which is an image object, moves from the right auxiliary display 290 to the interactive display 260. Even when the resolutions of the interactive display 260 and the auxiliary display 290 are different as described above, the horizontal lines 832a and 832b of an image object displayed on the interactive display 260 and an image object displayed on the display 290 may be equally aligned.

Here, when the touch gesture of the touch and drag of the user is input again and the screen scrolls to the left again, the refrigerator 832 may be displayed on the left auxiliary display 290, the vacuum cleaner 833 may be displayed on the interactive display 260, and the oven 834 may be displayed on the right auxiliary display 290 as illustrated in FIG. 19.

Here, when the touch gesture of the touch and drag of the user is input again and the screen scrolls to the left again, the vacuum cleaner 833 may be displayed on the left auxiliary display 290 and the oven 834 may be displayed on the interactive display 260 as illustrated in FIG. 20. In the above-described operation, all products included in the product category content 830 may be sequentially displayed on the interactive display 290.

When the user inputs touch gestures 835 and 836 to the interactive display 260 again in a state of arrival at the last part of the product category content 830f is as illustrated in FIG. 21, the screen may be provided to be slightly flicked in a direction 838 opposed to the touch gesture.

The product category content 830 may include the artificial motion blur (not illustrated) capable of giving liveliness and a speed sense when an image object such as a washer, a refrigerator, a vacuum cleaner, an oven, or the like is moved by the user's touch gesture.

The motion blur means that an image is blurred in a motion direction when an object is photographed during high-speed motion. That is, the motion blur means a latent image of the image object and a blur effect of a striped pattern caused by the latent image when the object moving at a high speed is photographed at a slow shutter speed in a moving image.

The user can experience natural and fast movement without having a feeling as if the image object is being cut off through this artificial motion blur.

The content of the third layer may include product details content 900 for showing details of each product. The content of the third layer may be content lower than the content of the second layer. The product details content 900 may include product details type content 910 for showing a type of details of the product. The product details content 900 may include product feature content 920 for showing a product feature. The product feature content 920 may include product operation content 930 for implementing an actual operation of the product. The product details content 900 may include zoom content 940 for enlarging and showing a partial region of the product. The product details content 900 may include background-switched content 950 for changing and showing a background in which the product is disposed.

The product details type content 910 may be displayed by arranging a type of details of a product in the horizontal direction as in the product category content 830. For example, as illustrated in FIG. 22, a two-door refrigerator 911, a first FDR refrigerator 912, and a second FDR refrigerator 913, and the like may be arranged and displayed in the horizontal direction in terms of the product details type content 910 of the refrigerator as lower-order content of the product category content 830 for the refrigerator.

The product details type content 910 may be provided to scroll in the horizontal direction by the touch gesture of the user as in the product category content 830. The touch gesture may include the touch and drag. After touching one point of the interactive display 260, the user can identify a type of details of the refrigerator while scrolling the screen in the horizontal direction according to a drag and drop operation in the horizontal direction.

The product feature content 920 may display all a model name, a standard, a feature/advantage, and the like of the product along with the exterior of the product. For example, the exterior of the product may be displayed on the interactive display 260 and various content for displaying the model name, the standard, and the feature/advantage of the product may be displayed on the auxiliary display 290.

As illustrated in FIG. 23, the product feature content 920 of the refrigerator may be constituted of an exterior 921 of the refrigerator displayed on the interactive display 260, a model name 922 and various types of standards of the refrigerator displayed on the left auxiliary display 290, and an image or video 923 for representing a cooling structure of the refrigerator displayed on the right auxiliary display 290.

The product feature content 920 may include product operation content 930 for displaying an actual operation of the product. For example, as illustrated in FIG. 24, the product operation content 930 may include a video for displaying an operation in which the inside of a storage room 933 is open while a door 932 of the refrigerator 931 is open. The user may experience a realistic operation of an actual product through the product operation content 930.

The product operation content 930 may be content of a moving image captured by a camcorder. Alternatively, the product operation content 930 may be content of a plurality of still cuts continuously captured by a camera.

The zoom content 940 is content for enlarging and displaying part of the exterior of the product. As illustrated in FIG. 25, the electronic device 100 may display the zoom menu 941 on the interactive display 260 when the user selects the zoom content 940 through the user menu. The zoom menu 941 may be provided to be movable on the screen of the interactive display 260. The zoom menu 941 may be moved by the user's touch gesture. The touch gesture may include the touch and drag. The zoom menu 941 may have various shapes. For example, the zoom menu 941 may be provided in a magnifying glass shape. The zoom menu 941 may include an internal zoom portion 942 and a border portion 943 provided outside the zoom portion 942.

When the user touches and drags the zoom menu 941, the zoom menu 941 moves according to the user's touch and a partial region of a corresponding object image may be enlarged and displayed in the zoom portion 942 of the zoom menu 941.

The background-switched content 950 may be displayed by changing a background in which a product is disposed. For example, the background-switched content 950 may include content 950a in which the product is disposed in a default background as illustrated in FIG. 26 and content 950b in which the product is disposed in another background as illustrated in FIG. 27 according to the user's input. Accordingly, the user may experience a state in which the product is disposed in various environments. For example, it is possible to predict how much the product matches an environment at home.

The background-switched content 950 may have a plurality of first layers including a background 952, a second layer including a product 951, and a third layer including a user menu for background switching. The first to third layers may be activated and superimposed together. The first layer may be disposed in the lowest order and the third layer may be disposed in the highest order. In the background-switched content 950, the first layer may be replaced in correspondence with the user's input through the user menu for the background switching.

The first layer may include various light source effects so that an environment in which the product is disposed is similar to an actual environment. For example, the first layer may include a shadow 953 formed by the product in an environment in which the product 951 is actually irradiated with light.

Methods according to the exemplary embodiments of the present invention may be implemented in a form of an executable program command through a variety of computer means and be recordable to computer-readable media. The computer-readable media may include program commands, data files, data structures, and the like independently or in combination. For example, the computer-readable media may be a volatile or nonvolatile storage device such as a ROM regardless of whether data is erasable or rewritable, or a memory such as a RAM, a memory chip, a device or an integrated circuit, an optical or magnetic medium such as a compact disc (CD), a digital versatile disc (DVD), a magnetic disk or a magnetic tape, or a machine (for example, computer)-readable storage medium. It can be seen that a memory capable of being included within the mobile terminal is an example of a machine-readable storage medium suitable for storing a program(s) including instructions for implementing the exemplary embodiments of the present invention. The program commands recorded to the media may be components specially designed for the present invention or may be usable to a skilled person in a field of computer software.

Although the exemplary embodiments of the present invention have been described with reference to the drawings, the present invention is not limited to the above-described exemplary embodiments. It will be understood by those skilled in the art that various changes and modification may be made without departing from the spirit and scope of the invention.

Therefore, there is no intent to limit the invention to the particular forms disclosed. On the contrary, the invention is to cover all modifications, equivalents, and alternatives falling within the spirit and scope of the appended claims.

The invention claimed is:

1. A multi-display system, comprising:
    a first display;
    at least one display cluster including a plurality of second displays, each of the plurality of second displays being configured to operate at a relatively lower resolution than the first display and having a relatively smaller size screen than the first display;
    a touch panel provided in the first display and configured to receive an input of a command of a user; and
    an electronic device configured to output mutually interlocked content to the first display and the plurality of second displays according to the command of the user input through the touch panel,
    wherein the electronic device is connected to the first display and the at least one display cluster, and
    wherein the plurality of second displays are mutually connected in series.

2. The multi-display system of claim 1, wherein the plurality of second displays are disposed on a left or right side of the first display in a two-dimensional 2×M (M is a positive integer) layout.

3. The multi-display system of claim 1, further comprising:
    a first wire configured to electrically connect the electronic device and the first display;
    at least one second wire configured to electrically connect the electronic device and the at least one display cluster; and
    a third wire configured to electrically connect the electronic device and the touch panel.

4. The multi-display system of claim 1, wherein the electronic device comprises:
    at least one processor; and
    at least one memory storing one or more computer programs including instructions configured to be executed by the at least one processor, the one or more computer programs including instructions that, when executed by the at least one processor, cause the at least one processor to:
    process and divide source content, and
    scale the source content after the processing and dividing of the source content.

5. The multi-display system of claim 4, wherein the one or more computer programs further cause the at least one processor to divide the source content into divisions equal in number to a total number of displays that includes the first display and the at least one display cluster.

6. The multi-display system of claim 5,
    wherein the source content divided by the processor is distributed to the first display and the at least one display cluster, and
    wherein the one or more computer programs further cause to at least one processor to scale the source content in accordance with a resolution of the plurality of second displays.

7. The multi-display system of claim 6, wherein, when a resolution of the source content comprises a resolution suitable for both a resolution of the first display and the resolution of the plurality of second displays, the source content distributed to the first display is transmitted without performing the scaling of the source content.

8. The multi-display system of claim 4, wherein the source content scaled by the processor is sub-divided into divisions equal in number to the plurality of second displays and distributed to the plurality of second displays.

* * * * *